United States Patent [19]

Olnowich et al.

[11] Patent Number: 5,742,761
[45] Date of Patent: Apr. 21, 1998

[54] APPARATUS FOR ADAPTING MESSAGE PROTOCOLS FOR A SWITCH NETWORK AND A BUS

[75] Inventors: Howard Thomas Olnowich, Endwell; Michael Wayland Dotson, Binghamton; James William Feeney, Endicott, all of N.Y.; Michael Hans Fisher, Rochester, Minn.; John David Jabusch, Endwell, N.Y.; Robert Francis Lusch, Vestal, N.Y.; Michael Anthony Maniguet, Owego, N.Y.

[73] Assignee: International Business Machines Corporation, Armonk, N.Y.

[21] Appl. No.: 800,070

[22] Filed: Feb. 12, 1997

Related U.S. Application Data

[63] Continuation of Ser. No. 381,669, Jan. 30, 1995, abandoned, which is a continuation of Ser. No. 946,506, Sep. 17, 1992, abandoned, and a continuation-in-part of Ser. No. 677,543, Mar. 29, 1991, abandoned, Ser. No. 799,497, Nov. 27, 1991, abandoned, and Ser. No. 799,602, Nov. 27, 1991, abandoned.

[51] Int. Cl.[6] ........................ G06F 1/00
[52] U.S. Cl. .................. 395/200.2; 370/355; 370/466; 364/238.1; 364/242.94; 364/DIG. 1
[58] Field of Search .............. 395/800, 200.2, 395/200.15, 500; 370/355, 389, 466; 364/238.1, 242.94, DIG. 1

[56] References Cited

U.S. PATENT DOCUMENTS

| 3,601,546 | 8/1971 | Lee | 340/825.04 |
|---|---|---|---|
| 3,800,097 | 3/1974 | Maruscak et al. | 361/791 |
| 4,201,889 | 5/1980 | Lawrence et al. | 370/68 |
| 4,747,073 | 5/1988 | Desbois et al. | 395/325 |
| 4,807,282 | 2/1989 | Kazan | 379/284 |
| 4,845,709 | 7/1989 | Matsumoto et al. | 370/85.5 |
| 4,855,903 | 8/1989 | Carleton et al. | 395/325 |
| 4,858,162 | 8/1989 | Kieffer et al. | 361/683 |
| 4,864,496 | 9/1989 | Triolo et al. | 395/325 |
| 4,896,289 | 1/1990 | Svinicki et al. | 395/575 |
| 4,949,301 | 8/1990 | Joshi et al. | 395/425 |
| 4,965,788 | 10/1990 | Newman | 370/60 |
| 4,969,083 | 11/1990 | Gates | 364/147 |
| 4,979,097 | 12/1990 | Triolo et al. | 395/325 |
| 5,058,053 | 10/1991 | Gillett | 395/425 |
| 5,155,810 | 10/1992 | McNamara et al. | 395/250 |
| 5,163,833 | 11/1992 | Olsen et al. | 439/61 |
| 5,231,631 | 7/1993 | Buhrke et al. | 370/60 |
| 5,274,768 | 12/1993 | Traw et al. | 395/200.2 |

OTHER PUBLICATIONS

IBM TDB vol. 33, No. 5, Oct., 1990, "Asynchronous Digital Video Switching System", by Farrell et al, pp. 227–233.

*Primary Examiner*—John E. Harrity
*Attorney, Agent, or Firm*—Michele A. Mobley; Jenkens & Gilchrist; Richard M. Goldman

[57] ABSTRACT

A conversion apparatus that converts and adapts standard processor bus protocol and architecture, such as the Micro-Channel (IBM Trademark) bus, to more progressive switch interconnection protocol and architecture. Existing bus-based architecture is extended to perform parallel and clustering functions by enabling the interconnection of thousands of processors. A conversion apparatus controls the transfer of data messages from one nodal element across a switch network to another nodal element by using direct memory access capabilities controlled by intelligent bus masters. This approach does not require interactive support from the processor at either nodal element during the message transmission, and frees up both processors to perform other tasks. The communication media is switch-based and is fully parallel, supporting n transmissions simultaneously, where n is the number of nodes interconnected by the switching network.

28 Claims, 28 Drawing Sheets

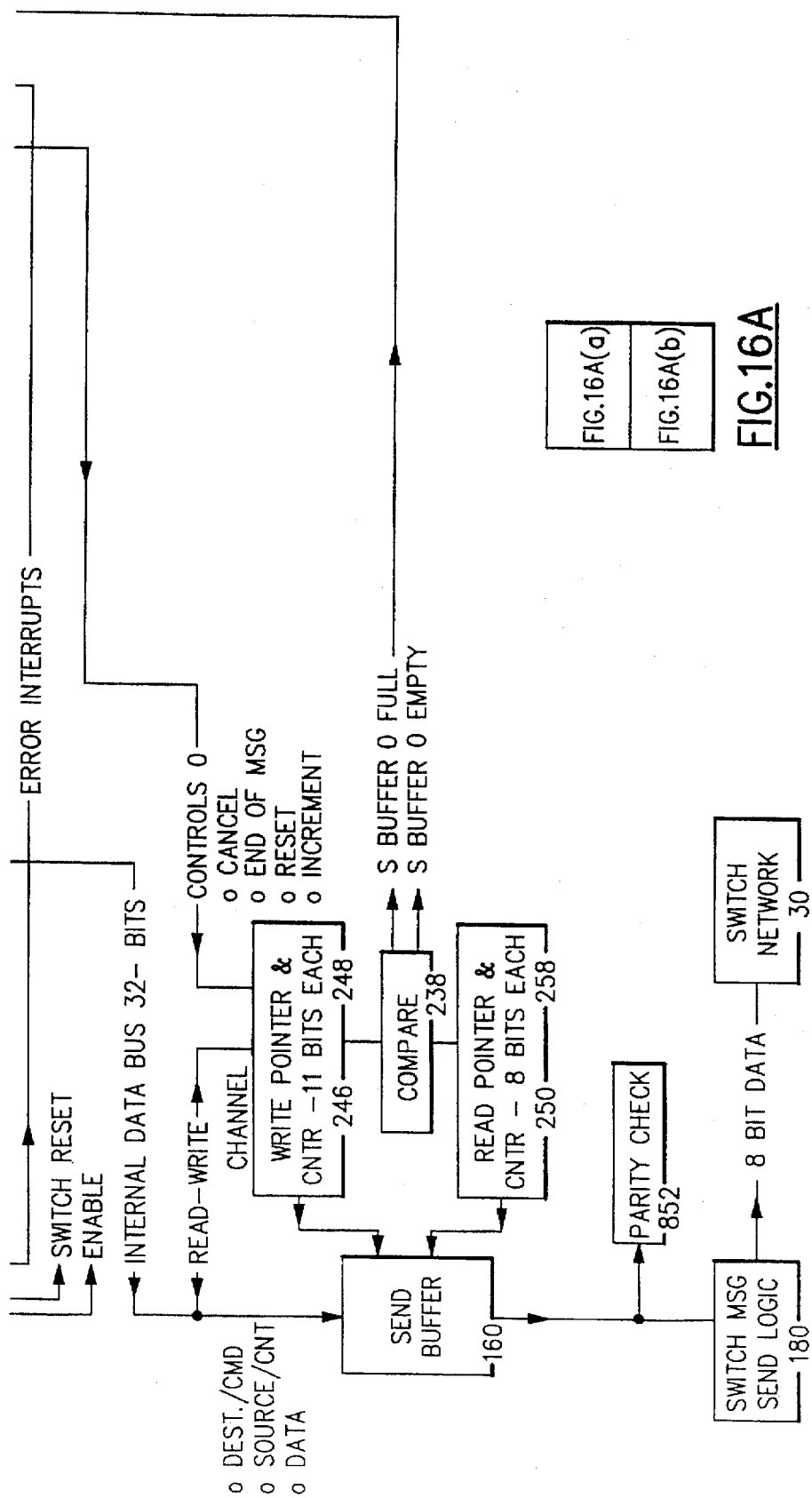

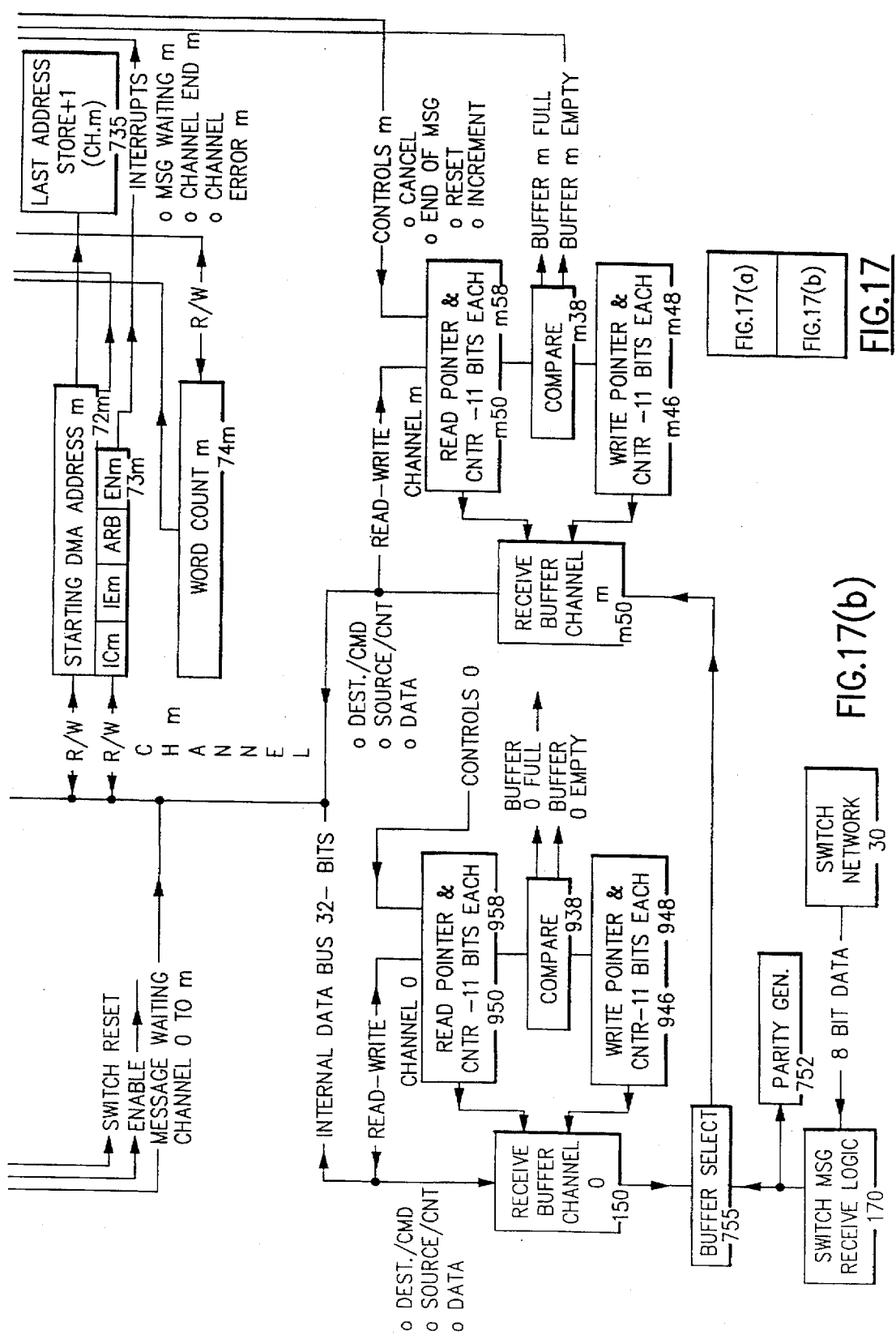

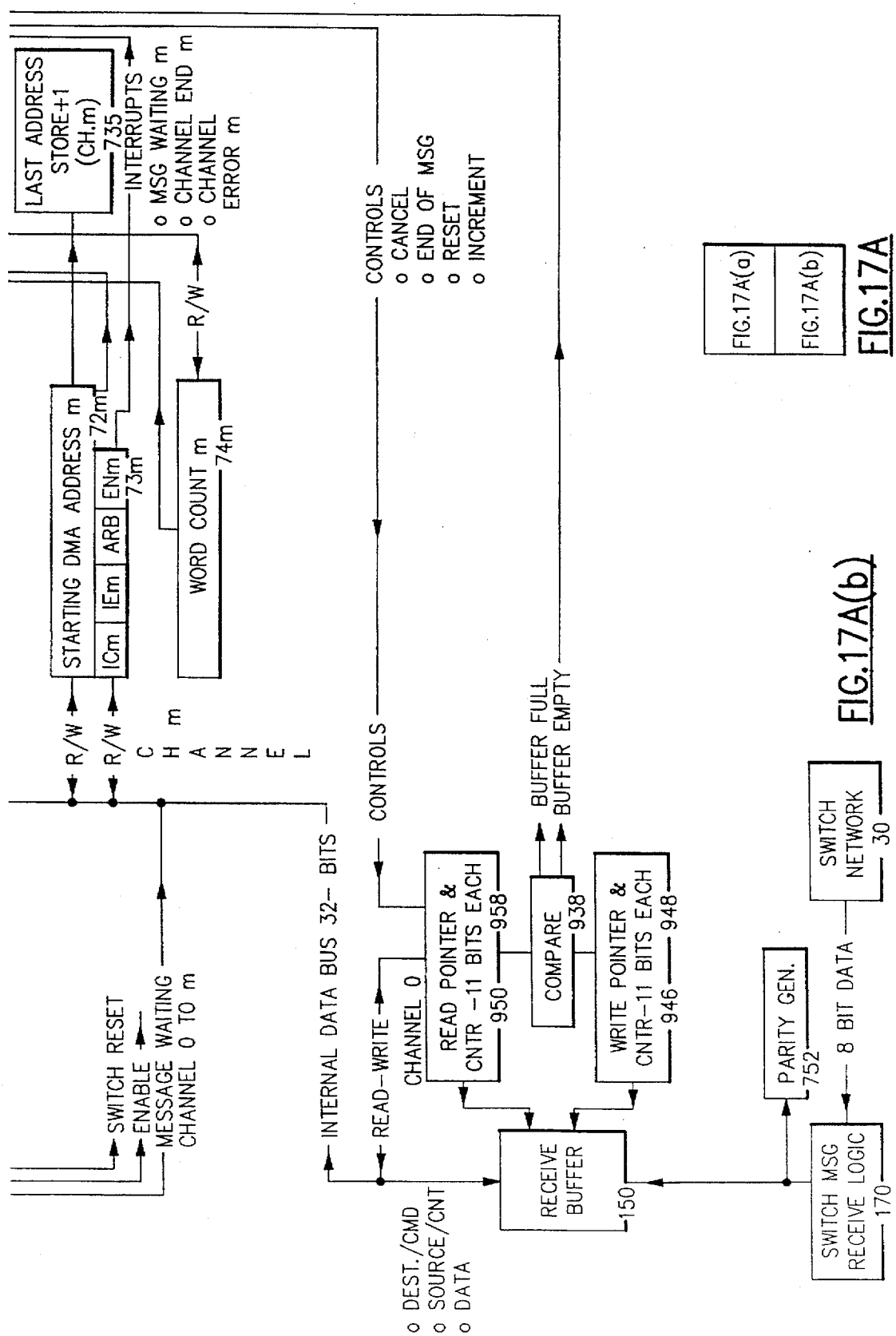

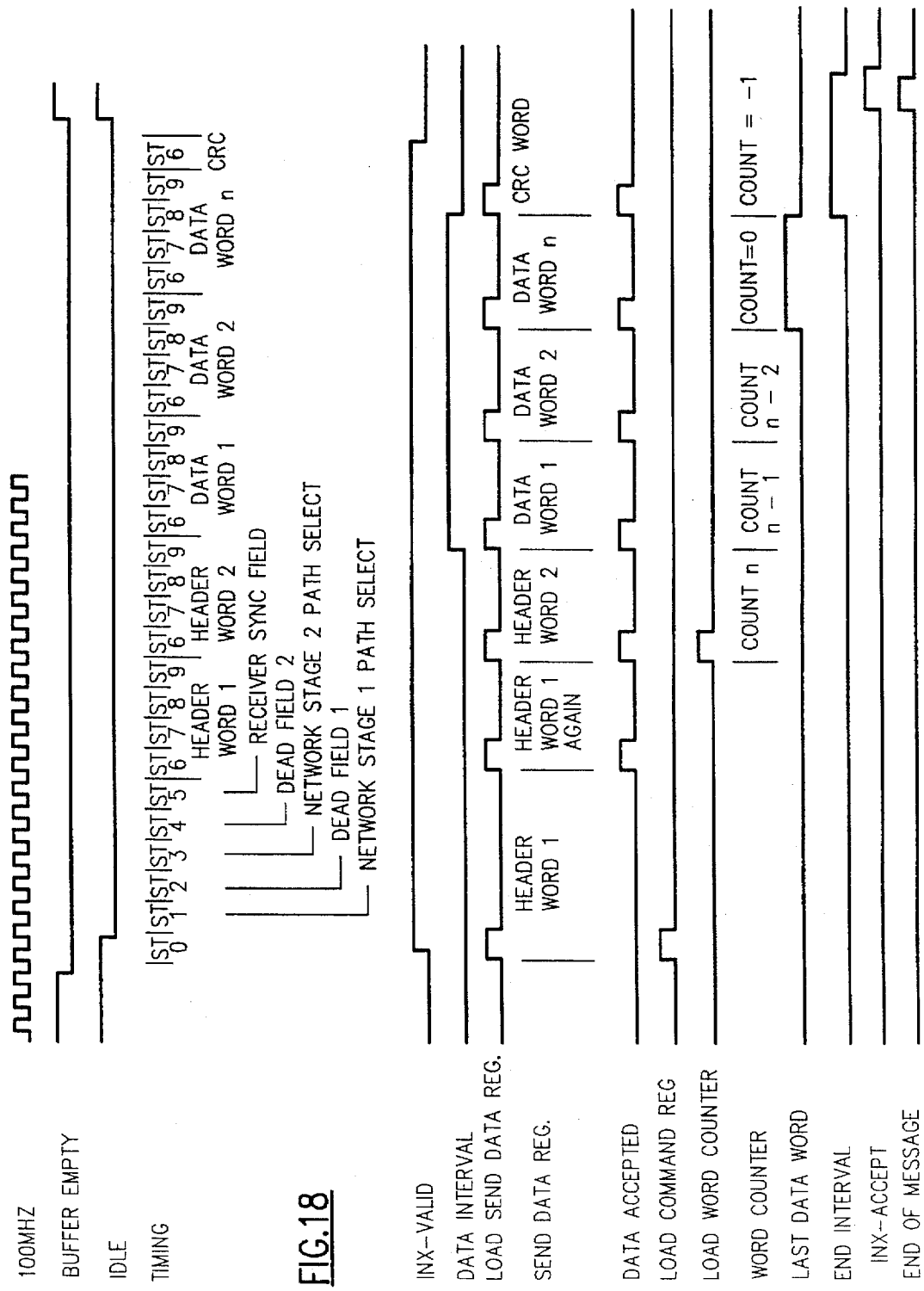

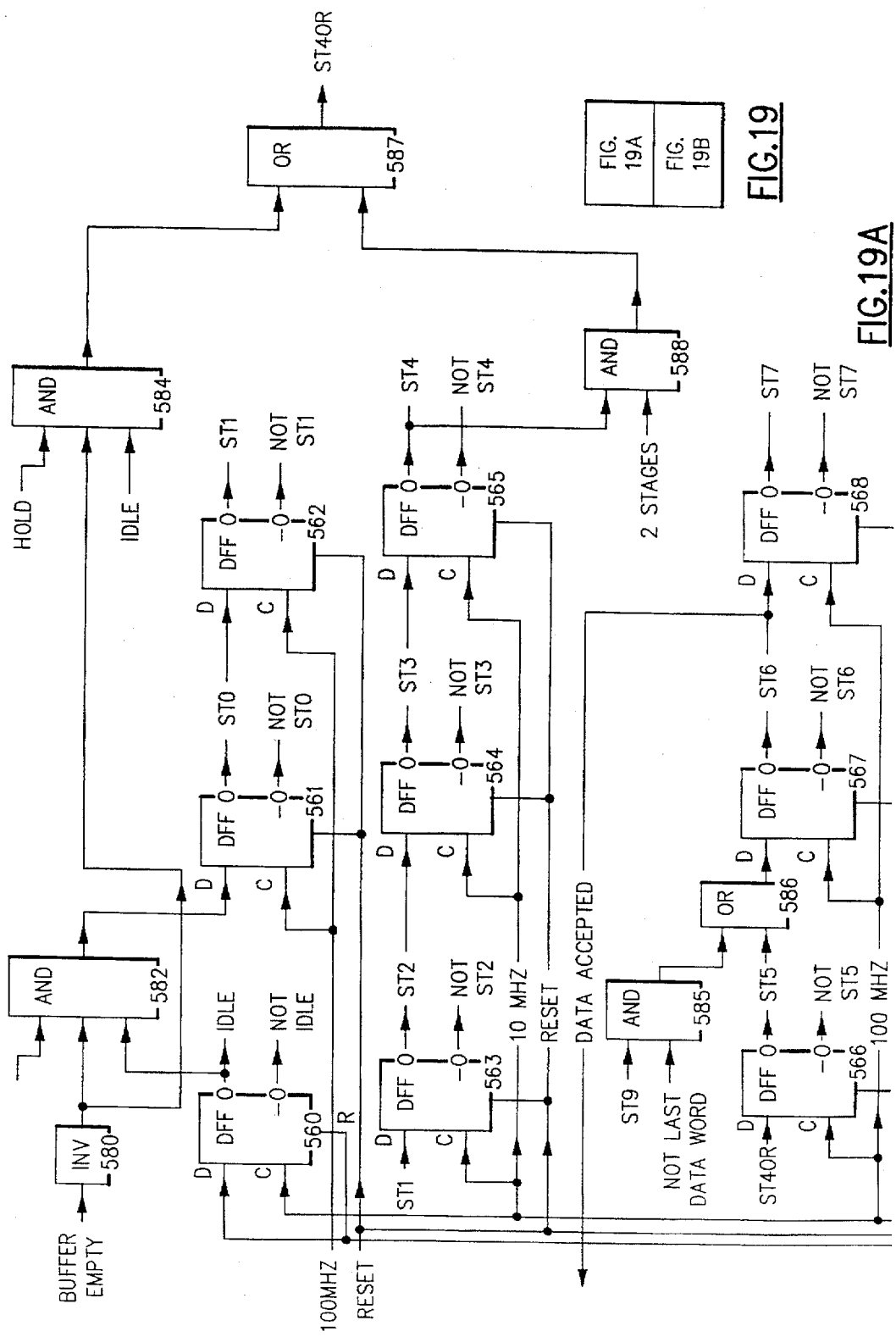

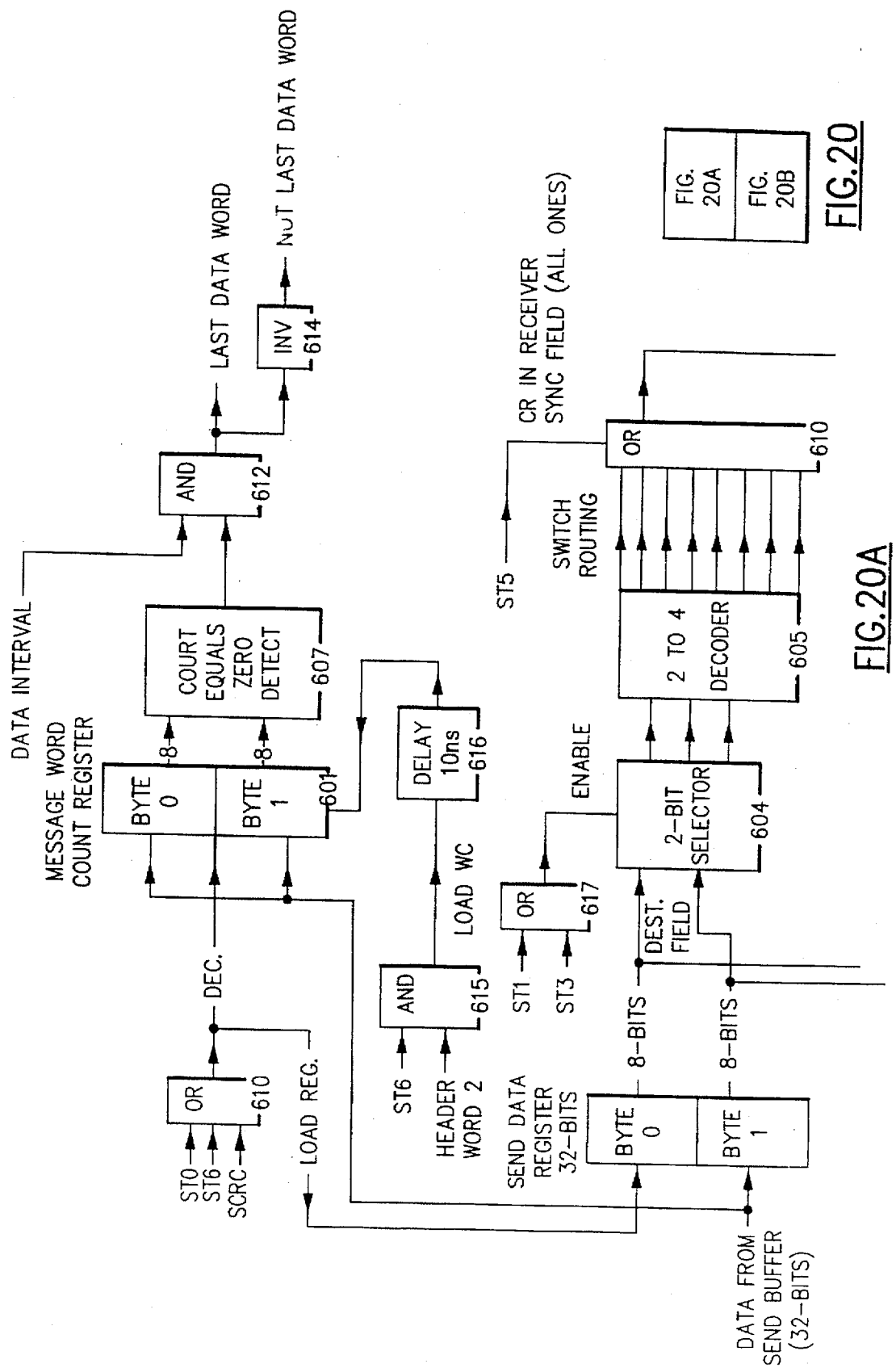

APPARATUS FOR ADAPTING MESSAGE PROTOCOLS FOR A SWITCH NETWORK AND A BUS

RELATED APPLICATIONS

This application is a continuation of application Ser. No. 08/381,669, filed on Jan. 30, 1995, which was abandoned upon the filing hereof, which patent application is a continuation of U.S. Ser. No. 07/946,506 now abandoned. Said patent application 381,669 also claims priority as a continuation-in-part application and is related to the following applications:

"All-Node Switch, An Unclocked, Unbuffered Asynchronous Switching Apparatus" by P. A. Franasek et at., U.S. Ser. No. 07/677,543, filed Mar. 29, 1991; abandoned in favor of U.S. Ser. No. 08/143,977 filed Oct. 27, 1993; and abandoned in favor of U.S. Ser. No. 08/457,789 filed Jun. 2, 1995, and now on appeal;

"Multi-Function Network," by H. T. Olnowich, et al., U.S. Ser. No. 07/799,497, filed Nov. 27, 1991; abandoned in favor of U.S. Ser. No. 08/216,789 filed Mar. 23, 1994; and abandoned in favor of U.S. Ser. No. 08/606,232, filed Feb. 23, 1996;

"Multi-Media Serial Line Switching Adapter For Parallel Networks and Heterogeneous and Homologous Computer System", by H. T. Olnowich et at., U.S. Ser. No. 07/799,602, filed Nov. 27, 1991; abandoned in favor of U.S. Ser. No. 08/390,893, filed Feb. 15, 1995, now U.S. Pat. No. 5,535,373; and divided into (1) U.S. Ser. No. 08/178,957, filed Jan. 7, 1994, abandoned in favor of U.S. Ser. No. 08/521,774 filed Aug. 31, 1995, and (2) U.S. Ser. No. 08/178,974, filed Jan. 7, 1994.

The present application is also related to the following application filed concurrently with the predecessor to this application.

"Multi-Media Analog/Digital/Optical Switching Apparatus," by H. T. Olnowich, et al, U.S. Ser. No. 07/947,196, filed Sep. 17, 1992, and now issued as U.S. Pat. No. 5,384,773;

"Switch-Based MicroChannel Planar Apparatus" by H. T. Olnowich, et al., U.S. Ser. No. 07/946,204, filed Sep. 17, 1992, and now issued as U.S. Pat. No. 5,495,474;

"Switch-Based Personal Computer Interconnection Apparatus" by H. T. Olnowich, et al., U.S. Ser. No. 07/946,512, filed Sep. 17, 1992, and abandoned in favor of U.S. Ser. No. 08/316,620 filed Sep. 30, 1994, and abandoned Feb. 6, 1996;

"Slave MicroChannel Apparatus for Converting to Switch Architecture" by H. T. Olnowich, et al., U.S. Ser. No. 07/947,644, filed Sep. 17, 1992, and abandoned in favor of U.S. Ser. No. 08/286,107 filed Aug. 4, 1994, and now on appeal;

"Multipath Torus Switching Apparatus" by H. T. Olnowich, et al., U.S. Ser. No. 07/946,203 filed Sep. 17, 1992, and now issued as U.S. Pat. No. 5,408,646;

"Variable Cyclic Redundancy Coding Method and Apparatus" by H. T. Olnowich, et al., U.S. Ser. No. 07/946,513 filed Sep. 17, 1992, and now on appeal;

"Signal Regeneration Apparatus for Multi-Stage Transmissions" by H. T. Olnowich, et al., U.S. Ser. No. 07/947,010 filed Sep. 17, 1992, and now on appeal;

"Adaptive Switching Apparatus for Multi-Stage Networks" by H. T. Olnowich, et al., U.S. Ser. No. 07/947,023 filed Sep. 17, 1992, and now issued as U.S. Pat. No. 5,345,229;

"Priority Interrupt Switching Apparatus for Real Time Systems," by H. T. Olnowich, et al., U.S. Ser. No. 07/946,986, filed Sep. 17, 1992, and now issued as U.S. Pat. No. 5,404,537;

"Message Header Generation Apparatus for Parallel Systems" by H. T. Olnowich, et al., U.S. Ser. No. 07/946,506, filed Sep. 17, 1992, and now on appeal.

These co-pending applications, issued patents, and the present application are owned by one and the same assigned namely, International Business Machines Corporation of Armonk, N.Y.

The descriptions set forth in these co-pending applications and issued patents, are hereby incorporated into the present application by this reference.

FIELD OF THE INVENTION

The present invention relates to personal computer and workstation systems and the ability to cluster many systems to perform high speed, low-latency communications with each other in a parallel fashion over switching net-works.

The present invention also relates to digital computer systems and the ability to adapt personal computer and workstation systems that were designed to function as uniprocessors to function effectively as multi-processors; i.e., individual nodes of a message passing parallel system. In addition, the disclosure relates to bus master devices and the capability off-loading digital computer message passing functions to intelligent controllers on the system bus.

GLOSSARY OF TERMS

Arbitration

The capability of a bus master to request ownership of the system bus and to resolve the bus ownership based on a priority scheme for bus usage.

Bus Master

An intelligent bus interface function, other than the system processor, that resides on the system bus and is capable of initiating and controlling transfers on the system bus.

Card slots

Receptacle connectors internal to a PC or workstation for the purpose of receiving expansion cards for attachment and expansion of the internal I/O bus.

Channel

A transmission function of the master switch adapter that is capable of being controlled independently of other similar transmission functions in the same master switch adapter.

Direct Memory Access

The ability of a master apparatus attached via a system bus to a processor to read and write processor memory directly over the system bus.

DMA

Abbreviation for Direct Memory Access

Expansion Card

A board of components that function together as a co-processing or I/O element. The card board has multiple wiring planes used to interconnect all components mounted on the board. The card board has a connector element used to connect the card to the planar (usually the card connector is inserted into the planar connector receptacle). The active components on the card usually include a co-processing and/or I/O element, remote memory, and an I/O interface in the form of a multi-drop bus that connects to the planar through the card connector for communication to other processor or I/O cards.

I/O
  Abbreviation for input/output
Master
  Abbreviation for Bus Master
MicroChannel
  The IBM Trademark for the specific I/O, multi-drop bus used in most IBM PCs and workstations. In the description MicroChannel is used to describe a multi-drop bus.
MC
  Abbreviation for MicroChannel
MicroChannel Converter
  A functional converter that converts the standard MicroChannel bus interface and protocol to the switching network interface and protocol.
MCC
  Abbreviation for MC Converter
MCC-M
  Abbreviation for Master MC Converter
MCC-S
  Abbreviation for Slave MC Converter
MicroChannel Island
  The MicroChannel Bus that resides entirely within a given PC or workstation.
MI
  Abbreviation for MicroChannel Island
MSG
  Abbreviation for Message, which is data sent between two nodes of a parallel system.
Node
  A functional element of the system comprised of one personal computer or workstation providing a standard bus interface, which is used to connect to various input/output devices including the switching network of the present invention.
Nodal element
  Another term for node, which has the same meaning.
NO-OP
  A command sent over the MicroChannel to the SA adapter or expansion card that indicates that the SA should respond passively and not perform any operation (NO OPeration).
Parallel System
  A collection of two or more nodal elements which are interconnected via a switch network and function together simultaneously.
PC
  Abbreviation for Personal Computer
PIO
  A processor instruction called Programmed Input/Output (PIO) for the purpose of transfering data located in general purpose registers in the processor to I/O devices on the MicroChannel bus, or vice versa.
Planar
  A interconnection board or motherboard having multiple wiring planes. The planar contains active components, such as a multi-stage switching network, and inactive components, such as connector slots capable of receiving processor or expansion cards. The planar provides the interconnection wiring amongst the said cards.
Port
  A single bi-directional input or output point to a switching network.
POS
  A standard MicroChannel control sequence to perform Power-on Option Selections (POS) usualy associated with system initialization.
Processor Card
  A board of components that function together as a processing element. The card board has multiple wiring planes used to interconnect all components mounted on the board. The card board has a connector element used to connect the card to the planar (usually the card connector is inserted into the planar connector receptacle). The active components on the card usually include a computing element, memory (local and cache), and an I/O interface in the form of a multi-drop bus that connects to the planar through the card connector for communication to other processor or I/O cards.
Receiving Channel
  A transmission function of the master switch adapter that is capable of receiving messages from the switch network and relaying them to the MicroChannel independently of other similar transmission functions in the same master switch adapter.
Receiving Node
  A functional element of the system comprised of one or more processor and/or expansion cards interconnected by a standard bus to a switching network, which is receiving data transmitted over the switching network.
SA
  Abbreviation for Switch Adapter
SA-M
  Abbreviation for Switch Adapter providing the Bus Master function
SA-S
  Abbreviation for Switch Adapter providing the Slave function
Sending Channel
  A transmission function of the master switch adapter that is capable of sending messages from the MicroChannel and relaying them to the switch network independently of other similar transmission functions in the same master switch adapter.
Sending Node
  A functional element of the system comprised of one or more processor and/or expansion cards interconnected by a standard bus to a switching network, which is transmitting data over the switching network.
Switch Adapter
  An alternate name for the MicroChannel Converter apparataus

BACKGROUND OF THE INVENTIONS

Multi-stage switching networks are gaining acceptance as a means for interconnecting multiple devices within modern digital computing systems. In particular, in parallel systems it is common to use a multi-staged switching network to interconnect n system elements, where n can be several or thousands of processors or combinations of processors and other system elements. However, most state-of-the-art processors are designed to function as uniprocessors and do not implement the functions normally required to function effectively as multi-processors. The problem becomes one of how to effectively adapt uniprocessor personal computer and workstation systems to function in a multi-processor envoironment.

As the field of parallel processing advances, it becomes important to leverage off of existing low cost, off-the-shelf uniprocessors. This will enable cost effective and timely parallel products to be available at the marketplace. What is required to accomplish this is an efficient way to convert existing uniprocessors to function as parallel processors with minimal complexity and cost. This will enable customers to use idle processors that they already own more efficently and to add to the parallel system in a modularly growable fashion. Standard processor busses, such as the Microchannel, usually permit only small numbers (usually up to 8) devices to communicate before the bus exceeds its technology limits. In contrast to this, it is desirable to interconnect thousands of processors together as a parallel system. Certainly the interconnection mechanism for parallel systems cannot be the standard processor busses.

The state-of-the-art interconnection approaches have centered around multi-drop busses, which have many short comings, the primary of which is limited performance and expansion. The problem exists in bus-based processors that there is an ever increasing need for better I/O bus performance and the attachment of more I/O options. This is in direct conflict with the nature of a multi-drop bus technology, which loses performance as more and I/O options are added as taps to the bus. In general, standard bus architectures such as the MicroChannel (IBM Trademark) have selected a performance goal and thus limited the number of I/O taps permissable at that performance level. In the case of the MicroChannel the result is that 8 taps is the maximum number of allowable bus taps to permit bus operations to occur at 200 ns cycle times. As a result, based-based system users are beginning to find that the I/O capability is not sufficient to meet their needs. For years people having been looking for means of increasing the I/O capability of bus-based systems.

Bus-based system performance is limited because only one user can have access to the bus at any given time. The expandability is limited because of the electrical characteristics of the multi-drop bus including drive capability, noise and reflections. A bus must be used internally for a Personal Computer (PC) or workstation, and cannot be extended outside of the packaging enclosure for the purpose of expanding the PC's or workstation's ability to increase it's I/O capability or to communicate directly with other PCs or work-stations. Instead, an expansion card must be used internal to the PC or workstation and inserted into a card slot to interface with the internal bus and to provide a different interface for external expansion.

The present invention provides a means of using each bus-based machine as one node of a many noded parallel system. This is accomplished in either of two ways: 1) By interconnecting multiple PCs or workstations through an expansion card in each PC or workstation which connects to a high speed switching network and enables the individual bus-based systems to communicate with low-latency and interact as a parallel system. This allows for use of investment, yet it overcomes all the limitations placed upon a single bus-based architecture. 2) By interconnecting multiple bus-based cards by an active switch-based planar apparatus which adapts the existing bus interface to allow each card or sets of multiple cards to be interconnected via a high speed switching network. This allows the reuse of investment in expansion cards, yet it leads to a compact and low cost parallel system, while overcoming all the limitations placed upon a single bus-based architecture.

Thus, the present invention can be used to in either of two ways to expand either the computer I/O capability or to improve performance through parallel operation of multiple PCs or workstations being clustered together via a parallel, high speed network.

The state-of-the-art interconnection solutions for multiple PCs and workatations involve serial, high-latency Token Ring and Ethernet connections. However, they do not provide the parallel characteristics and low-latency concepts required for modern interconnect systems. The characteristics that are required include the ability to dynamically and quickly establish and break element interconnections, to do it cheaply and easily in one chip, to have expandablity to many thousands of elements, to permit any length, non-calibrated interconnection wire lengths, to solve the distributed clocking problems and allow future frequency increases, and to permit parallel establishment and data transmittal over N switching paths simultaneously.

The distributed and fully parallel switch utilized herein to provide the required interconnect properties is the ALLNODE Switch (Asynchronous, Low Latency, inter-NODE switch), which is disclosed in U.S. Ser. No. 07/677,543 and adapted by the present invention to perform the switching of converted bus interfaces at low latencies and high bandwidths. The ALLNODE switch provides a circuit switching capability at high bandwidths, and includes distributed switch path connection set-up and tear-down controls individually within each switch—thus providing parallel set-up, low latency, and elimination of central point failures. We will further describe in the detailed description a way whereby the ALLNODE switch and the present invention can be used to solve the bus-based processor interconnection problem effectively.

Amongst the most commonly used networks fro digital communication between processors are the Ethernet or Token Ring LAN networks. "Ethernet: Dis-tributed Packet Switching for Local Computer Networks" Communications of the ACM, July 1976, Vol. 19, No. 7, pp 393–404; and "Token-Ring Loacal-Area Networks and Their Performance", W. Bux, Proceedings of the IEEE. Vol. 77, No. 2, February 1989, pp 238–256; are representative articles which describe this kind of network, which provide a serial shared medium used by one node at a time to send a message to another node or nodes. The present invention is a replacement for this the Ethernet and Token-Ring networks that supports a parallel medium capable of multiple simultaneous transfers.

U.S. Pat. No. 4,803,485—LAN COMMUNICATION SYSTEM, represents one LAN approach which use of the present inventions would replace. This patent describes a medium conversion adapter similar to the present invention, but for adapting various bus protocols to a communication system having multiple transmission media segments in a ring configuration, like a token ring or LAN. The present invention differs in that it adapts multiple transmission segments in an unbuffered multi-stage parallel transfer configuration, that gets latencies in the sub-microsecond range, rather than in the millisecond range of LAN's. This differences will be of value in the future.

SUMMARY OF THE INVENTIONS

The present invention is a conversion apparatus that converts and adapts standard processor bus protocol and architecture, such as the MicroChannel (IBM Trade mark) bus, to more progressive switch interconnection protocol and architecture capable of executing intelligent bus master functions. This way the older simplex processors and the investment in them are not lost, but expanded to be able to perform new parallel and clustering functions by enabling the interconnection of thousands of processors. Customers can buy existing processors or use ones they have purchased previously, and connect them in new and better ways to provide parallelism, while at the same time off-loading the processor message transmission tasks to an intelligent bus master apparatus.

The conversion apparatus can have varying degrees of complexity, performance, and cost options to address a wider range of the marketplace. In general, the MicroChannel (MC) bus provides for various options permitting either Slave or Bus Master converters and/or expansion cards. There are a wide variety of MC cards in existence today and more being introduced everyday. The vast majority (about 90%) of these MC cards fall into 2 categories—I/O Slaves and Memory Slaves. Two other categories, Bus Masters and DMA Slaves, are not available today in nearly as large quantities. Therefore, the most leverage can be obtained by providing a conversion apparatus having the lower cost I/O and Memory MC Slave capabilities. A conversion apparatus having Slave capabilitities is disclosed in "SLAVE MICROCHANNEL APPARATUS FOR CONVERTING TO SWITCH ARCHITECTURE" by H. T. Olnowich etal, U.S. Ser. No. 07/947,644, filed Sep. 17, 1992. The Slave conversion apparatus is relatively easy to implement, inexpensive to build, and is presented in the referenced disclosure.

On the other hand, the MC Bus Master option is much more complex and costly expansion card implement. However, Bus Masters provide leverage to the system by off-loading tasks from the processors, freeing them to accomplish more useful work. Thus, the added complexity and cost of a Bus Master does provide benefits to those willing to pay the additional cost. Especially, in the growing field of parallel processing, the marketplace will tolerate a slightly higher cost to get improved performance.

In particular, the disclosed invention provides a means for extending the MicroChannel (IBM Trademark) Bus architecture to either massively parallel systems or thousands of I/O device taps or a combination of the two. This is accomplished by using electronic switches to interconnect various "MicroChannel Islands" (MI), where each MI is a unique MicroChannel (MC) that can be composed of 1 to 8 multi-drop bus taps (card slots), depending on how many card slots the particular planar, PC model, or workstation model implements. In other words, the new extended MicroChannel becomes a sea of a few or many MC multi-drop busses (MI's) interconnected to each other by a switching networks. An expansion card or planar containing a the present invention MicroChannel Converter—Master (MMC-M) unit is used to adapt each MI to the switch network. The result is that all MIs are fully interconnected and capable of sending data, communications, and/or messages between any two PCs or workstations, which become nodes of the parallel system. The communication media is switch-based and is fully parallel, supporting n transmissions simultaneously, where n is the number of nodes interconnected by the switching network.

The perferred switching means is the basic digital asynchronous and unbuffered switching concept disclosed in U.S. Ser. No. 07/677,543, "All-Node Switch, An Unclocked, Unbuffered Asychronous Switching Apparatus" by H. T. Olnowich et al. The Allnode Switching apparatus provides a switching network communication structure that has the characteristic of simplicity of implementation, and does not require data buffering or data conversion of any kind. It establishes or breaks connections instantaneously and is, therefore, dynamically changeable with a very quick response time. It has the capability of resolving requests to establish connections in a parallel manner, where n connections can be established or broken at the same time (where n=the number of elements of the system which are communicating via the switching network). Thus, the number of connections that can be made or broken simultaneously scales directly with the size of the system. This capability enables the invention apparatus to handle multiple short messages very efficiently. In addition, the new apparatus is devoid of synchronization requirements or wire length restrictions. It also has the ability to track the speed improvements of new technologies and to increase performance as the technology used to implement the invention apparatus improves. In addition, the Allnode switching apparatus can be cascaded with other identical apparatus devices to form interconnection networks among any number of system elements or nodes. Said network would have the characteristics for full parallel interconnection.

BRIEF DESCRIPTION OF THE DRAWINGS

FIG. 17 shows a schematic block diagram of the MicroChannel interface portion of the invention MicroChannel Conveder or Switch Adapter function, for the purpose of receiving message data being transmitted from the the multi-stage switch network to the MicroChannel, under the control of an intelligent bus master implementing multiple receiving channels and buffers.

FIG. 18 shows a timing diagram of the conversion of MicroChannel protocol to the multi-stage switch network interface protocol.

DETAILED DESCRIPTION OF THE PREFERRED EMBODIMENTS

Disclosed here is both a 1) MICROCHANNEL BUS TO SWITCH ARCHITECTURE MASTER CONVERTER CHIP, and 2) MICROCHANNEL BUS TO SWITCH ARCHITECTURE MASTER CONVERTER expansion card. Either disclosed apparatus will enable MC based hardware to be efficiently coupled to other MC based hardware by permitting high speed switch interconnection amongst the microchannels of various processors. Thus, using the disclosed chip or expansion card will enable any MC based PC and/or workstation to connect via a switch network to any other MC based hardware. The logic functions required to make the electrical conversion from an existing and limited processor bus to a global switch network is disclosed herein.

The MMC-M invention can be packaged on either a chip or a card and will perform the same electrical conversion function. For today's market, the card is a very appropriate package. MICROCHANNEL BUS TO SWITCH ARCHITECTURE MASTER CONVERTER logic, or the Switch Adapter (SA) for short, being available on the disclosed MC expansion card, makes it possible to customers to connect MC based machines to high speed, parallel, switch networks by merely purchasing a card an inserting it into their machine or machines, and cabling into the switch network which also must be purchased. The more detailed description of this invention is disclosed in the related concurrent application U.S. Ser. No. 07/946,512 entitled, "SWITCH-BASED PERSONAL COMPUTER INTERCONNECTION APPARATUS" by H. T. Olnowich et al.

For future applications, existing processor packages will be compacted and a MICROCHANNEL BUS TO SWITCH ARCHITECTURE SLAVE CONVERTER chip will enable the MC to be adapted to switch networks using a smaller area and smaller cost factor based on a switch-based planar, as disclosed in the concurrently filed related application U.S. Ser. No. 07/946,204 entitled, "SWITCH-BASED MICROCHANNEL PLANAR APPARATUS" by H. T. Olnowich et al.

Figure 1:
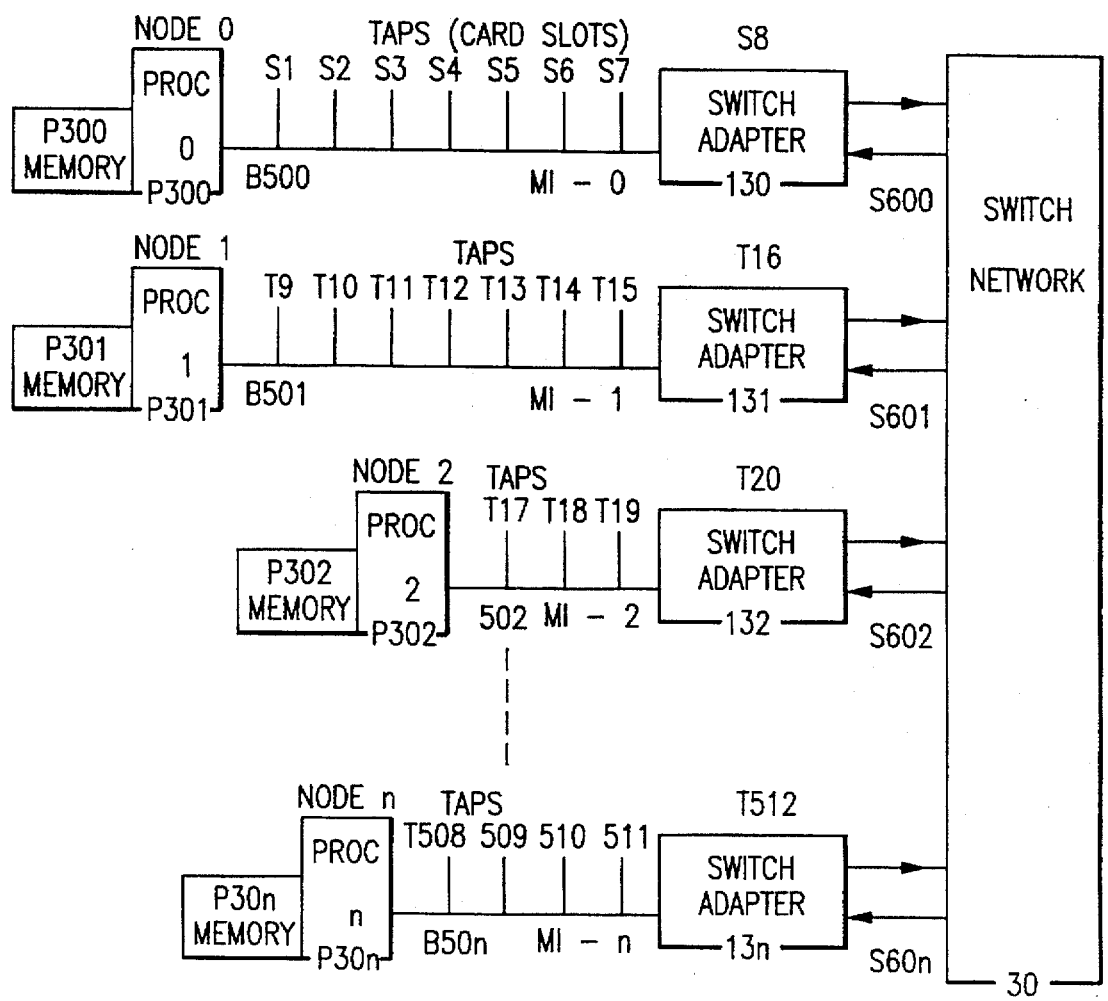
FIG. 1 illustrates generally our preferred embodiment of the present invention of multiple MicroChannel Islands which are multi-drop bus based connections, themselves being interconnected via the present invention which adapts each MicroChannel Island to a multi-stage switching network.

Turning now to the drawings in greater detail, FIG. 1, shows the preferred method of interconnecting n PCs and/or workstations as nodes of a parallel system via the multi-stage switch network 30. The entire system is composed of n individual nodes, where each node is comprised of a PC and/or work-station consisting of a processor with its associated MicroChannel I/O bus. Node 0 is comprised of processor P300 and MC Bus B500, Node 1 is comprised of processor P301 and MC Bus B501, Node 2 is comprised of processor P302 and MC Bus B502, and Node n is comprised of processor P30n and MC Bus B50n, where is is theorectically an unbounded positive integer. Each MC Bus B500 to B50n is connected to an individual MicroChannel Converter unit, with MC bus B500 connecting to MCC 130, MC bus B501 connecting to MCC 131, MC bus B502 connecting to MCC 132, and MC bus B50n connecting to MCC 13n. These individual MC Busses are referred to as MicroChannel Islands, which are separate busses interconnected by a sea of switch network. Each MCC 130 to 13n has second and third interfaces which connect to an input and and ouput port, respectively, of unidirectional switch network 30.

A typical node is shown to consist of a variable number of card slots in the form of taps to/from the MC Bus, with the number of taps being individually selectable at each node and usually being between 1 to 8 taps per MC Bus, depending upon the PC or workstation model being used. The MCC 130 to 13n blocks represent MC expansion cards that require the usage of one of the cards slots on each MC Bus B500 to B50n. The remaining cards slots in each MC Bus B500 to B50n can be populated by any combination of standard MC expansion cards or left unoccupied.

The MCC 130 to 13n cards serves a bridge from the MC to the switch network having both MC and switch interfaces, and the MCC blocks implement the hardware which enables the MC and switch interfaces to work together to transfer data messages to and from the associated node to other nodes connected to switch network 30. The primary function of each MCC unit is to convert node address or memory addresses or I/O addresses presented by the initiating Micro-Channel into a means of locating the exact MI, where the the addressed processor, memory location, or I/O device resides. The MCC block then controls the transferred of data to the selected processor, memory location, or I/O device. The MCC also responds to any network transfers sent to it, and relays the transfer through the MC Bus to the proper destination—processor, memory location, or I/O device. At the destination, the adapter receives a transfer from the switch network and can either interrupt the proper destination tap on the destination MI, or arbitrate for the local MI and send the transfer directly to the addressed tap.

A typical data transfer from one node to another, for instance—node 0 to node 2, would include the following steps. The sending node 0 would communicate to its local microchannel bus B500 using standard microchannel bus sequences. MCC 130 would respond to these sequences and convert them to sequences and protocols which are understood by switch network 30 as communicated over interface S600. Thus, the communication from node 0 is passed over MC bus B500 to MCC 130, which converts the communication format and passes it on to the switch network 30 over interface S600. Switch network 30 is commanded by MCC 130 to form a connection to the receiving node 2, causing network 30 to pass the communication data through switch network 30 onto switch interface S602. The data is then received by MCC 132, converted back into a standard MC format, and passed over MicroChannel bus B502 to receiving node 2.

Interfaces S600 to S60n to and from switch network 30 provide an expansion interface for every PC or workstation, whereby it can communicate to processors, memory locations, and I/O devices which no longer need be resident on its own MicroChannel Island, but can be located anywhere within the interconnection range of switch network 30.

Figure 2:
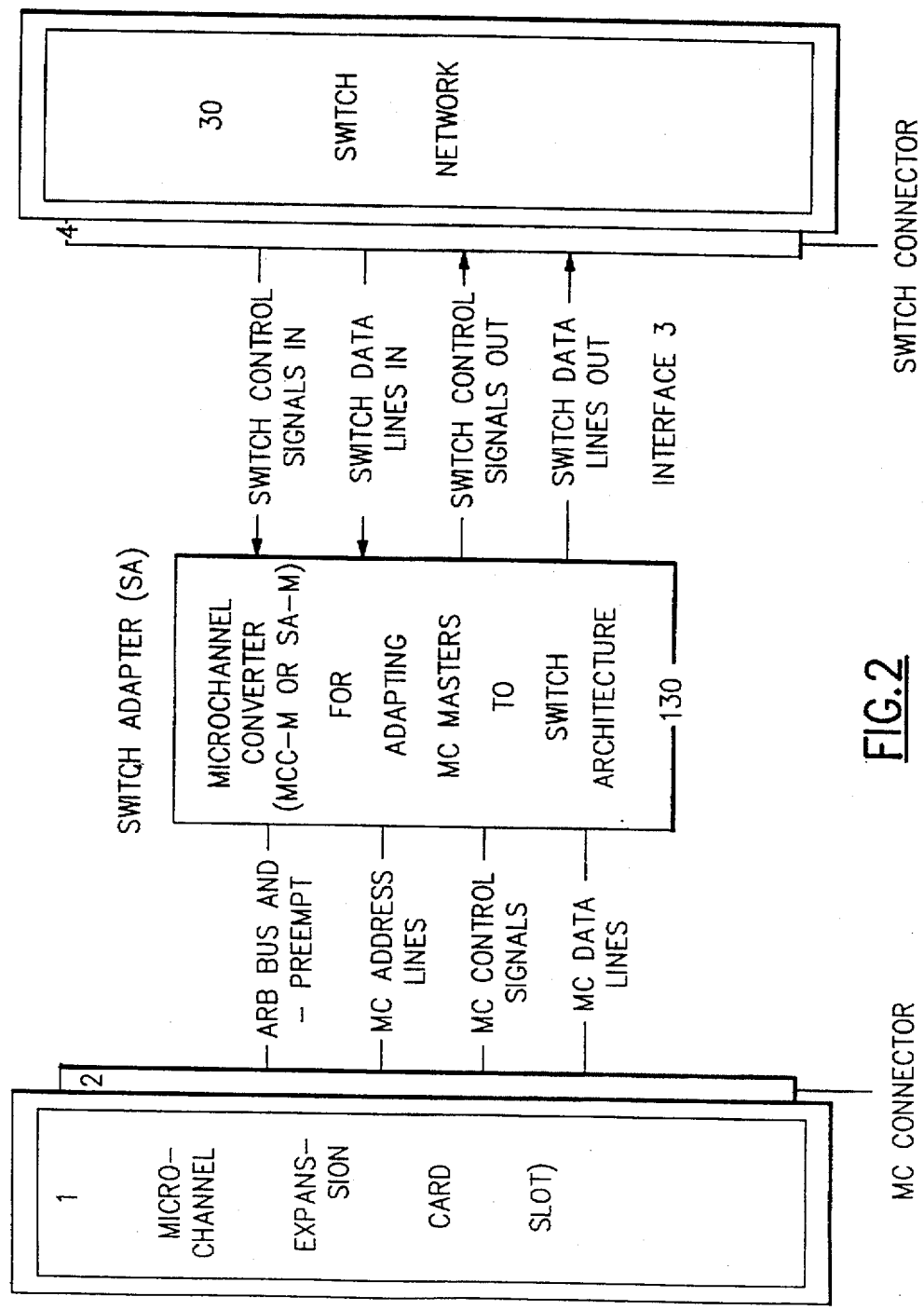
FIG. 2 illustrates generally our preferred embodiment of the present invention by showing a functional diagram of the adaption of MicroChannel bus master interface signals to switch network interface signals.

FIG. 2 shows the preferred embodiment of the present invention of the MICROCHANNEL BUS TO SWITCH ARCHITECTURE MASTER CONVERTER APPARATUS. Block 1 represents any standard MC based hardware, such as PCs or workstations, that present a MC connector 2 for expanding the features of the MC system by makimg available expansion card slots for inserting MC expansion cards. Block 130 presents the disclosed MICROCHANNEL BUS TO SWITCH ARCHITECTURE MASTER CONVERTER logic (MCC-M) packaged on an SA expansion card for insertion into the MC, or packaged on a chip mounted on the concurrently disclosed SWITCH-BASED MICROCHANNEL PLANAR APPARATUS. Block 30 represents a switch network capable of interconnection up to thousands of nodes to form a parallel system, where one typical node is represented by blocks 1, 2, and 130. The logic in block 130 converts the MC bus interface to allow it to communicate with the Switch Network 30. The communication is typically in the form of messages sent from the MC processor in block 1 to the MCC-S logic 130, then to the switch network 30 over the Data and Control OUT signals. Similarly, messages sent from other the MC processors can arrive into block 130 from block 30 over the Data and Control IN signals. Incoming messages are received into block 130 and then sent to the MC processor in block 1.

Figure 3:
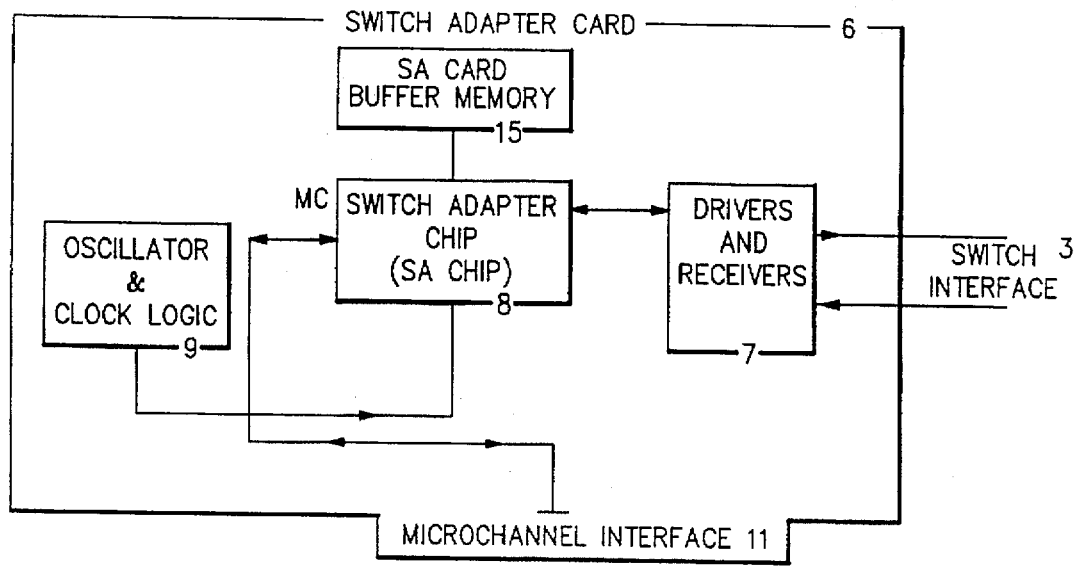
FIG. 3 illustrates our preferred embodiment of the functional layout of the present invention in relation to a disclosed Switch Adapter expansion card for insertion into a PC and/or workstation for the purpose of adapting the MicroChannel protocol and architecture to switch protocol and architecture using the master converter apparatus.
Figure 4:
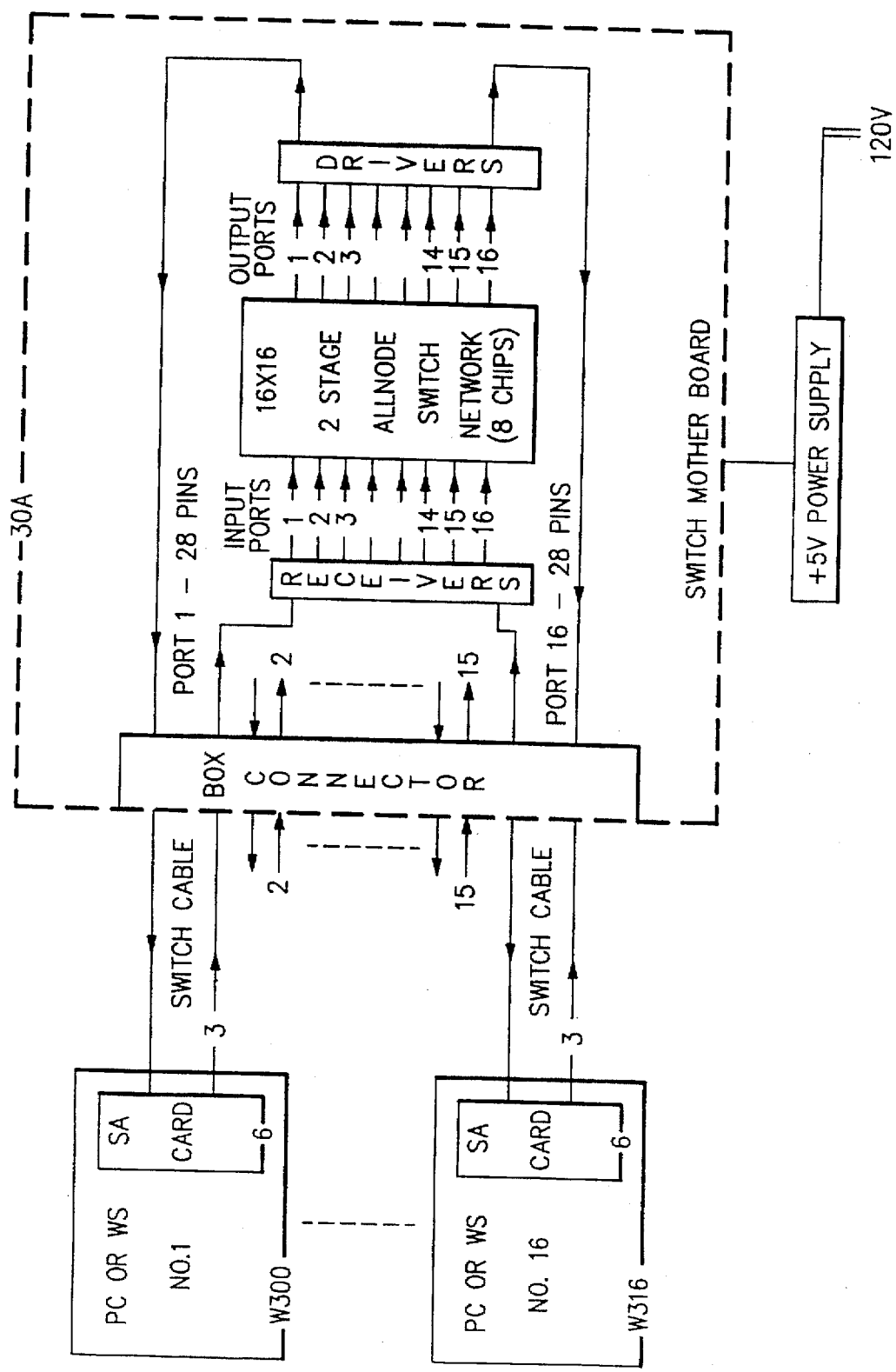
FIG. 4 illustrates our preferred embodiment of the use of functional the disclosed Switch Adapter expansion card for insertion into multiple PCs and/or workstations for the purpose of connecting the MicroChannel Islands to the switch network.

Referring to FIG. 3, the approach shown is to combine the advantages of both the chip and card solutions by defining a SA expansion card 6 that has as its main component the MICROCHANNEL BUS TO SWITCH ARCHITECTURE MASTER CONVERTER (MCC-M) chip 8, referred to as the SA chip 8, which a chip containing the block 130 functions. FIG. 3 shows a layout of the SA Card 6 containing the SA chip 8 plus an oscillator 9, Memory Buffer 15, and driver/receiver parts 7. The SA Card 6 plugs into a standard MC expansion card slot, such as S8 of FIG. 1, via connector 11. In addition, SA card 6 provides a connector from the side of the card to switch interface 3. The SA Card 6 provides a way to connect individual PCs and/or workstations to switch network 30 as nodes. Typically, the switching network 30 of the parallel system are housed in a centrally located package. Referring to FIG. 4, consider the ALLNODE Switch Box as a typically implementation of block 30 of FIG. 1. The Switch Box is capable of communicating with up to 16 PCs and/or workstations (blocks W300 to W316) to form a parallel processing system. A single Switch Box is capable of supporting full interconnection amongst up to 16 nodes using the network shown in FIG. 7. In addition, the Switch Box has the capability of being cascaded with other similar Switch Boxes to interconnect up to thousands of PCs and/or workstations.

Each PCs and/or workstation node W300 to W316 is individually connected to the Switch Box 30A through one SA Card 6 as shown in FIG. 3. The SA Card 6 is resident in every node W300 to W316 in one of the standard expansion card slots provided by that machine, and is used to make a connection to the Switch Box over a coax cable interface 3 of any length from 1 to 100 feet. The interface 3 requires 14 signals and 14 grounds. The cable interconnection provides two unique uni-directional 7-signal interfaces, one from the each node W300 to W316 to the Switch Box and one from the Switch Box to the to each node W300 to W316.

The distributed and fully parallel switch utilized in the preferred embodiment of the present invention the ALLNODE Switch (Asynchronous, Low Latency, inter-NODE switch), which is disclosed in U.S. Ser. No. 07/677,543 and adapted by the present invention to perform the switching of serial data lines at low latency and high bandwidths. The ALLNODE switch provides a circuit switching capability at high bandwidths similar to the switch fabric in the central matrix controlled switches; however, the ALLNODE switch includes distributed switch path connection set-up and teardown controls individually within each switch-thus providing parallel set-up, low latency, and elimination of central point failures.

It is here understood that the FIGS. 5 to 11 are illustrations which are common to U.S. Ser. No. 07/677,543, the parent application which is incorporated herein by reference as to all of its contents. FIGS. 5 to 11 refer to a 4×4 crossbar implementation of the ALLNODE Switch to illustrate the principles and speed of the switching concept.

Figure 5:
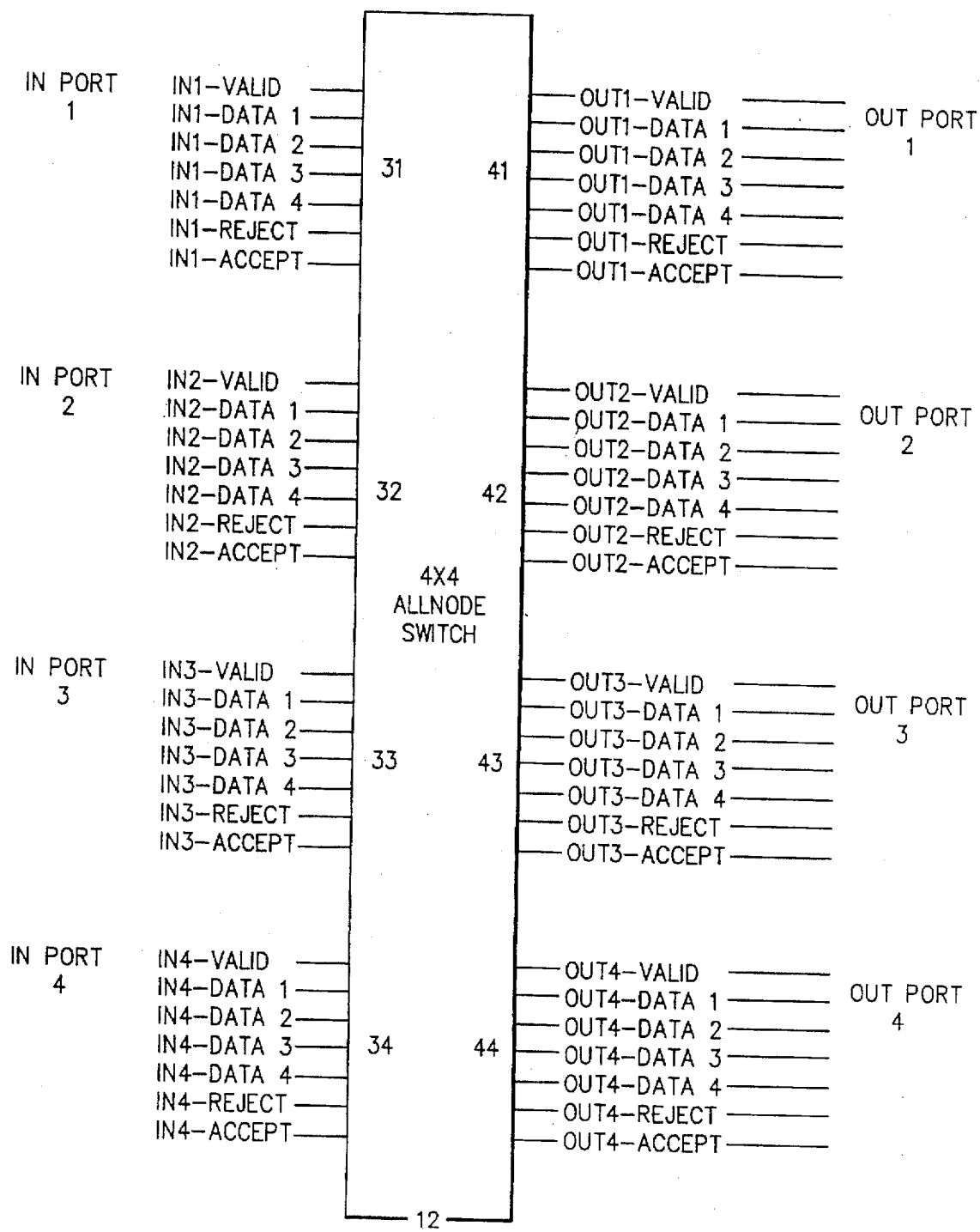
FIG. 5 illustrates a four input and four output (4×4) crossbar switching apparatus, which has the capability of providing the disclosed fully parallel switching means for interconnecting up to four nodes.

Referring to FIG. 5, the preferred embodiment is a 4×4 switching apparatus 12, where the function of the present invention is to provide a means of connecting any of 4 sets of input signals on a mutually exclusive basis to any one of the unused 4 output ports. The 4×4 switching apparatus 12 can support up to 4 simultaneous connections at any given time. For instance, Input 1 could be connected to Output 3, Input 2 to Output 4, Input 3 to Output 2, and Input 4 to Output 1.

The invention switching apparatus 12 is unidirectional, which means that data flows in only one direction across the said switching apparatus 12, that being from input to output. Switching apparatus 12 interfaces are defined in detail in FIG. 5. The set of lines 31, 32, 33, and 34 at each in-port to the switching apparatus 12 are identical in number and function to the set of lines 41, 42, 43, and 44 at each out-port. The sets of interface lines to each input and output port contain seven unique signals: 4 digital data lines, and 3 digital control lines (VALID, REJECT, and ACCEPT). The signals at each port are differentiated by a prefix of INX- or OUTX-indicating the direction and number of the port (X) that they are associated with. The four digital data and one VALID lines have a signal flow in the direction going from input to output across switching apparatus 12, while the digital REJECT and ACCEPT control lines have a signal flow in the opposite direction.

Each unidirectional switch interface 3 set requires only 7 signals, as shown in FIG. 2, to transmit and control and data through the network 30—the digital data and control transfer width is ½ byte (4 bits) at a time. The signals required are:

DATA:

4 parallel signals used to command switch connections and transmit digital data messages or digital control headers.

VALID:

When active, indicates that a digital message, control header, or analog waveform is in the process of being transmitted. When inactive, indicates a RESET command and causes all switches to reset to the IDLE state.

REJECT:

Signal flow is in the opposite direction from the DATA and VALID signals. When active, it indicates that a REJECT or error condition has been detected.

ACCEPT:

Signal flow is in the same direction as the REJECT signal. When in the low state, it indicates that a message is in the process of being received and checked for accuracy. When active, it indicates the message has been received correctly.

Figure 6:
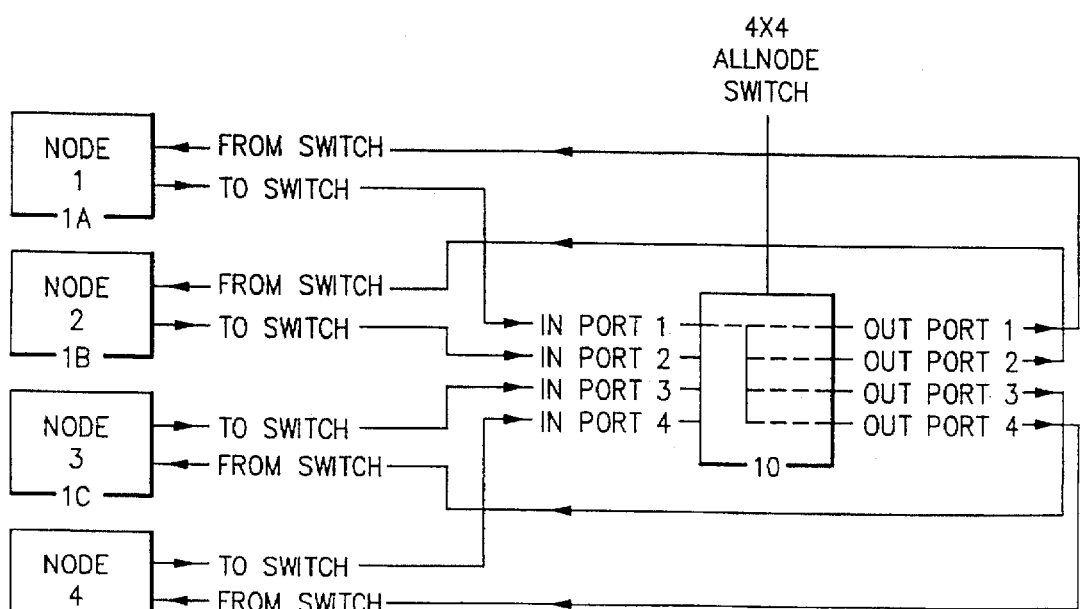
FIG. 6 illustrates the interconnections required to a four input and four output (4×4) crossbar switching apparatus to provide full interconnection amongst four nodes.

As illustrated by FIG. 6 the ALLNODE switching apparatus would be provided for a node having a plurality of input and output ports, and would comprise the connection control circuit for each input port, and a multiplexer control circuit for each output port for connecting any of I inputs to any of Z outputs, where I and Z can assume any unique value greater or equal to two, as in the parent application.

FIG. 6 shows a 4×4 crossbar ALLNODE switching apparatus, where the ALLNODE switching apparatus 10 is unidirectional, which means that data flows in only one direction across the said switching apparatus 10, that being from input to output. Although the said switch apparatus 10 is unidirectional, it supports bidirectional communication amongst four 140 nodes (20, 22, 24, and 26) by connecting the 4×4 ALL-NODE switching apparatus 10 as shown in FIG. 6. Each node 20, 22, 24, and 26 has two sets of unidirectional interconnecting wires, one going to the switch 10 and one coming from the switch 10. The dashed lines internal to the switching apparatus 10 indicate that the function of the said switching apparatus is to connect an input port such as INPUT PORT 1 to one of four possible output ports. The switching apparatus 10 provides exactly the same function for each input port, allowing it to be connected to any unused output port.

Figure 7:
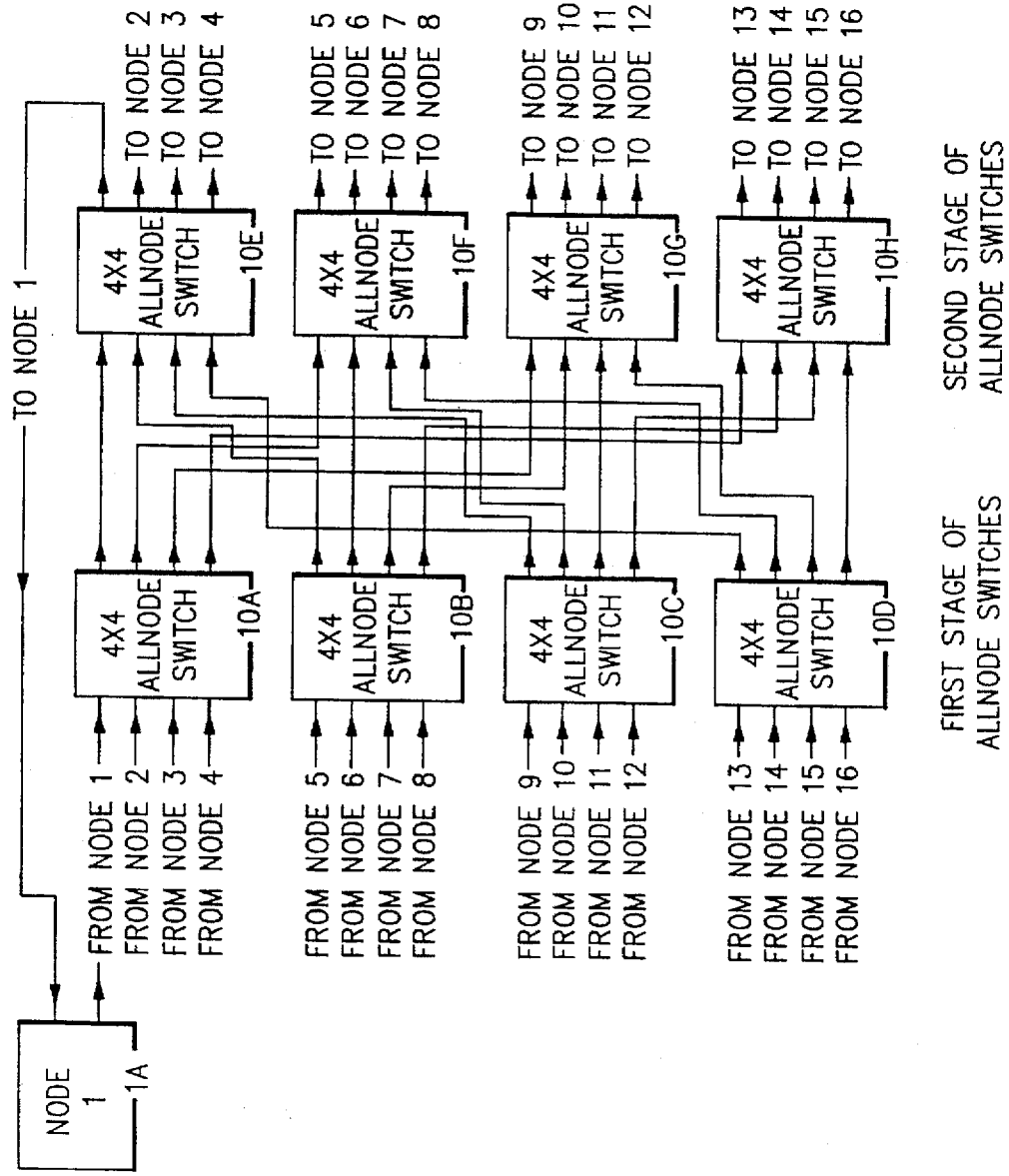
FIG. 7 shows a typical method for cascading the 4×4 disclosed embodiment of the invention switching apparatus to accomodate systems having more than 4 nodes.

Referring to FIG. 7, a method is illustrated for modularly increasing the number of nodes in a system by cascading eight switching apparatus 10 blocks. The eight cascaded switches are denoted as 10A through 10H to indicate that they are identical copies of switching apparatus 10, varying only in regards to the wiring of their input and output ports. It can be noted that any of sixteen nodes can communicate to any other node over a connection that passes through exactly two of the switching apparatus 10 blocks. For instance, Node 5 can send messages to Node 15 by traversing switch 10B and switch 10H. Since all connections are made through two switching apparatus 10 blocks, the network comprised of the eight switching apparatus 10 blocks is referred to as a two stage switching network. Other multi-stage networks can be configured from switching apparatus 10 blocks by using three stages, four stages, etc. in a similar manner. Thus, this network can be used to modularly increase the size of a parallel system comprised of PCs and/or workstations as nodes by simply changing the size of the switch network 30 and adding more PCs and/or workstations to interconnect to the expanded number of switch network ports.

Figure 8:
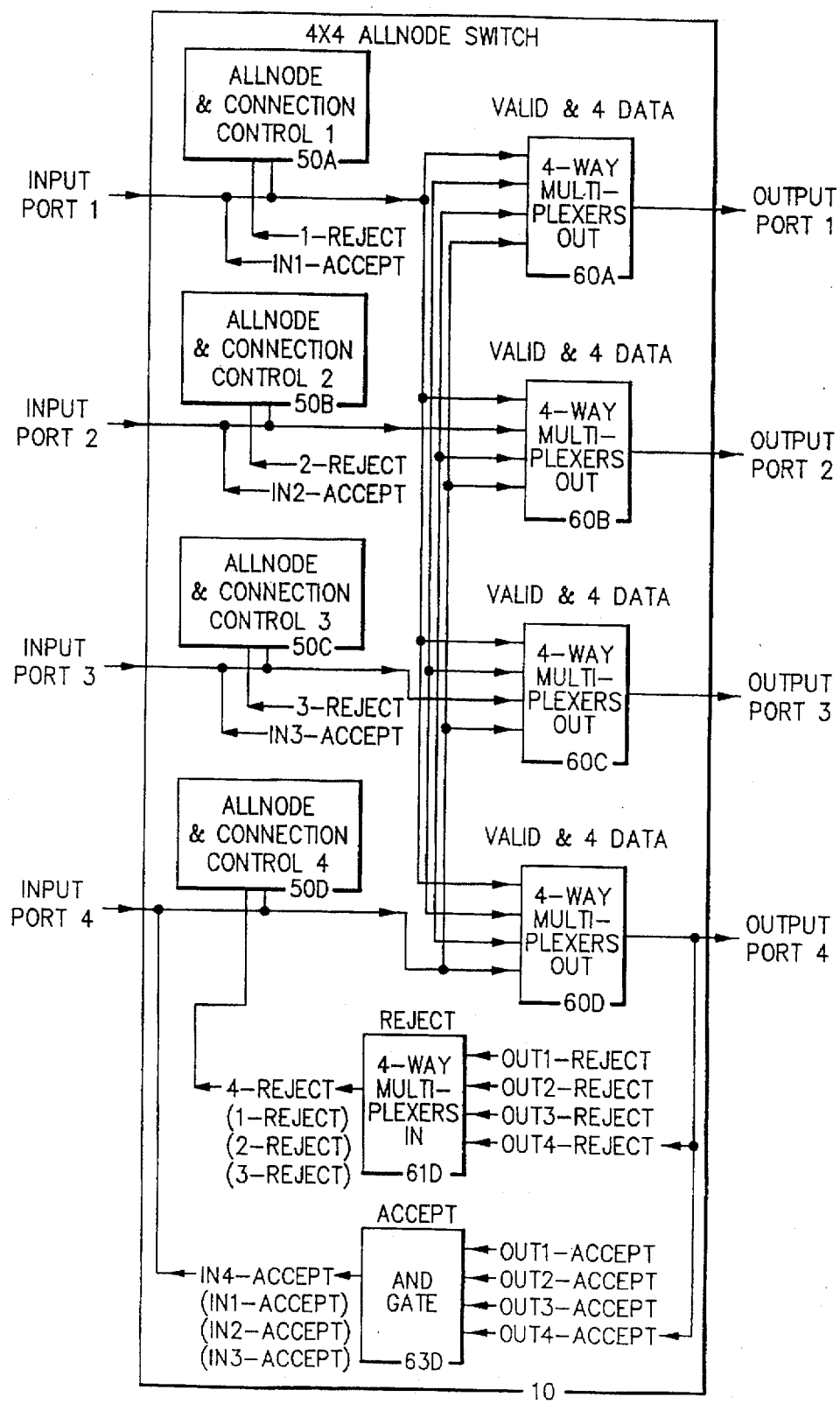
FIG. 8 shows a schematic block diagram of the simple digital data flow and control path implementations of the 4×4 crossbar switching apparatus, which has the capability of being used with the present invention to provide fully parallel switching means for interconnecting up to four system nodes for the purpose of transferring digital data.

Referring to FIG. 8, a functional diagram of the simple data flow across ALLNODE switching apparatus 10 is illustrated. The VALID and four data lines at each input port, inside the switch, and at each output port are represented by a single line in FIG. 8 for simplicity. For instance, the VALID and four data lines entering switch 10 at IN PORT 1 go to five internal functional blocks of switching apparatus 10; these are blocks 50A, 60A, 60B, 60C, and 60D. Block 50A makes the decision as to which of the four possible output ports are to be connected to input port 1. The VALID and four data lines from each input port go to each output multiplexer block (60A, 60B, 60C, and 60D); this makes it possible to connect any input port to any output port. Each of the four output multiplexer blocks (60A, 60B, 60C, and 60D) is uniquely commanded from each of the control blocks (50A, 50B, 50C, and 50D) as to which of the four possible sets of input port lines is to be gated through to each output port. For instance, control block 50A can command multiplexer 60C to connect input port 1 to output port 3; control block 50B can command multiplexer 60A to connect input port 2 to output port 1; and control block 50C can command multiplexers 60B and 60D to connect input port 3 in a multi-cast fashion to output port 2 and output port 4. All three connections are capable of being established simultaneously or at different times. At the same time that multiplexers 60A to 60D form connections to move the VALID and data signals across switch 10 with a unidirectional signal flow from input port to output port, multiplexer 61D and AND gate 63D form signal connections for the REJECT and ACCEPT signals, respectively, with a signal flow in the opposite direction of output port to input port (typical implementations are shown by blocks 61D and 63D—similar blocks are associated with each input port). These REJECT and ACCEPT signals provide a positive feedback indication to switch 10 of actions taken either by subsequent switch 10 stages in a cascaded network or by the device receiving and interpreting the VALID and four data signals. A control header or digital message being transmitted through switching apparatus 10 over the four data signals under control of the VALID signal can be REJECTed by any network stage if it is unable to establish the commanded connection or by the receiving device if it is not capable of receiving the message at this time or if it detects an error in the transmission. The receiving device also has the capability of confirming the correct arrival of a command or message (without errors being detected) by pulsing the ACCEPT signal. Since the REJECT and ACCEPT signals go in the opposite direction from the data flow, they provide a means of reporting back a positive indication to the sender on whether the attempted transmission was received correctly or rejected.

Figure 9:
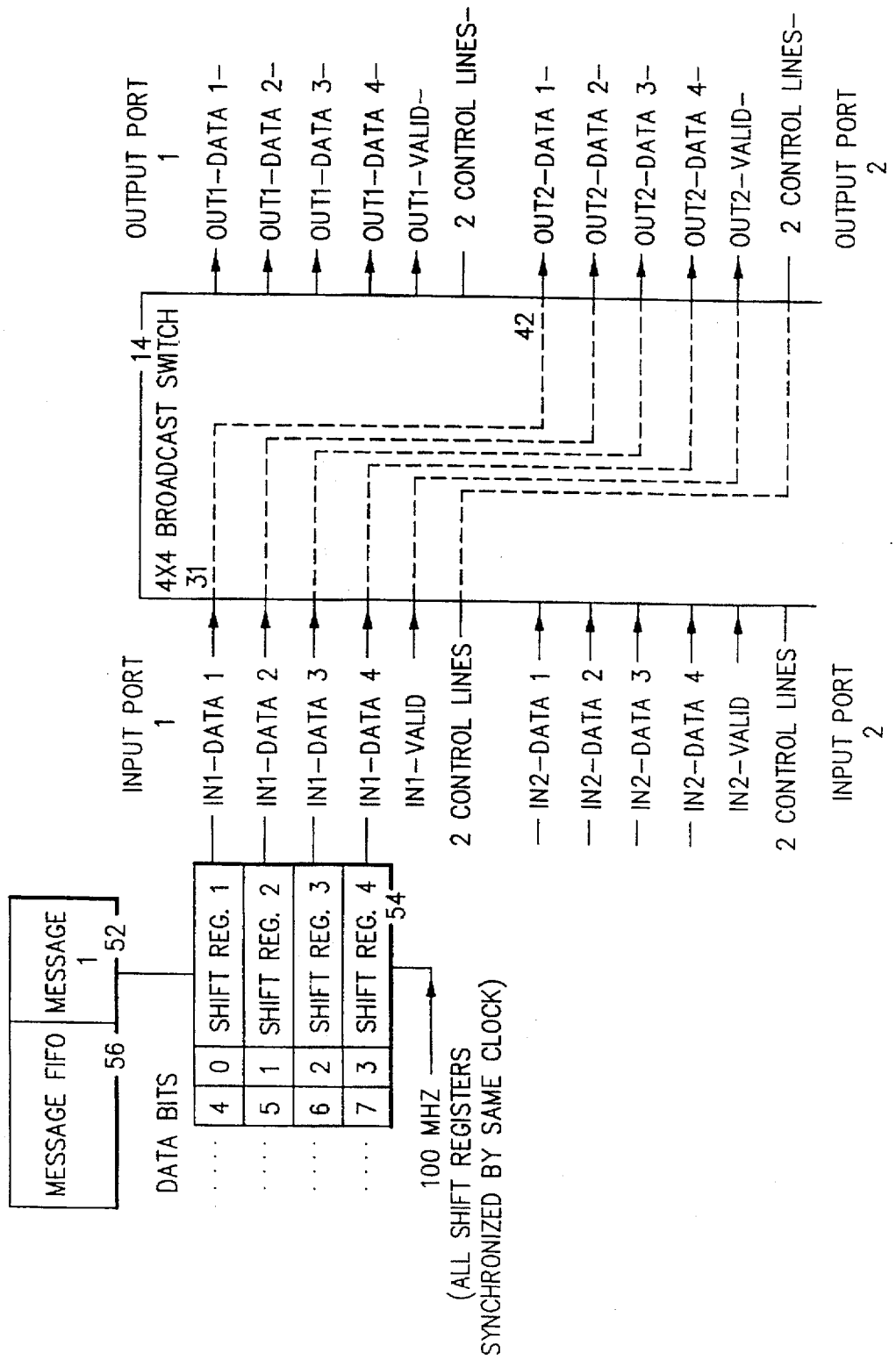
FIG. 9 illustrates a typical method for generating parallel control and and multiple line serial digital data information to be sent to the 4×4 prior parent embodiment of the invention switching apparatus over four synchronous data lines.

Referring to FIG. 9, blocks 56, 52, and 54 illustrate a typical method for generating multi-line (parallel)/serial digital data in the form of a message which can be transmitted to and across switching apparatus 14, which is a partial drawing of the switching apparatus 12. Similar parallel/serial data generation logic as provided by 56, 52, and 54 can be used at each of the other input ports to switching apparatus 12. Each set of input data lines provides 4 serial data lines to a given input port which is synchronized to the same clock by the four shift registers 54 which create the parallel/serial data by shifting four synchronized lines of data 31 as controlled by the same identical clocking signal (100 MHZ in FIG. 6). However, the four different input port sources (31, 32, 33, and 34) to switching apparatus 14 can be asynchronous to each other, being based on different, non-synchronized, 100 MHZ clocking signals.

The process for sending parallel/serial messages through switching apparatus 14 involves FIFO 56, which accumulates data messages to be transmitted. The next entire message to be transmitted is moved to buffer 52. The message stored in buffer 52 is moved to shift registers 54 in preparation for transmittal and the data is dispersed across the four shift registers 54 by placing data bit 0 into the first bit of shift register 1, data bit 1 into the first bit of shift register 2, data bit 2 into the first bit of shift register 3, data bit 3 into the first bit of shift register 4, data bit 4 into the second bit of shift register 1, etc. Shift registers 54 then begin to send serial data to switching apparatus 14 over four synchronized data lines, in such a manner that the parallel/ serial data flows continuously until the entire message has been transmitted. The switch apparatus 14 uses the first eight bits transmitted (in the first two clock cycles of serial data over interface 31 from serial registers 54 to switching apparatus 14) to select and establish a connection path through the switching apparatus 14. The example in FIG. 9 illustrates via dashed lines, the switching apparatus establishing a temporary connection between input port 1 (31) and output port 2 (42), such that each of the eight individual lines in interface 31 are uniquely and directly connected to each of the corresponding lines in interface 42.

Figure 10:
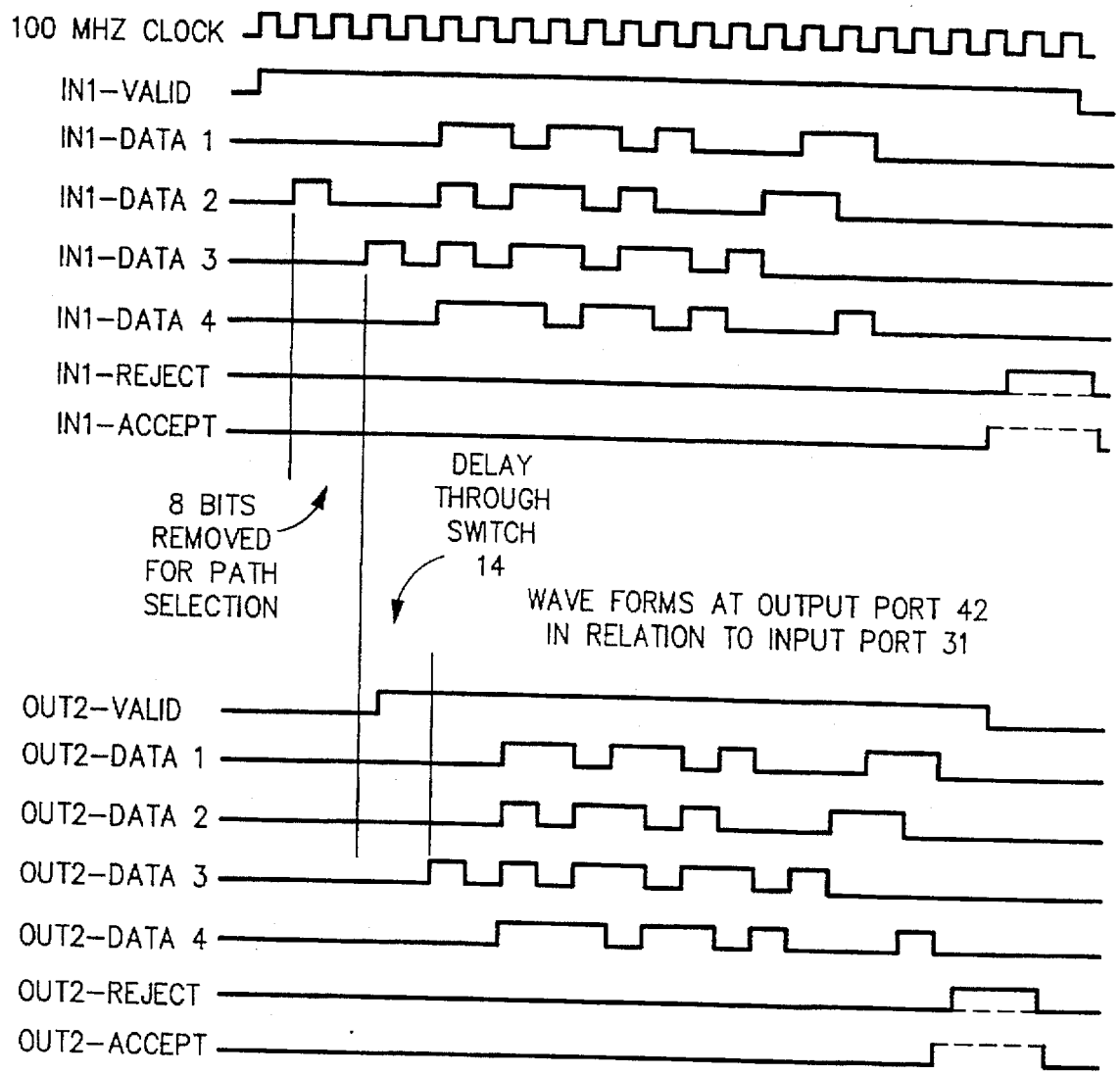
FIG. 10 shows a typical timing diagram for routing the digital interface signals arriving at one input port of the 4×4 prior parent embodiment of the invention switching apparatus to one output port.

Referring to FIG. 10, typical serial waveforms are shown for both input and output ports of the switching apparatus 14. The switch removes the first 8 bits of the serial transmission as sent by shift registers 54 and uses them to make and hold a connection, such as interface 31 to interface 42. The remainder of the serial message in our example is transferred directly from interface 31 to interface 42, so that interface 42 sees that exact same message that interface 31 receives, minus the first 8 bits and delayed by the circuit delays encountered by the serial data as it traverses the switching apparatus 14. Switching apparatus 14 does not buffer or re-clock the serial data entering via interface 31 in any manner; it merely reflects as quickly as possible the input waveforms it receives over interface 31 to output interface 42 without changing them in any way, except to strip off the first 8 bits.

The convention for indicating to a switch 14 input port over an interface (such as 31) that there is no transfer in progress, is to issue continuous IDLE commands, which are denoted by the 4 data lines and the VALID control line being held at logical 0's. The detection of a logical 1 on any of the input lines will signify the departure from the IDLE state and signify to the switch that a selection and transfer is beginning. Likewise, the output lines from the switch will be held in the IDLE state (at all 0's), when there is no active transfer in progress.

In general, all switches require a path selection method, whereby they are commanded which connection (input port to output port) to establish. For switching apparatus 10, the path selection command is transmitted to the switch over the same interface that the data is transferred; i.e., the 4 data lines associated with each input port. Selection information must be transferred prior to the data, so that the commanded interconnections can be established and the data can then flow to the commanded destination. The selection information need NOT identify an input port number (1 to 4), because it is arriving at the switch over a specific input and the switch already knows what input number it is receiving data on. Therefore, the selection information need ONLY specify the number (1 to 4) of which one of the four output ports of switching apparatus 10 to which to connect. The method of path selection recommended here is one out of N encoding with a return to zero (called a DEAD FIELD).

Figure 11:
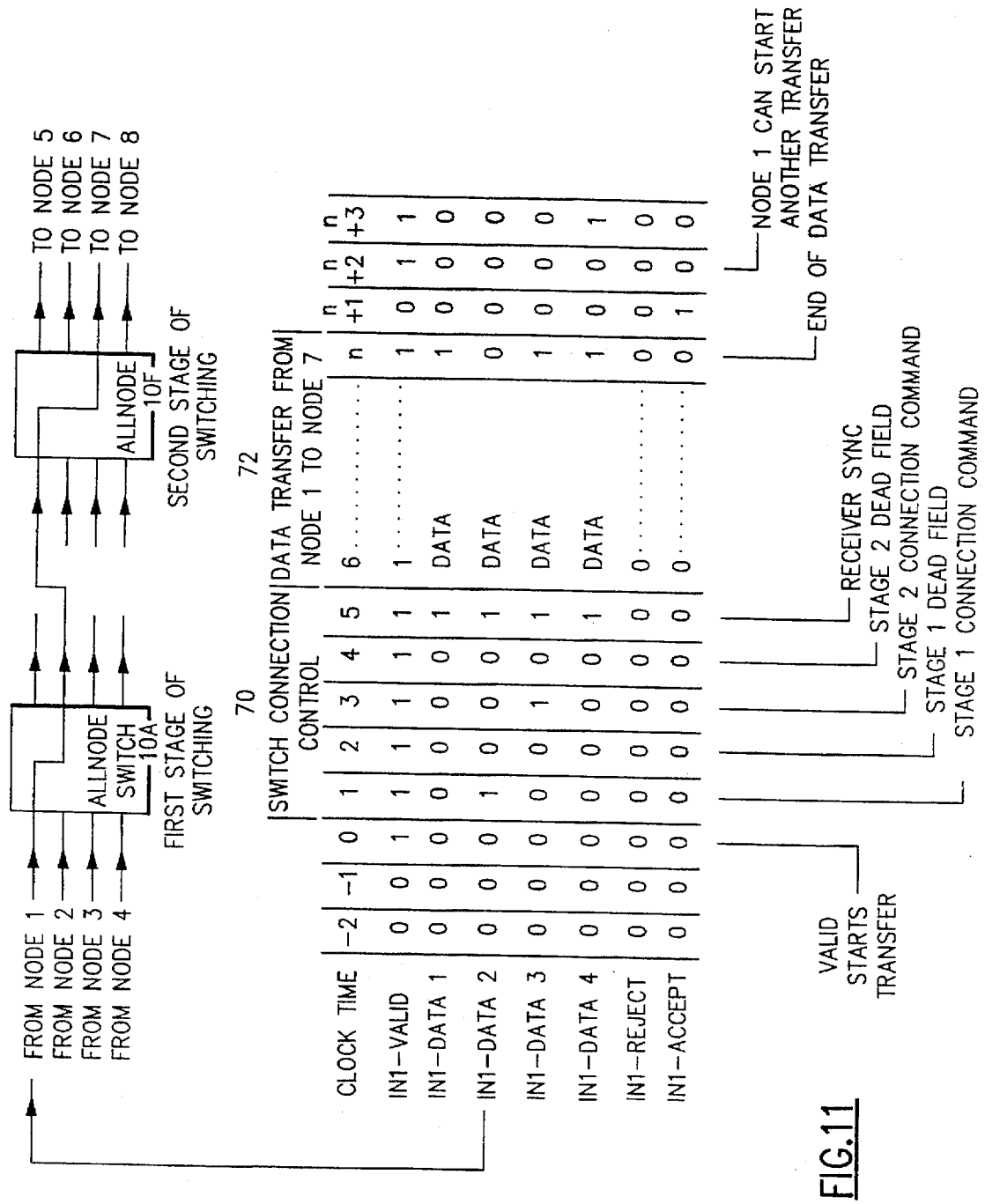
FIG. 11 illustrates the typical method of selecting and establishing a transmission path through a network comprised of the invention switching apparatus for the purpose of sending digital data from one node to another.

Referring to FIG. 11, a typical example of the exact serial bit patterns and control signal activation is shown for sending control and digital data information to switching apparatus 10. The example references the cascaded, two stage switching network shown in FIG. 7 and involves sending data across the network from node 1 through switching apparatus 10A and 10F to node 7. To make this connection, input port 1 must be connected to output port 2 of the first stage switching apparatus 10A, and input port 1 must be connected to output port 3 of the second stage switching apparatus 10F. The signal sequence that is sent to input port 1 to cause the desired connections in switching apparatus 10A and 10F is shown in FIG. 7. In the signal sequence of 1's and 0's, time advances from left to right, so that the values seen at clock time −2 arrive at switch 10A first, and the values at clock time −1 arrive second, etc. The values of the IN1-DATA and IN1-VALID lines are all zeroes and cause nothing to happen at switch 10A during times −2 and −1, because they indicate IDLE. At clock time 0, the IN1-VALID line goes to a logical 1. This prepares switch 10A by enabling the input port 1 to receive data, but no connection or action takes place at switch 10A at this time. The IN1-VALID control line basically enables the corresponding switch input port; when IN1-VALID is a logical 0, switch 10A cannot make any connections or receive any data from input port 1, which is held RESET. Finally, at clock time 1, switch 10A receives its command as to what output port to connect to; the command is received entirely during clock time 1.

The command bit pattern sent at clock time 1 is used by switch 10A to establish connection to an output port; this process is referred to as a path selection operation and takes place completely internal to switch 10A. The path selection approach implemented by the present ALL-NODE switch invention is to let each of the 4 IN1-DATA lines to define a unique output of switch 10A to be selected. For instance, IN1-DATA1 signal going to a logical 1 at time 1 tells switch 10A to connect to output port 1, IN1-DATA2 commands connection to output port 2, etc. In our example, since IN1-DATA2 goes to a logical 1 during clock time 1, switch 10A is thereby commanded to connect to output port 2. In other words, the connection algorithm is that the first data input line going to a logical 1 after an input port has been enabled, defines the connection which that input port is to make. This is a mutually exclusive process, in that for the normal case only one data line at clock time 1 is allowed to be a logical 1; the other 3 data lines must be 0's. Note that since 1 bit of selection information is guaranteed to be a logical 1, switch 10A will be able to recognize the start of a transmission without requiring any additional bits to signify that a transfer is commencing. The switch 10A makes the commanded connection by removing the 4 bits from the data lines and storing them in a selection register in control block 50A of FIG. 8. The bits transmitted during clock time 1 are not passed through switch 10A to switch 10F, but instead switch 10A begins passing the very next 4 bits of data corresponding to clock time 2 to the next switch 10F. However, the information bits following a selection command (those transmitted by the 4 data lines at clock time 2 in our example) must always be all zeroes (a DEAD FIELD) as shown in FIG. 11. The purpose of this will be explained subsequently.

At clock time 2, the connection of switch 10A input port 1 to output port 2 is established and causes the signal sequence at clock time 2 to be transmitted across switch 10A and the interconnecting wires to switch 10F input port 1. From this time on, switch 10A merely transmits all subsequent data immediately to switch 10F input port 1; it never examines or takes any action on any other data patterns presented to switch 10A over its input port 1 interface. It just passes all data patterns it receives over input port 1 immediately to the output port 2 and switch 10F. Thus, at clock time 2, assuming zero delay across switch 10A and its associated cable, switch 10F input port 1 sees the VALID signal rise and the all zeroes DEAD FIELD on the 4 data lines coming into switch 10F input port 1. In this way, at time 2, switch 10F input port 1 is enabled in an identical manner to the way switch 10A input port 1 was enabled previously at time 0.

In our example, IN1-DATA3 goes to a logical 1 during clock time 3 and switch 10F is thereby commanded to connect its input port 1 to its output port 3, in a manner similar to the way switch 10A was commanded to connect its input port 1 to its output 2 during clock time 1. The switch 10F in making the commanded connection, removes the 4 bits at clock time 3 from the data lines, and stores them in the selection register which is part of control block 50A of FIG. 5. The bits transmitted during clock time 3 are not passed through switch 10F to Node 7, but instead switch 10F begins passing the very next 4 bits of data corresponding to clock time 4 to Node 7. However, the information bits following a selection command (those transmitted by the 4 data lines at clock time 4 in our example) must always be all zeroes (a DEAD FIELD) as shown in FIG. 11. Thus, by clock time 4, switches 10A and 10F have established a connection path for transferring data directly from Node 1 to Node 7. Up to clock time 5, Node 7 sees nothing but IDLE commands. At time 4, Node 7 sees the OUT3-VALID line from switch 10F go active and is thereby enabled to start receiving data at time 5. From time 5 on, Node 7 can receive data from Node 1 over the 4OUT3-DATA lines from switch 10F. The protocol of the actual data being transmitted can be any of the normal formats such as manchester encoded, 8/10 bit encoding with preamble, etc. However, the preferred embodiment, as shown in FIG. 10 is an all ones synchronization field at time 5, followed by the NRZ data message. The data message can specify the word count length of the transfer. The purpose of the synchronization field of all ones as a prefix to the actual data message, is to enable the receiving node 7 to synchronize to the sending node 1 in one clock time. This assumes that the two nodes involved in the data transfer have clocking systems that are asynchronous to each other, but are operating at the same frequency within a specified tolerance.

The preferred embodiment is to transmit the word count length of the message first during clock time 6 and clock time 7. Node 7 then decrements the length count and can detect when the transfer is complete. Node 7 can then check the message for accuracy using the selected error detection method (parity, ECC, or CRC). If the message has been received correctly, Node 7 responds by activating the ACCEPT interface line back to switch 10F at clock times n+1 and n+2. Switch 10F passes the ACCEPT indication back to switch 10A, which in turn returns it immediately to Node 1. This indicates to Node 1 that the transfer completed successfully, and Node 1 resets its VALID and 4 data lines to switch 10A to zeroes, thus, completing the data transfer and returning to the IDLE state. The IN1-VALID input line to switch 10A going to a zero at time n+3, causes switch 10A input port 1 to break its connection to output port 2 and to return to the IDLE state. Immediately, switch 10F sees its IN1-VALID input line go to a zero, breaks its connection to output port 3 and returns to the IDLE state. Thus, the connections can be broken and the switches returned to IDLE in as little as one clock time. If Node 1 has another message to transmit, it can load the next message into buffer 52 and shift registers 54 (FIG. 6), and begin transmission to Node 7 or any other node as soon as time n+4. The only restriction is that the VALID signal generated by Node 1 must return to zero for a minimum of one clock time (time n+3)to signify the end of one transfer before beginning another.

If Node 7 finds an error in the message it has received after the word count has gone to zero at clock time n, it responds by activating the REJECT interface line (instead of ACCEPT) back to switch 10F. Switch 10F uses the incoming REJECT signal from Node 7 to break its connection to Node 7, to return to the IDLE state, and to pass the REJECT indication back to switch 10A, which in turn returns it immediately to Node 1 after breaking its connections and returning to IDLE. Node 1 then notes that the transfer has been rejected, and returns to the IDLE state by resetting its VALID and 4 data lines to switch 10A to zeroes. Node 1 may then retry the transmission by reloading shift registers 54 from buffer 52 and starting the transmission over again from the very beginning (clock time −1). The retransmission can occur over the identical path as the previously rejected transmission, or if alternate paths through the network are implemented another path can be tried. If continuous REJECTs are encountered, such that a specified number of REJECTs occur for the same message, an error reporting mechanism may be invoked.

It is also possible for any switch 10 in a network path to REJECT a message. This can occur for either of two cases:

1) BUSY—If the output port to which the switch is commanded to connect is BUSY (i.e., it is being used by a previously established connection), the switch will signify this condition to the input port issuing the command by activating the REJECT line back to the previous network stage or to the transmitter (if the first stage of the network detects BUSY). For instance, in the example shown in FIG. 8, if 10A had received a command at clock time −2 to connect input port 4 to output port 2, that connection would have been active when input port 1 requested to be connected to output port 2 at clock time 1. In this case, output port 2 is BUSY at clock time 1 and switch 10A would activate the IN1-REJECT line to Node 1. As described above, the transmitter may retry any REJECTed message.

Likewise, the connection could be made successfully at switch 10A, yet output port 3 of switch 10F could be BUSY at clock time 3, causing switch 10F to issue the REJECT signal to switch 10A. This, in turn, causes switch 10A to return REJECT immediately to Node 1 after breaking its connections and returning to IDLE.

2) Simultaneous CONTENTION—Rather than input port 4 establishing a connection to output port 2 in switch 10A at clock time −2 as described above (in advance of the same command from input port 1 at clock time 1), it is possible for two or more input ports to try to connect to the same output port at approximately the same time. This is called CONTENTION for an available output port. For instance, suppose input ports 1 and 4 both sent simultaneous commands at clock time 1 requesting to be connected to output port 2. The present invention resolves this contention by first connecting both contending input ports 1 and 4 to output port 2. The net effect is to electrically connect the 2 input ports to output port 2, which will logically OR the signals coming from both sources. During clock time 2 the logical OR of the 2 input ports will NOT cause an error, because the values present on both input ports 1 and 4 are identical: the VALID lines for each are logical 1's and the data lines for each contain the DEAD FIELD (logical 0's). However, at clock time 3, the signals from each source could be different and an error could be caused if the 2 input ports both remained connected at clock time 3 and later. In other words, switch 10A has 1 cycle time (clock time 2) to correct the decision it made to connect two or more inputs to the same output. Switch 10A makes this correction during clock time 2 by detecting the fact that more than one input is connected to a given output. It then takes action by resetting all but one of the multiple connections, and does this before clock time 3 occurs. The decision of which connection(s) to reset and which one to keep is a decision based on priority. For the preferred embodiment, a simple priority scheme is used as follows: If input port 1 is contending it gets the connection, If input port 1 is not contending and input port 2 is, input port 2 gets the connection. If input ports 1 and 2 are not contending and input port 3 is, input port 3 gets the connection. Input port 4 gets the connection only if no other input port wants it. Applying the priority selection to our example, input port 1 gets to keep its connection to output port 2, while the connection of input port 4 to output port 2 is reset during clock time 2. This results in the REJECT signal being issued in the normal fashion from switch 10A to input port 4.

Thus, the purpose of the DEAD FIELD in the present invention is to allow one clock time per switch stage to resolve simultaneous contention. The secondary purposes of the DEAD FIELD are to cause a falling edge on the selection bit which was active during the previous clock time, and to compensate for timing skew which might be present across the 4 data lines carrying serial selection data to the cascaded switches. Both the rise and fall of data bits commanding the switches to make connections gives the unclocked switch two clock edges (rise and fall) on which it can trigger and make decisions. These are the only two decision making times available to the ALL-NODE switch.

Data in the form of a message may be sent via switch network 30 from any node connected to network 30 to any other node connected to network 30. The destination of each message is specified by a destination ID number indicating which node is to receive the message. The destination ID (DID) number is equal to the physical node number of the node attached to the network and is independent of the source of the message. For instance, any node 1 to 16 wishing to send a message to node 10, sends the message to DID=10. The DID is used to route the message to the correct path in the network, so that it arrives at the proper destination only (in this case, node 10). The DID is the binary representation of the destination node number segmented into two two-bit binary values to form the routing information for the network, with each two-bit value being decoded and sent over the 4 DATA lines as a Stage Connection Command for controlling the routing of one stage of the switch network, as shown in FIG. 11. The values occur in 2-bit coded groups because two bits are required to select one of the four possible output ports at each 4×4 switch 10. For instance, for the two-stage network shown in FIG. 7, the four- bit binary representation for destination ID number 10 is (10,01), where the first 2 bits (10) indicate the output port that is to be selected in switch stage 1; and the second two bits indicate (10) as the output port that is to be selected in switch stage 2. If, as an example, node 1 wishes to send a message to node 10, the output port selected in switch stage 1 would be the third output port down on the right hand side of the switch 10A (corresponding to the selection value for stage 1 (10)). Node 1 forms a connection through switch 10A to the first input port of switch 10G of FIG. 7. Next switch 10G is commanded to make the connection to its second output port via the second 2-bit binary value (01)— where node 10 is located. Thus, the connection from node 1 to node 10 is completed, based only on the binary representation of the destination DID number if the node numbering starts with node 0, or the destination DID number minus 1 if the node numbering starts with node 1.

The present invention connects MC Master interfaces to switch network 30 interfaces. Turning now to the MC Master interfaces, the MicroChannel Architecture consists of:

An arbitration bus and associated signals

An address bus and associated signals

A data bus and associated signals

Interrupt signals

Other & mclong signals

Optional extensions for:
  Matched memory extension signals
  Video extension signals.

The SA-S Card 6 implements all of the MC signals required to support operation as a Memory or I/O slave, with 32 and 64-bit data streaming capability. The preferred embodiment does not implement the optional extensions for matched memory and video.

Throughout this disclosure, a minus sign (−) in front of a signal name indicates that the signal is active when it is at a low voltage or down level. When no minus sign appears, the signal is active when it is at a high voltage or up level. For example, −CMD specifies the signal is active low. Also, ARB/−GNT is in the ARB state when it is at a high level and is in the −GNT state when it is at a low level.

Arbitration Bus and Associated Signals

The arbitration bus and associated signals allow arbitrating participants (the system master, bus masters, and DMA slaves) to request and gain ownership of the channel. The resolution of multiple arbitration requests results in granting ownership of the channel to the highest-priority requester. ARB0–ARB3:

Arbitration Bus:

These signals make up the arbitration bus. They are driven by the system master, bus masters, and DMA slaves to present their arbitration level when requesting ownership of the channel. ARB0 (least significant) through ARB3 (most-significant) support up to 16 arbitration levels.

The highest value of the arbitration bus (X'F') has the lowest priority, and the lowest value (X'0') has the highest priority. To participate in the arbitration procedure, an arbitrating participant must present its arbitration level immediately after the rising edge of ARB/-GNT. All arbitrating participants monitor the arbitration bus, and those with lower priority arbitration levels withdraw them by not driving less-significant arbitration bits.

The arbitration level of the highest-priority requester is valid on the arbitration bus after a settling time. After the channel is granted to the highest-priority requester, that requester continues to drive its arbitration level on the bus.
ARBI-GNT:

Arbitrate/-Grant:

Only the central arbitration control point drives this signal, but it is monitored by all arbitrating participants. The negative-to-positive transition of ARB/-GNT initiates an arbitration cycle. When in the ARB state, this signal indicates an arbitration cycle is in progress. When in the -GNT state, this signal indicates the acknowledgement from the central arbitration control point to the arbitrating participants and the DMA controller that channel ownership has been granted. This signal is driven to the ARB state by the central arbitration control point following the end of transfer (EOT).
Note The system master can perform data transfers during arbitration (ARB/-GNT in the ARB state).
-BURST -Burst:

This signal is optionally driven by the winning arbitrating participant or the DMA controller after ARB/-GNT is driven to the -GNT state. This signal indicates to the central arbitration control point that the controlling master will use the channel for one or more consecutive data transfer cycles. This type of data transfer is called burst transfer.
-PREEMPT -Preempt:

This signal is used by arbitrating participants to request use of the channel through arbitration. Any arbitrating participant that requires ownership of the channel drives -PREEMPT active, causing an arbitration cycle to occur. When a participant is granted control of the channel, it stops driving -PREEMPT. All arbitrating participants that have not been granted ownership keep their requests pending by continuing to drive -PREEMPT active. All masters and DMA slaves that use burst transfer must receive -PREEMPT.
Address Bus and Associated Signals The address bus and the associated signals are used by the controlling master to assert the memory address or the I/O address (M/-IO), to enable a slave to latch the address and status signals (-S0,-S1), and to indicate that the memory address is greater than 16 MB.
A0-A23

Address Bits 0 through 23:

These lines, along with A24 through A31, make up the address bus. The lines are driven by the controlling master to address memory, I/O slaves, and, optionally, DMA slaves. A0 is the least-significant bit and A23 is the most-significant bit. These 24 address lines allow access of up to 16 MB of memory. Only the lower 16 address lines (A0 through A15) are for I/O operations, and all 16 lines must be decoded by the I/O slave. A0 through A23 are generated by the controlling master. Valid addresses, generated by the controlling master, are unlatched on the channel and, if required, must be latched by the slaves using either the leading or trailing edge of -ADL or the leading edge of -CMD.
A24-A31

Address Bits 24 through 31:

(32-Bit Extension) These lines, along with A0 through A23 are driven by the controlling master to address memory attached to the channel. A0 is the least-significant bit and A31 is the most-significant bit. These additional address lines allow access of up to 4 GB of memory. A24 through A31 are generated by the controlling master. Valid addresses, generated by the controlling master, are unlatched on the channel and, if required, must be latched by the slaves using either the leading or trailing edge of -ADL or the leading edge of -CMD.
Note A0-A31 are used to transfer data during a 64-bit streaming data cycle, but the prototype &smu does not implement this feature.
-ADL -Address Decode Latch:

This signal, driven by the controlling master, is provided as a convenient way for the slave to latch valid address decodes and status bits.
-APAREN -Address Parity Enable:

(32-Bit Extension) This optional signal is driven active by a master when the master places an address on the bus. This signal indicates to a slave that the address parity signals are valid. The SA Card 6 supports generation and checking of the address bus parity bits.

APAR0-APAR3 Address Parity Bits 0 through 3:

(32-Bit Extension) These optional signals are driven by a master when an address is placed on the address bus. These signals represent the odd parity of the address bits on the address bus during both read and write operations. (Odd parity is the condition where the total number of ones in a byte of data, including the parity bit, is odd.)

APAR(0) represents the odd parity of A(0-7).

APAR(1) represents the odd parity of A(8-15).

APAR(2) represents the odd parity of A(16-23).

APAR(3) represents the odd parity of A(24-31).

During both read and write operations, a master generates a parity bit for each valid address byte, and the receiving slave optionally performs the parity checking to ensure the integrity of the address. The &smu supports generation and checking of the address bus parity bits.
Note APAR0-APAR3 represent data parity during 64-bit streaming data cycles when -DPAREN is active.

APAR(0) represents the odd parity of D(32-39).

APAR(1) represents the odd parity of D(40-47).

APAR(2) represents the odd parity of D(48-55).

APAR(3) represents the odd parity of D(56-63).
-CD SFDBK (n)

-Card Selected Feedback:

This signal is driven active by the selected slave as a positive acknowledgement of the slave's selection. The (n) indicates this signal is unique to each channel connector (one independent signal per connector). This signal is unlatched and driven by the selected slave. The slave does not drive -CD SFDBK during the configuration procedure (-CD SETUP active).
Note Memory that contains diagnostic code must not drive -CD SFDBK during the diagnostic operation.
MADE 24

Memory Address Enable 24:

This signal is driven by the controlling master and decoded by all memory slaves, regardless of the size of their address-space. When this signal is active, A24-A31 are undefined.

A master driving only A0–A23 drives MADE 24 active.

A master driving A0–A31 drives MADE 24:
   active when all bits in A24–A31 are 0
   inactive when any bit in A24–A31 is 1.

M/–IO
   Memory/-Input Output:

This signal is driven by the controlling master and decoded by all slaves. This signal selects a memory cycle or an I/O cycle. When this signal is in the M state, a memory cycle is selected. When this signal is in the –IO state, an I/O cycle is selected.

–SFDBKRTN
   –Selected Feedback Return:

(32-Bit Extension) This optional signal is generated by the system logic from the AND of the –CD SFDBK (n) signals being driven by slaves. This signal is a positive acknowledgement to the master from the slave that the slave is at the address specified by the master. Masters that support address parity must receive this signal.

Address Signal Combinations

The following tables show the valid addressing signal combinations for:
   the address bus (A0–A23 and A24–A31)
   M/–IO
   MADE 24
   APAR(0–3).

| Addressing Signals | 16-Bit Connector 24-Bit Address | 32-Bit Connector <16 MB Address | 32-Bit Connector >16 MB Address |
|---|---|---|---|
| M/–IO | 1 | 1 | 1 |
| MADE 24 | 1 | 1 | 0 |
| A0–A23 | Valid | Valid | Valid |
| APAR0–APAR2 (Optional) | N/A | Valid | Valid |
| A24–A31 | N/A | X | Valid |
| APAR3 (Optional) | N/A | X | Valid |

X - Don't Care
N/A - Not applicable

| Addressing Signals | 16-Bit Connector | 32-Bit Connector |
|---|---|---|
| M/–IO | 0 | 0 |
| MADE 24 | X | X |
| A0–A15 | Valid | Valid |
| APAR0–APAR1 (Optional) | N/A | Valid |

X - Don't Care
N/A - Not applicable

Data Bus and Associated Signals

The data bus is used to transfer either 8, 16, 24, or 32 bits of data. The associated signals indicate the amount of data transferred by the master in a single transfer cycle, the size of the slave's data port, and the type (read or write) of the data transfer.

D0–D15 Data Bits 0 through 15:

These lines, along with D16–D31, make up the data bus. The data bus is driven by any master or slave that is transferring data. These lines (D0–D15) provide data bits 0 through 15. D0 is the least-significant bit; D15 is the most-significant bit. The 16-bit transfers from the controlling master to an 8-bit slave are converted by the controlling master to two 8-bit transfers, and are transmitted on lines D0 through D7. An 8-bit slave must use D0 through D7 to communicate with the controlling master.

D16–D31
   Data Bits 16 through 31:

(32-Bit Extension) These lines, along with D0–D15, make up the data bus. The data bus is driven by any master or slave that is transferring data. These lines (D16–D31) provide data bits 16 through 31. D0 is the least-significant bit; D31 is the most-significant bit. The 32-bit transfers from the controlling master to an 8-bit slave are converted to four 8-bit transfers by the controlling master, and are transmitted on lines D0 through D7. The 32-bit transfers from the controlling master to a 16-bit slave are converted to two 16-bit transfers by the controlling master, and are transmitted on lines D0 through D15.

–BE0 to –BE3
   –Byte Enable 0 through 3:

(32-Bit Extension) These signals are used during data transfers with 32-bit slaves to indicate which data bytes are valid on the data bus. Data transfers of 8, 16, 24, or 32 contiguous bits are controlled by –BE0 through –BE3 during transfers involving 32-bit slaves only. These signals are driven by the controlling master when TR 32 is inactive, and by the central translator logic (for those operations involving a 16-bit master with a 32-bit slave) when TR 32 is active. These signals are not latched on the bus and, if required, are latched by 32-bit slaves.

–CD DS 16 (n)
   –Card Data Size 16:

This signal is driven by 16-bit and 32-bit slaves to indicate a 16-bit or 32-bit data port at the location addressed. The (n) indicates this signal is unique to each channel connector (one independent signal per connector). This signal is derived from a valid unlatched address decode. –CD DS 16 is not driven by 8-bit slaves and is inactive for an 8-bit data port.

–CD DS 32 (n)
   –Card Data Size 32:

(32-Bit Extension) This signal, along with –CD DS 16, is driven by 32-bit slaves to indicate a 32-bit data port at the location addressed. The (n) indicates this signal is unique to a channel connector position (one independent signal per connector). –CD DS 32 is derived from a valid unlatched address decode. –CD DS 32 is inactive for an 8- or 16-bit data port.

CD CHRDY (n)
   Channel Ready:

This signal is normally active (ready) and is driven inactive (not ready) by a slave to allow additional time to complete a channel cycle. The (n) indicates this signal is unique to each channel connector (one independent signal per connector). During a read cycle, a slave ensures that data is valid within the time specified after releasing the signal to a ready state. The slave also holds the data long enough for the controlling master to sample the data. A slave can also use this signal during a write cycle, if more time is needed to store the data. This signal is initially driven from a valid unlatched address decode and status active.

CHRDYRTN
   Channel Ready Return:

This signal is the AND of CD CHRDY (n). It is driven by the system logic. If all slaves drive CD CHRDY active, this signal is active. CHRDYRTN allows the controlling master to monitor the ready information.

–CMD
   –Command:

This signal is driven by the controlling master and is used to define when data on the data bus is valid. The trailing edge of this signal indicates the end of the bus cycle. This signal indicates to the slave how long data is valid. During write cycles, the data is valid as long as −CMD is active. During read cycles, the data is valid after the leading edge, but before the trailing edge, of −CMD and is held on the bus until after −CMD goes inactive. Slaves can latch address and status information with the leading edge of −CMD.

DPAREN

−Data Parity Enable:

This optional signal is driven active by the participant when data is placed on the data bus. This signal indicates that the data parity signals are valid. The SA Card 6 supports generation and checking of the data bus parity bits.

Note

APAR(0)–APAR(3) represent data parity during 64-bit streaming data cycles when −DPAREN is active.

DPAR0–DPAR7

Data Parity Bits 0 and 1:

These optional signals are driven by the participant when data is placed on the data bus. These signals represent the odd parity of the data bits on the data bus during both read and write operations. (Odd parity is the condition where the total number of ones in a byte of data, including the parity bit, is odd.)

DPAR(0) represents the odd parity of D(0–7). DPAR(1) represents the odd parity of D(8–15).

During write operations, a master generates a parity bit for each data byte being transferred, and the receiving slave optionally performs the parity checking to ensure the integrity of the data. During read operations, a slave generates a parity bit for each valid data byte, and the receiving master performs the parity checking to ensure the integrity of the data. The SA Card 6 supports generation and checking of the data bus parity bits.

DPAR2–DPAR3

Data Parity Bits 2 and 3:

(32-Bit Extension) These optional signals are driven by the participant when data is placed on the data bus. These signals represent the odd parity of the data bits on the data bus during both read and write operations.

DPAR(2) represents the odd parity of D(16–23).

DPAR(3) represents the odd parity of D(24–31).

During write operations, a master generates a parity bit for each data byte being transferred, and the receiving slave optionally performs the parity checking to ensure the integrity of the data. During read operations, a slave generates a parity bit for each valid data byte, and the receiving master performs the parity checking to ensure the integrity of the data. The SA Card 6 supports generation and checking of the data bus parity bits.

−DS 16 RTN

−Data Size 16 Return:

This signal is driven by the system logic. This signal is the AND of −CD DS 16 (n) from each channel connector. If any slave drives its −CD DS 16 active, this signal is active. This signal allows the controlling master to monitor the information about the selected slave's data port size.

−DS 32 RTN

−Data Size 32 Return:

(32-bit Extension) This signal is driven by the system logic. This signal is the AND of −CD DS 32 (n) from each channel connector. If any slave drives its −CD DS 32 active, this signal is active. This signal allows the controlling master to monitor the information about the selected slave's data port size.

| −DS 16 RTN | −DS 32 RTN | Data Port Size |
|---|---|---|
| 1 | 1 | 8-Bit Data Port |
| 1 | 0 | Not Valid |
| 0 | 1 | 16-Bit Data Port |
| 0 | 0 | 32-Bit Data Port |

−MSDR

−Multiplexed Streaming Data Request:

This signal is driven by a slave to indicate to the controlling master that the slave is capable of 64-Bit streaming data transfers.

−SBHE

−System Byte High Enable:

This signal is driven by the controlling master to indicate and enable transfers of data on D8–D15. It is used with A0 to distinguish between high-byte transfers (D8–D15) and low-byte transfers (D0–D7) and double-byte (16-bit) transfers to 16-bit data ports. All 16-bit slaves receive this signal.

−SD STROBE

−Streaming Data Strobe:

The controlling master and the slave use this signal to clock data on and off the data bus. This optional signal is driven by the controlling master. This signal also indicates to the slave that the controlling master supports streaming data.

−SDR(0)

−Streaming Data Request 0:

This optional signal is driven by a slave to indicate to the controlling master that the slave is capable of streaming data, and also indicates the maximum clocking rate the slave supports.

−SDR(1)

−Streaming Data Request 1:

(32 Bit Extension) This optional signal is driven by a slave to indicate to the controlling master that the slave is capable of streaming data, and also indicates the maximum clocking rate the slave supports.

| −SDR(0) | −SDR(1) | Decoded Streaming Rate |
|---|---|---|
| 1 | 1 | Basic Transfer Cycle |
| 0 | 1 | 10 MHz maximum (100 nS minimum cycle) |
| 1 | 0 | Reserved |
| 0 | 0 | Reserved |

−S0, −S1

−Status 0, −Status 1:

These status signals are driven by the controlling master to indicate the start of a data transfer cycle and also to define the type of data transfer. When used with M/−IO, memory read or write cycles are distinguished from I/O read/write cycles. These signals are latched by the slave, as required, using the leading edge of −CMD, or the leading or trailing edge of −ADL. Data is transferred to or from the data bus based on −CMD and a latched decode of the address, the status lines (−S0 exclusive-OR −S1), and M/−IO. Slaves must support a full decode of &−S0 and −S1. The following table shows the states of M/−IO, −S0, and −S1 in decoding I/O and memory read and write commands.

| M/−IO | −S0 | −S1 | Function |
|---|---|---|---|
| 0 | 0 | 0 | Reserved |
| 0 | 0 | 1 | I/O Write Command |
| 0 | 1 | 0 | I/O Read Command |

| M/-IO | -S0 | -S1 | Function |
|---|---|---|---|
| 0 | 1 | 1 | Inactive |
| 1 | 0 | 0 | Reserved |
| 1 | 0 | 1 | Memory Write Command |
| 1 | 1 | 0 | Memory Read Command |
| 1 | 1 | 1 | Inactive |

An I/O write command instructs an I/O slave to receive the data from the data bus. An I/O read command instructs an I/O slave to drive its data onto the data bus.

A memory write command instructs a memory slave to receive the data from the data bus. A memory read command instructs a memory slave to drive its data onto the data bus.

—TC

—Terminal Count:

This signal is driven by the DMA controller and provides a pulse during a read or write command to the DMA slave to indicate that the terminal count of the current DMA channel has been reached. This indicates to the DMA slave that this is the last cycle to be performed. -TC is driven active on the channel during DMA operations only.

TR 32

Translate 32:

(32-Bit Extension) This signal is driven inactive by 32-bit controlling masters and received by the central translator logic. The signal indicates to the central translator logic that the controlling master is performing data steering. TR 32 can also be received by any 32-bit slave.

Interrupt Signals

–IRQ 3 to 7, –IRQ 9 to 12, and –IRO 14 & 15

—Interrupt Request:

An interrupt request is generated when an I/O slave drives one of the 'interrupt request' signals low. These signals make up the set of interrupt signals. The polarity of these signals makes it possible for multiple slaves to concurrently share the same interrupt level.

Other &mclong. Signals

AUDIO

Audio Sum Note:

This analog signal is the sum of all the audio signals being driven. It is used to drive audio signals from an adapter to the system audio output and between adapters.

AUDIO GND

Audio Ground:

This is the analog ground return signal for the audio subsystem.

—CD SETUP (n)

—Card Setup:

This signal is driven by the system logic to individually select channel connectors. The (n) indicates this signal is unique to each channel connector (one independent signal per connector). When this signal is activated, a specific channel connector is selected, and, if an adapter is present, access is gained to configuration data at that connector. The adapter ID and configuration data is obtained by an I/O read during a setup cycle; the configuration data is stored by an I/O write during a setup cycle.

—CD CHCK

—Channel Check:

This signal is driven active by a slave to report an exception condition, and optionally, it can be driven by a master.

CHRESET

Channel Reset:

This signal is generated by the system logic to reset or initialize all adapters at power-on or when a low voltage condition is detected. The system can also activate this signal under program control.

OSC

Oscillator:

This signal is a high-speed clock driven by the system logic, with a frequency of 14.31818 MHz±0.01%. The high-level pulse width (more than 2.3 Vdc) and the low-level pulse width (less than 0.8 Vdc) must not be less than 20 nanoseconds each.

—REFRESH

—Refresh:

This signal is driven by the system logic and is used to indicate that a memory refresh operation is in progress. Memory slaves that do not need to perform refresh operations do not need to receive this signal.

Figure 12:
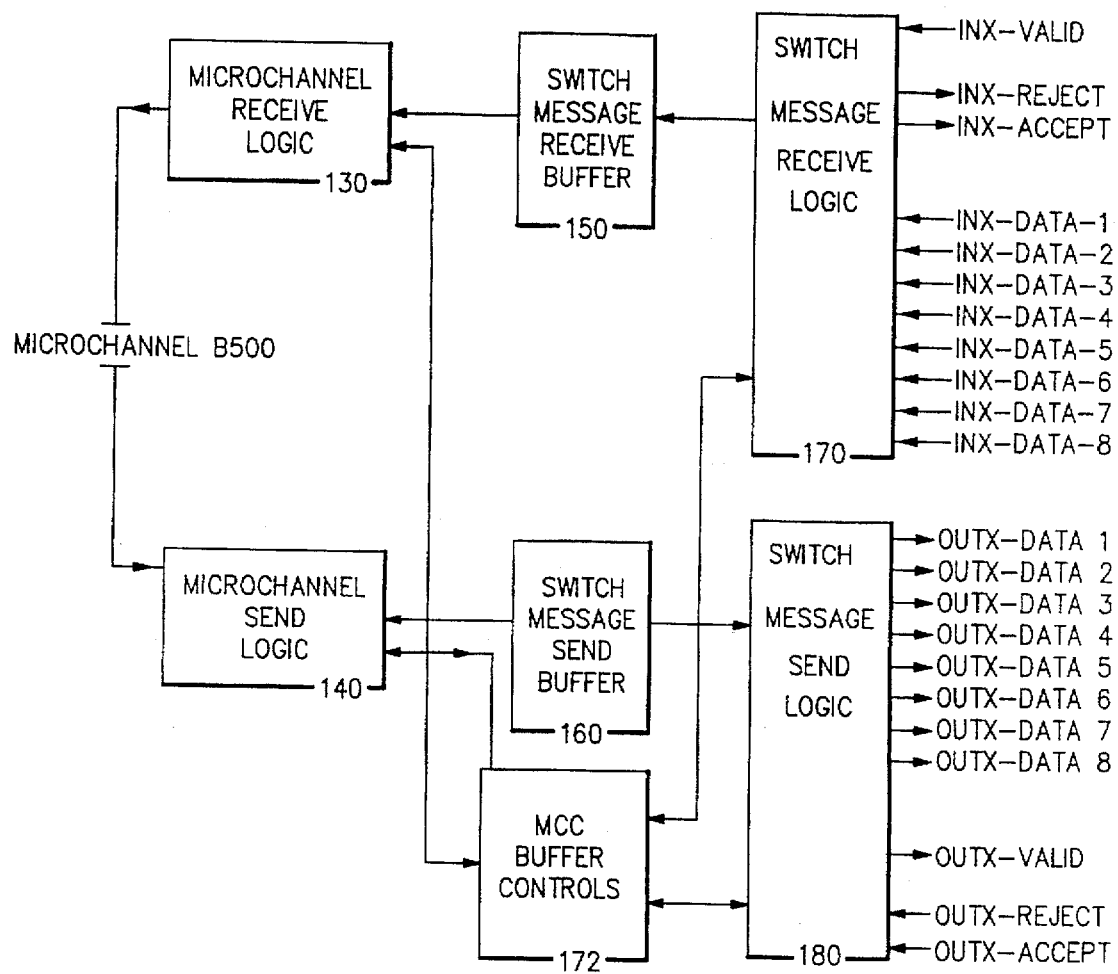
FIG. 12 shows a schematic block diagram of the perferred embodiment of the invention MicroChannel Converter or Switch Adapter function, for the purpose of adapting the MicroChannel protocol and architecture to switch protocol and architecture.

Referring to FIG. 12, a more detailed functional diagram of the disclosed MICROCHANNEL BUS TO SWITCH ARCHITECTURE MASTER CONVERTER APPARATUS (block 130 of FIG. 1) is shown. The processor 300 residing on the MC Bus and performing as a node in a parallel system can transmit data messages to other nodes by sending memory or I/O transfers to the SA Card 6 over the MC to command the intelligent bus master to off-loading the message transmission task from the processor. The SA Card implements MC Send logic 140 to perform on the MC as a Memory or I/O slave device, and an intelligent master for the purpose of transferring data messages directly to or from processor P300 memory. The SA Card 6 receives and stores commands to perform intelligent bus master operations, and then performs the data message transfer by relaying the data message from processor memory over switch network 30 to the requested destination node. The data message from the local processor is stored in the Switch Message Send Buffer 160 until it is received in full, then the Switch Message Send logic 180 reads the data message form buffer 160 and sends it over the parallel switch network 30 to the commanded destination. If the data message in buffer 160 is a SA Control Message containing control data for the SA Card 6 instead of a message for switch network 30, it is routed to and processed by block 172. Block 180 implements a switch output port which sends 4-bit wide data to the switch network 30, and becomes an input port to an ALLNODE Switch 10 in network 30. The corresponding output from the switch network 30 is connected to Switch Message Receive Logic 170, which acts as a switch output port from the network 30 and receives data messages from the network 30. The message received from the network is stored as is in the Switch Message Receive Buffer 150 until it is received in full, then the MC Receive Logic 130 uses its intelligent bus master capability to transfer the message in buffer 150 dirctly to processor P300 memory.

Figure 13:
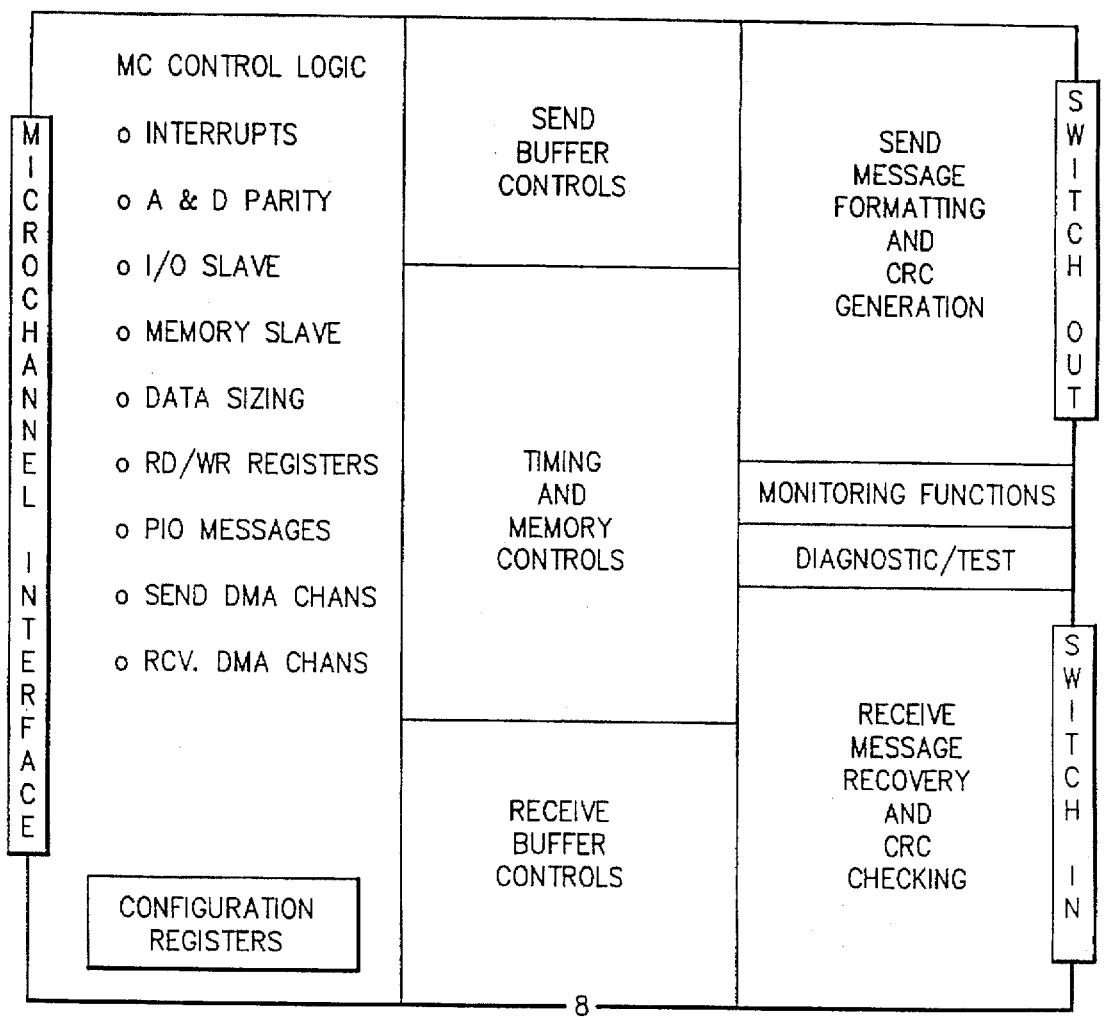
FIG. 13 shows a schematic block diagram of a chip layout to perform the invention MicroChannel Conveder or Switch Adapter function, for the purpose of adapting the MicroChannel protocol and architecture to switch protocol and architecture.

Referring to FIG. 13, a chip floor plan is shown for the disclosed MICROCHANNEL BUS TO SWITCH ARCHITECTURE MASTER CONVERTER CHIP 8. The chip contains the Microchannel Receive Logic 130 and Microchannel Send Logic 140 from FIG. 12 in the MC CONTROL LOGIC sub-block of chip 8. This block provides all the MC bus master functions to support normal MC bus master operations including interrupts, single or multiple sending and receiving Direct-Memory Access Channels, error detection, data sizing, control and configuration registers. Also included in chip 8 are chip timing and control functions, control logic for both the send and receive buffers (which are located external to the chip as shown in FIG. 3 by block 15), and diagnostic functions. Finally, there is one section of the chip dedicated to generating and sending messages to switch network 30, and another section dedicated to recovering and receiving data messages from switch network 30.

Figure 14:
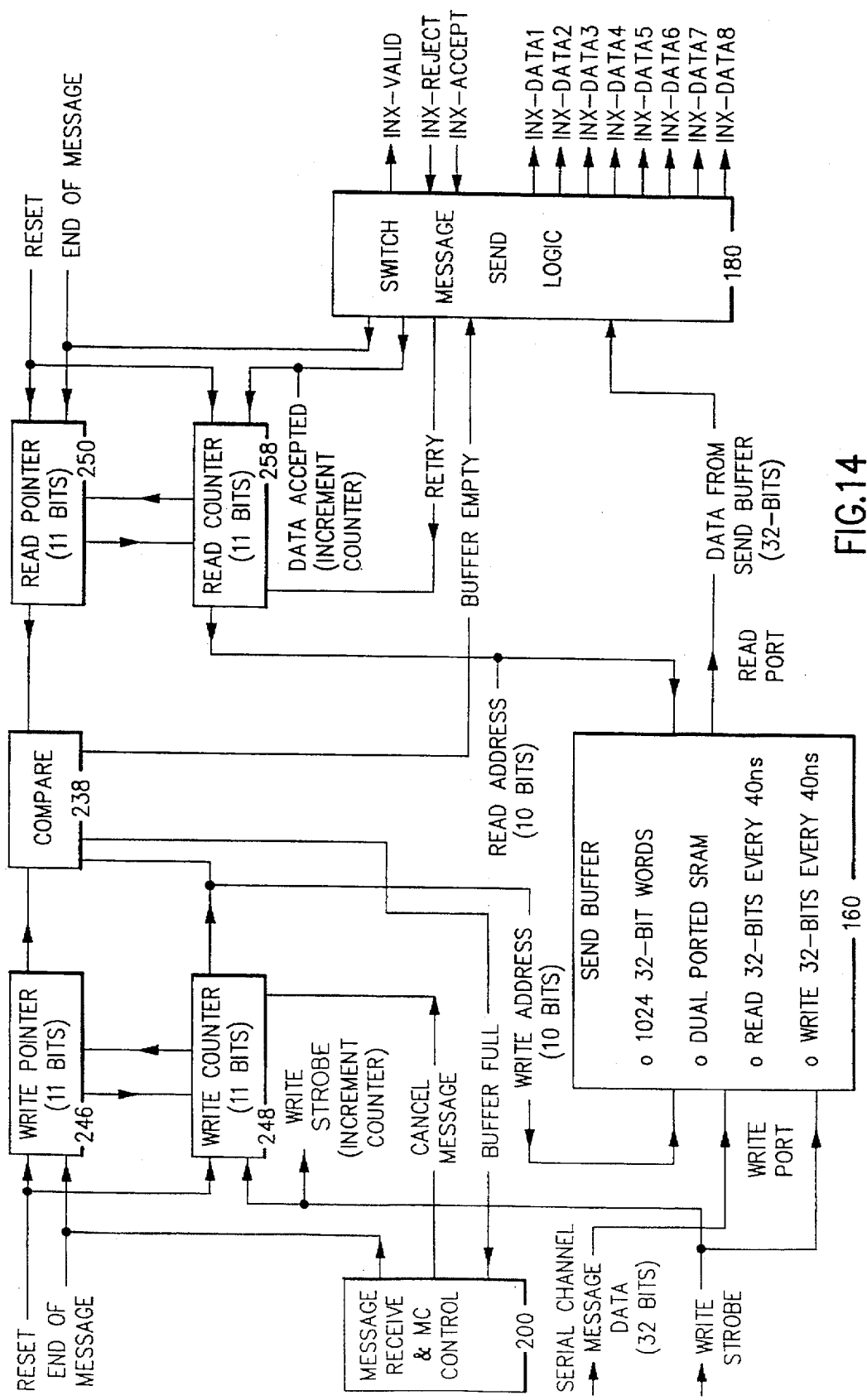
FIG. 14 shows a schematic block diagram of the send message buffer portion of the invention MicroChannel Converter or Switch Adapter function, for the purpose of buffering message data being transmitted from the MicroChannel to the multi-stage switch network.

Referring to FIG. 14, the data message as it is being received by the SA Card 6 over the MC is stored in the Switch Message Send Buffer 160 until it is received in full, then the Switch Message Send logic 180 reads the data message form buffer 160 and sends it over the parallel switch network 30. Block 200 contols the writing of Serial Channel Message Data, 32-bit words, into buffer 160 as commanded by the WRITE STROBE signal. The Send Buffer 160, for the preferred embodiment, contains 1024 32-bit words and is dual ported, so that one 32-bit word write and one 32-bit word read can occur simultaneously at a 25 MHZ rate (every 40 ns), which provides the capability of supporting up to a 1 gigabyte/sec serial data rate. The write function to Send Buffer 160 is controlled by two 11-bit entities: a write pointer 246 and a write counter 248. A Reset signal shall reset both of these 11-bit values to all zeroes. As block 200 writes each word into the write port of the buffer, the write counter 248 is used to address the write port of buffer 160 through gates 242 and 240. When each 32-bit write is complete, the write counter increments with the fall of the WRITE STROBE signal from block 200 in preparation for the next write operation. Block 200, after storing a complete valid message to buffer 150, sends the END OF MESSAGE signal, which sets the write pointer 246 equal to the write counter 248 to indicate that the valid message has been successfully stored to buffer 160. Block 200 can cancel a message or partial message from buffer 160 by issuing the CANCEL MESSAGE signal, which rolls back the value of write counter 248 by setting write counter 248 equal to the write pointer 246, pointing it back to the beginning of where the valid message was written or partially written, so that it can be rewritten correctly at a later time. When the ten low-order bits of write pointer 246 are equal to the ten low-order bits of write counter 248, as detected by comparator 238, but the high-order bit is different, buffer 160 is completely full and the BUFFER FULL signal is sent to block 200. As long as the BUFFER FULL condition exists, block 200 is prevented from doing further writes to the buffer.

The Switch Message Send logic 180 reads 32-bit words from buffer 160 and sends them to network 30. The read function is controlled by two 11-bit entities: read pointer 250 and read counter 258. A Reset signal shall reset both of these 11-bit values to all zeroes. As block 180 reads each word from the buffer, the read counter 258 is used to address the read port of buffer 160 directly. When each 32-bit read is complete, the read counter increments with the fall of the DATA ACCEPTED signal from block 180 in preparation for the next read operation. Block 180, after reading and successfully transmitting a complete valid message over network 30 from buffer 160, sends the END OF MESSAGE signal, which sets the read pointer 250 equal to the read counter 258 to indicate that the valid message has been successfully transmitted. This action effectively removes the transmitted message from the buffer and steps to the beginning of the next message to be transmitted. This clears space in buffer 160 to be used again by a future valid message. Block 180 can retry the transmission of a message or partial message to network 30 from buffer 160 by issuing the RETRY signal, which rolls back the value of read counter 258 by setting read counter 258 equal to the read pointer 250, pointing it back to the beginning of the valid message so that it can be reread. When the eleven bits of write pointer 246 are equal to the eleven bits of read pointer 250, as detected by comparator 238, buffer 160 is empty and the BUFFER EMPTY signal is sent to block 180. As long as the BUFFER EMPTY condition exists, block 180 is informed that there are no valid messages waiting to be sent to network 30. When block 200 stores a complete valid message to an empty buffer 160 and advances write pointer 246 by issuing the END OF MESSAGE signal, the write pointer 246 no longer equals the read pointer 250, which is detected by comparator 238 and deactivates the BUFFER EMPTY signal to block 180, informing it that there is now a valid message to be sent to network 30.

Figure 15:
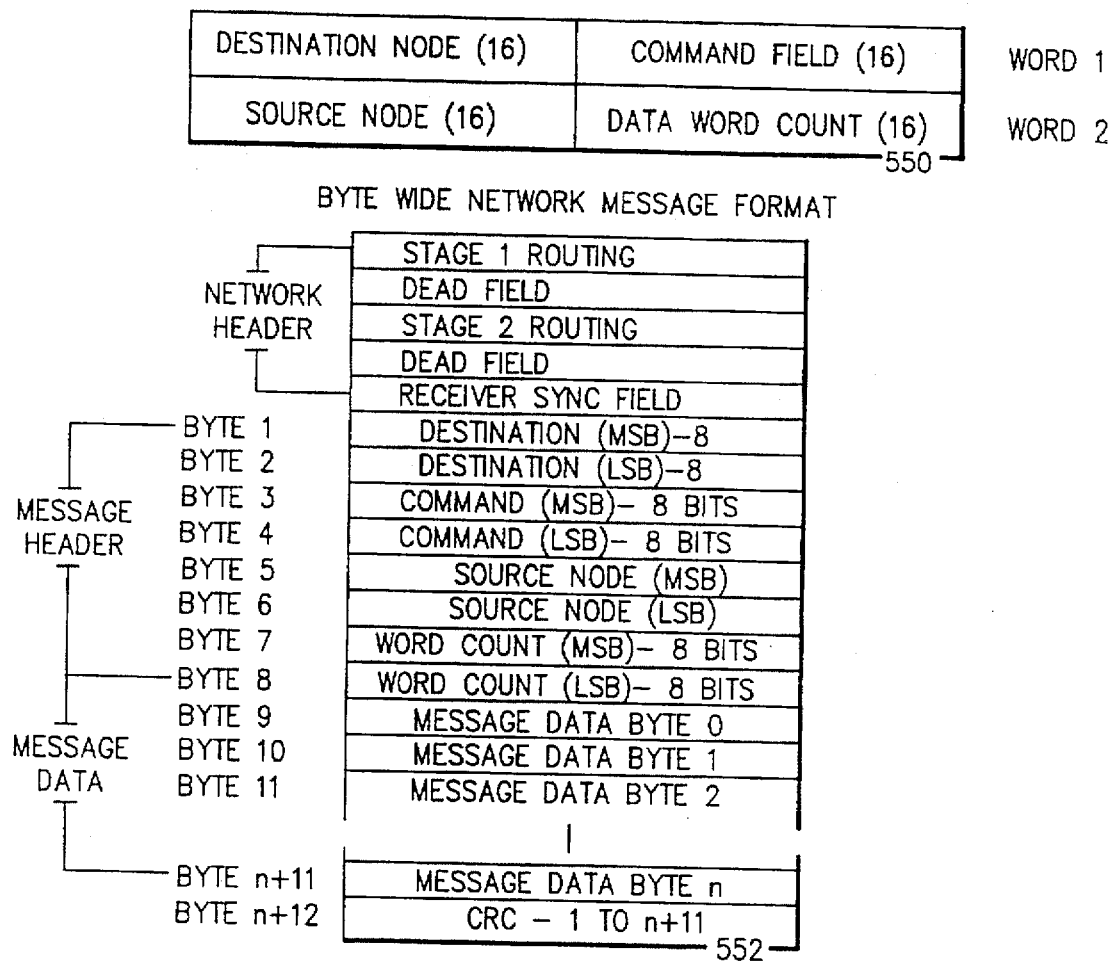
FIG. 15 shows the message header and data formats of both the MicroChannel interface protocol and the multi-stage switch network interface protocol.

The function of block 140 of FIG. 12 is to write a valid message to buffer 160 that is converted to the message format required by network 30. FIG. 15 shows the message format required by the preferred embodiment of network 30. The network 30 requires that a valid message have a two 32-bit word Message Header, as shown by block 550. Word 1 of the Message Header contains the destination node number (DID value) and defines which node is to receive the valid message, and the command field defining the type of message and other message control parameters, as shown in detail by block 554. Word 2 of the message header contains the source node number (SID value) that is generating the valid message and word count of the actual message data (excluding the two message header words). The data word count defines how many words are to be transmitted in a single transmission cycle. The data word count field of the described embodiment of the invention is 16 bits in size, as shown in FIG. 15. Since the data word count field is 16 bits in size it is capable of defining 64,000 different messages sizes ranging from 0 data words to 63,999 data words (where a word is defined as four bytes). Thus, a message of any length can be transmitted in one transmission cycle as limited by the number of bits allotted to the data word count field in message header word 2. Block 180 reads the valid message from buffer 160 and sends a message over network 30 that is 4-bits wide as described above, or can have improved bandwidth through switch network 30 by going to a byte wide network transfer. The discussion from this point assumes that 4 additional data lines are added to each individual Allnode switch 10 port, increasing the number of data lines for every input and output port from 4 to 8 lines and doubling the bandwidth. The byte wide content of messages sent through the improved network 30 is shown by block 552. Block 180 uses the destination field to locate the receiving the node and to determine a path through network 30 to the destination node. Block 180 makes up the Network Header from the destination field and prefixes the message with the Network Header as shown by block 552 to be used by network 30 to route the valid message to the proper destination and to synchronize the receiving node when the data arrives. Network 30 strips the Network Header from the valid message as it makes its way through the network, stage by stage, and the receiving node strips the RECEIVER SYNC FIELD after it gets in synchronization with the incoming message. Therefore, the actual valid message that gets moved from the source node to the destination node over network 30 is the Message Header and Message Data portion of the message format shown in block 552. The Message Header portion of block 552 is the exact same two word header shown by block 550, just broken into individual bytes for transmission over the byte-wide network 30. The Message Data portion of block 552 are the data words which are stored sequentially to buffer 160 by block 140; however they are broken into individual bytes for transmission over network 30. The last portion of block 552 is a CRC field which is sent last and used to check the accuracy of the valid message.

Turning now to the MicroChannel interface and its operation with respect to sending and receiving messages from/to the SA adapter or card as controlled by blocks 140 and 130, respectively, of FIG. 12. The Master interface requires that blocks 130 and 140 be active components on the MC; i.e., they can initiate a transfer of data information over the MC. As shown in FIG. 12, the MC Bus Master function splits equally into two major functions: the message receiving function 130, which moves information from the switch network to the MC; and the message sending function 140, which moves information from the MC to the switch network. These two functions are basically independent and have no communication paths and only a few control signals interfacing between them.

Blocks 130 and 140 provide similar Bus Master functions on the MC. The main adavantage provided is that Bus Masters can perform data message transfers over the MC as Direct Memory Access (DMA) operations. That is, blocks 130 and 140 can place or take data, respectively, from processor memory directly without involving the prosessor on a real time basis. The Bus Master is self-sufficient and leaves the processor free to work on other problems.

Figure 16A:
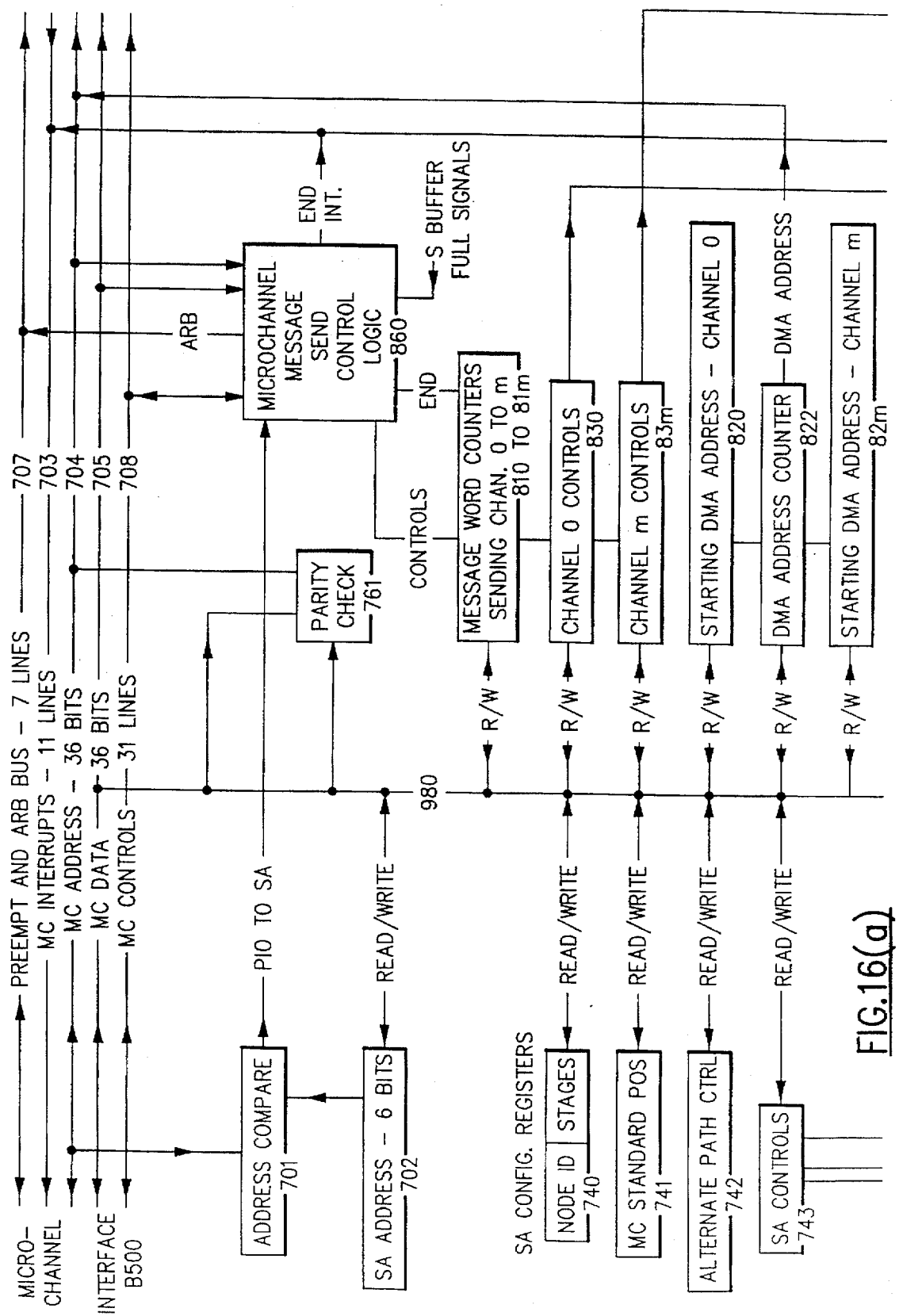
FIG. 16A shows a schematic block diagram of the MicroChannel interface portion of the invention MicroChannel Converter or Switch Adapter function, for the purpose of sending message data being transmitted from the MicroChannel to the multi-stage switch network under the control of an intelligent bus master implementing multiple sending channels and a single sending buffer.
Figure 16B:
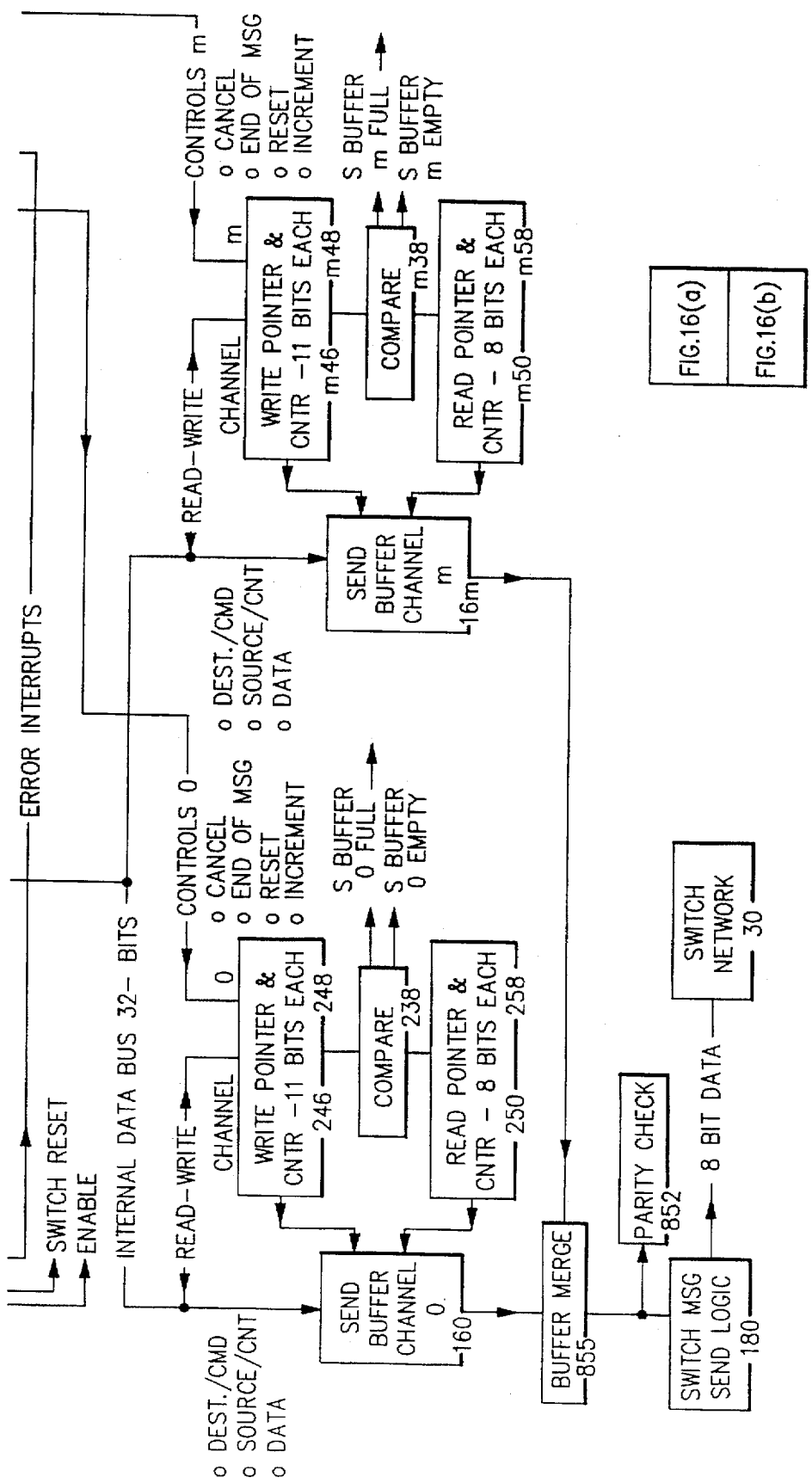
FIG. 16 shows a schematic block diagram of the MicroChannel interface portion of the invention MicroChannel Converter or Switch Adapter function, for the purpose of sending message data being transmitted from the MicroChannel to the multi-stage switch network under the control of an intelligent bus master implementing multiple sending channels and buffers.
Figure 16A:
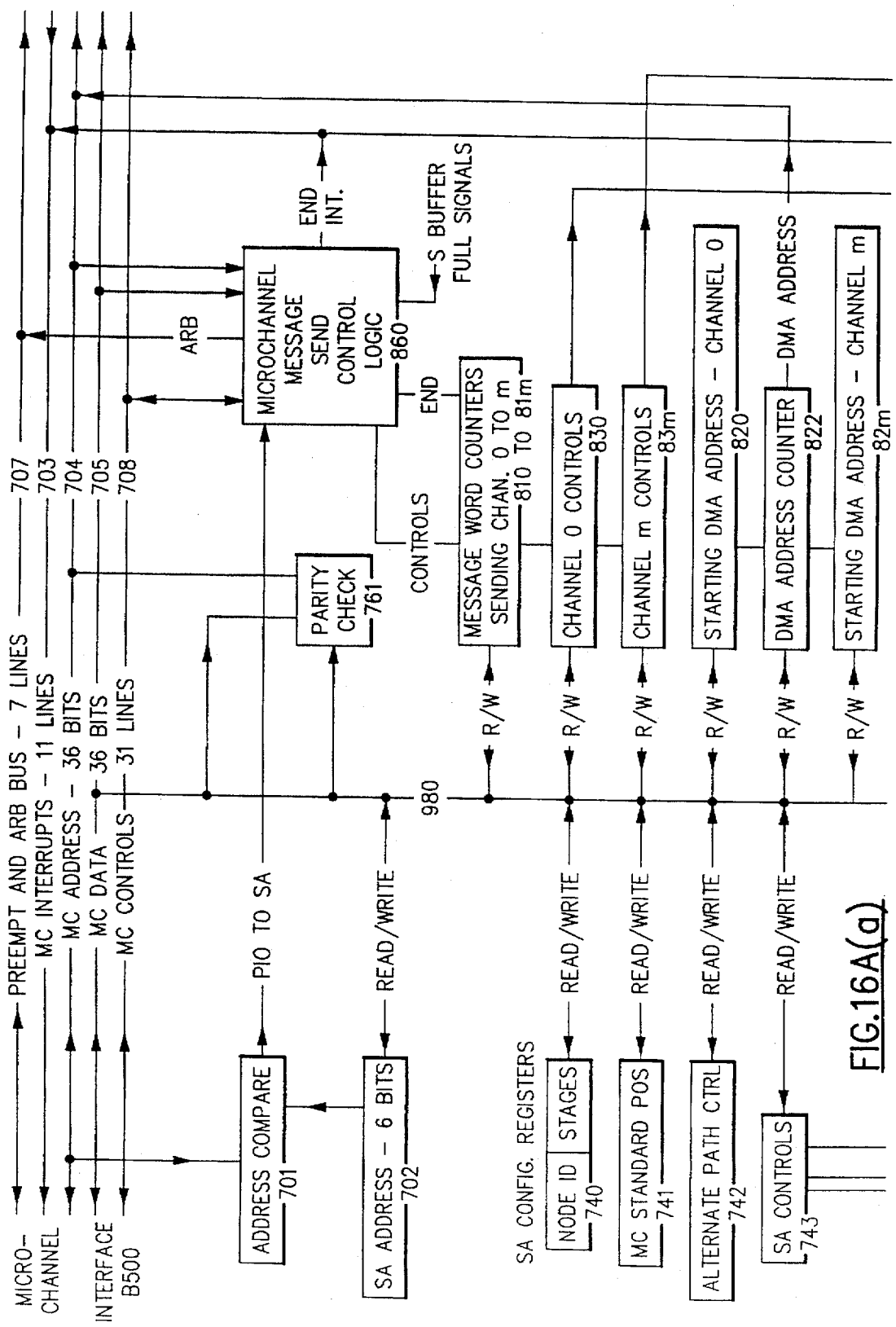

Referring to FIG. 16, the preferred embodiment of a multiple channel bus master sending message control logic 140 is shown. Any processor P300 residing on the MC Bus and performing as a node in a parallel system can transmit data messages to other nodes by setting up sending memory DMA Channels in block 140 that transfer messages directly from processor memory under control of the Bus Master SA Card. The data message from the local processor is stored first in the Switch Message Send Buffer 160, and then the Switch Message Send logic 180 reads the data message form buffer 160 and sends it over the parallel switch network 30 to the commanded destination.

The software controlling processor P300 can use the DMA message sending capability of the present invention to off-load the message sending process. The software builds messages in list form in its local memory and then requests a sending channel on the SA Card 6 to process the list of messages using a direct memory access (DMA) operation over the MC. Thus, with one MC I/O operation, the sending function 140 can be requested to send multiple messages over the switch network. The messages are built in sequential memory locations by the software as shown here.

---

MESSAGE HEADER 1
MESSAGE DATA 1
MESSAGE HEADER 2
MESSAGE DATA 2
MESSAGE HEADER 3
MESSAGE DATA 3
End of List - All 0's

---

As many messages as desired by the programmer can be cascaded into one list, providing that they are all contained within the maximum memory space that can be addressed by the DMA channels of the present invention. The end of the list is specified by storing a 32-bit word of all zeroes after the last message in the list.

The processor software prepares a DMA Channel by issuing PIO commands over the MC addressed to block 140. Block 701 monitors all PIO commands issued over the MC to determine if they are addressed to block 140; i.e., if the address matches a preassigned address stored in register 702. If the address on the MC matches the address in register 702, block 140 responds to the MC operation. The address pattern presented on the MC Address bus 704 is programmed to select which of the m sending channels that the soft-ware wishes to activate. FIG. 16 shows two of the m sending DMA Channels: DMA Channel 0 is comprised of blocks 811,820, and 830; DMA Channel m is comprised of blocks 81m, 82m, and 83m. The DMA Channels function identically, but only one performs a data fetch over the MC at any given time.

A PIO store instruction to a specific DMA Channel provides all of the information the intelligent bus master requires to take over the message sending operation without any further support from the software. The active channel of Block 140 fetches and sends one message at a time over the network.

Using the PIO store instruction, the processor can send values to registers 820 and 830 to initialize DMA Channel 0 as follows:

The value stored to register 820 tells DMA Channel 0 where it is to find the start of the message list in processor memory. Basically the processor sets up a buffer where the SA Card 6 is to find messages to transmit to switch network 30.

The value stored to register 830 tells DMA Channel 0 how to control the DMA operation based on control bits stored in register 830: IC0, IE0, ARB, and EN0.

ICO—Enables block 140 to interrput the processor after it has completed sending the message list in processor memory.

IE0—Enables block 140 to interrput the processor if it detects an error associated with sending the commanded message list.

ARB—tells block 140 the number of the arbitration level (priority) it is to use when arbitrating for the MC.

EN0—enables DMA Channel 0 indicating that the processor has set-up a memory buffer, arbitration level, and loaded registers 820 and 830.

Block 140 begins a DMA Channel 0 operation by arbitrating for the MC. It does this by activating the –PREEMPT signal to the MC and using the ARB value from register 830 to define its priority level. Once, block 140 has won the MC, it is the sole owner of the MC until preempted and it can proceed to fetch by DMA operations the data message in processor memory to be transmitted to switch network 30. Block 140 moves the starting DMA address value in register 820 to counter 822, and Counter 822 supplies the DMA address for every message word to the MC address bus 704. One data word is fetch at a time over MC Data bus 705, placed on internal SA bus 980, and routed to Channel 0 send buffer 160, where the data message is accumulated. The second word of the message containing the word count of the message is stored to message word counter 810, as well as being sent to buffer 160. After each word is transferred from processor memory to buffer 160, counters 822 and 248 are incremented and counter 810 is decremented. The transfer proceeds until counter 810 goes to 0 or an error is detected. If counter 810 goes to 0, it indicates that the entire data message has been stored successfully into buffer 160. The message is concluded by:

1. Storing the address of where the message ended in processor memory+1 (the value presently in counter 822) to register 820. This leaves DMA Channel 0 initialized to fetch the next message in the sequential message list, if there is another one.
2. Informing the send buffer 160 control logic that it now contains another complete message by issuing the "End of Msg" signal.
3. Relinguishing ownership of the MC, if "–PREEMPT" is active.

If an error is detected, it means that the entire data message was NOT stored successfully to buffer 160. The incomplete transfer is concluded by:

1. Issuing an error interrupt to the processor, if IE0 permits.
2. Erasing any partial message in buffer 160 by issuing the Cancel signal.
3. Relinguishing ownership of the MC.
4. Resetting register 830 and disabling DMA Channel 0, which are part of every message or to store them as normal data words to processor memory.

Once the MMC-M sucessfully completes the transfer of a message to buffer 160, it will proceed to transfer the next message in the sequential list in the same way that it transferred the previos message. After completing it each, it will move on to the next message. This continues until block 140 reads a header word from the DMA list that is all zeroes; then block 140 terminates the operation and interrupts the software, if the IC0 interrupt has been enabled. The channel then disables itself and goes idle until commanded by another PIO store instruction.

Because block 140 contains m multiple sending DMA channels, it is capable of supporting m different DMA lists simultaneously, and it can be programmed either to interleave messages from all lists or to complete the one list entirely before working on a list from another channel. Note in FIG. 16, that each channel can be implemented to have its own buffer 160 to 16m to provide completely independent channel operation. However, an alternative implementation is shown in FIG. 16A, where it is possible to share a single 160 buffer amongst all m channels. This is possible because only 1 channel is active on the MC at any given time; however, this alternative method is more prone to having a message at the head of buffer 160 that is continuously rejected by network 30, block the other messages in buffer 160 from being sent. This problem is avoided by using the preferred embodiment of a separate buffer for each of the m channels.

Figure 17A:
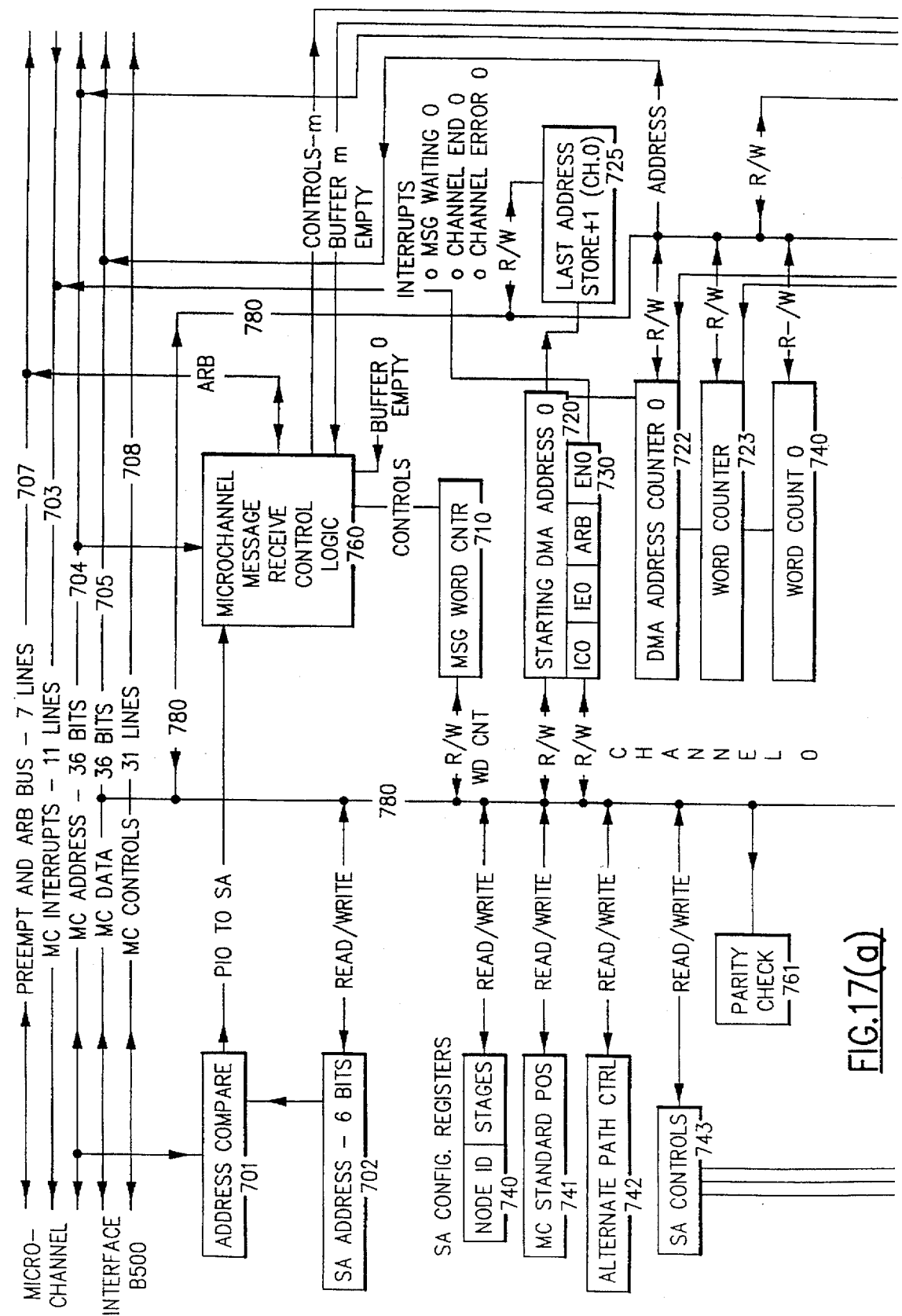
FIG. 17A shows a schematic block diagram of the MicroChannel interface portion of the invention MicroChannel Converter or Switch Adapter function, for the purpose of receiving message data being transmitted from the the multi-stage switch network to the MicroChannel, under the control of an intelligent bus master implementing multiple receiving channels and a single receiving buffer.
Figure 17A:
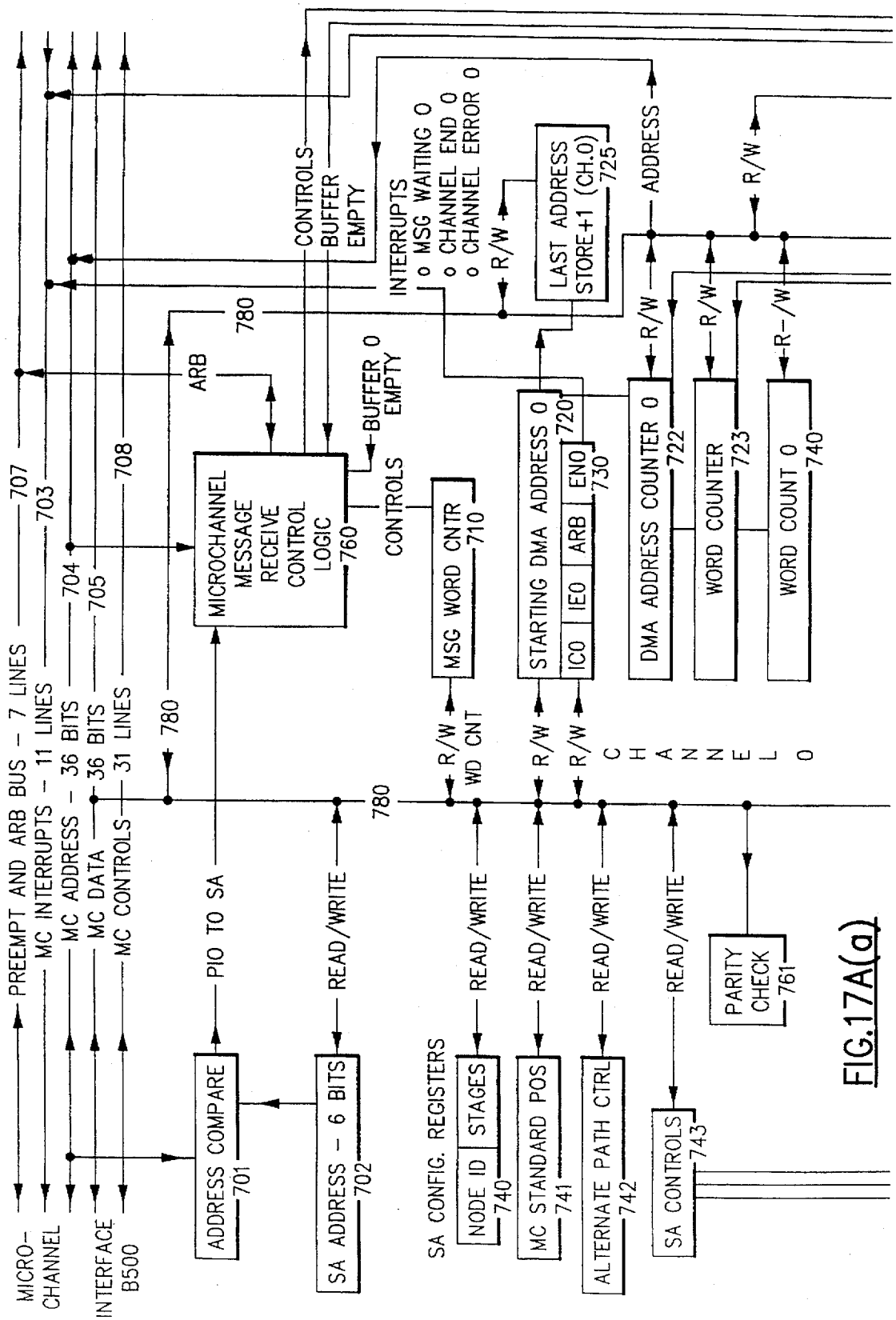

Referring to FIG. 17, the function of block 130 is to send messages to processor memory after they have been received from network 30 and stored in buffers 150 to 15m. Network 30 sends a data message to block 170, which recovers, checks and stores the message to one of the Receive-Buffer 150 to 150m. The command field in the message header commands buffer select block 755 which of the m buffers is to receive the data, if more than 1 buffer is implemented. Assume the incoming message to block 170 from network 30 is routed by block 755 to receiving DMA channel 0 through buffer 150. Once the message is stored to block 150, compare logic 938 senses the read pointer 950 and the write pointer 946 and notices that they are no longer equal. Block 938 then resets the Buffer 0 Empty signal to indicate that there is a message waiting (buffer 150 is no longer empty) to be stored into processor memory over the MC. The Buffer empty signal going to 0 triggers the master receiving apparatus 130 to become active and transfer the data message from buffer 150 to the processor memory.

Block 130 implements several different DMA Channels. Different message priorities and types can select to be processed via different DMA Channels. FIG. 17 shows m different DMA Channels: DMA Channel 0 is comprised of blocks 720, 730, and 740; DMA Channel m is comprised of blocks 72m, 73m, and 74m. The DMA Channels function identically, but only one performs a transfer over the MC at any given time. Assume that a message has arrived into buffer 150 to be processed by DMA Channel 0. DMA Channel 0 should have been prepared in advance by processor P300, and be waiting process messages sent to buffer 150.

The processor software prepares a receiving DMA Channel by issuing PIO store commands over the MC addressed to block 130. Block 701 monitors all PIO commands issued over the MC to determine if they are addressed to block 130; i.e., if the address matches a preassigned address stored in register 702. If the address on the MC matches the address in register 702, block 130 responds to the MC operation. Using this method the processor can send values to registers 720, 730, and 740 to initialize receiving DMA Channel 0 as follows:

- The value stored to register 720 tells DMA Channel 0 where it is to store the next 32-bit word transferred by DMA to processor memory. Register 720 is incremented after every word is sent to memory.
- The value stored to register 740 tells DMA Channel 0 how many words it can store to memory. Register 723 receives the word count from the active 740 to 74m word count register and is decremented after every word is sent to memory. Basically the processor sets up a buffer in processor memory where the SA Card 6 can store incoming messages through DMA Channel 0. The processor informs block 130 of the buffer location and size by loading registers 720 and 740.
- The value stored to register 730 tells DMA Channel 0 how to control the DMA operation based on control bits: IC0, IE0, ARB, and EN0.
- IC0—Enables block 130 to interrput the processor after it has filled or overflowed the buffer in processor memory.
- IE0—Enables block 130 to interrput the processor after if it has detected an error, such as a message is waiting for DMA Channel 0 in buffer 150 and DMA Channel 0 is not enabled.
- ARB—tells block 130 the number of the arbitration level (priority) it is to use when arbitrating for the MC.
- EN0—enables DMA Channel 0 indicating that the processor has set-up a memory buffer, arbitration level, and loaded registers 720, 730, and 740.

Block 130 begins a DMA Channel 0 operation by arbitrating for the MC. It does this by activating the −PREEMPT signal to the MC and using the ARB value from register 730 to define its priority level. Once, block 130 has won the MC, it is the sole owner of the MC until preempted, and it can proceed to DMA the data message in buffer 150 to the designated addresses in processor memory.

Block 130 moves the processor memory address value in register 720 to counter 722, and the word count value in register 740 to counter 723. Counter 723 supplies the DMA address for every message word to the MC address bus. The data to be stored to the processor memory is read from buffer 150 to internal bus 780, and then placed on the MC Data Bus 705, one word at time. The second word of the message containing the word count of the message is stored to counter 710, as well as being sent to processor memory. After each word is transferred to processor memory, counter 722 and 958 are incremented and counters 710 and 723 are decremented. The transfer proceeds until either counter 710 or 723 goes to 0.

If counter 710 goes to 0 first, this means that the entire data message has been stored successfully to processor memory. The transfer is concluded by:

1. Storing the address of where the message ended in processor memory+1 (the value presently in counter 723) to registers 720 and 725.
2. Storing the remaining word count from counter 723 to register 740. Steps 1) and 2) leaves DMA Channel 0 initialized for the next incoming message.
3. Erasing the processed message from buffer 150 by issuing the "End of Msg" signal to buffer 150 control logic.

4. Relinguishing ownership of the MC, if being preempted. eol.

If counter 723 goes to 0 first, this means that the entire data message has NOT been stored successfully to processor memory. The incomplete transfer is concluded by:
  a. Issuing an error interrupt to the processor, if IE0 permits.
  b. Leaving the complete message in buffer 150.
  c. Relinguishing ownership of the MC.
  d. Resetting registers 730, disabling DMA Channel 0.
  e. The processor must respond to the interrupt and set-up a new buffer in processor memory that is large enough to receive the entire message waiting in buffer 150.

At anytime the processor can issue a PIO command to change the receiving buffer located in processor memory in regards to size and location. It sets up a new buffer by issuing a PIO operation to store new values to registers 720, 730, and 740. If the processor sets up a new buffer in the middle of a message that is being received by block 130, block 130 will terminate the present message store to processor memory by leaving the complete message in buffer 150 and subsequently transferring the complete message to the new buffer area. The processor can determine the location in the old buffer after which the last word of teh last valid message has been stored by reading register 725.

After block 130 sucessfully completes the transfer of a message to processor memory, it will proceed to transfer the next message from buffer 150 immediately or as soon as another message is stored to buffer 150, as determined by teh Buffer Empty signal being 0 or going to 0. After completing it each message, it will move on to the next message.

compare circutry 701 to compare every MC address 704 to a prestored MCC Address range stored in POS register 702. If the two compare, the MC transfer is determined to be destined for the SA adapter or card. By monitoring the MC −S0 and −S1, which are transmitted on the MC Control lines portion of the MC Bus B500, blocks 140 and 130 can determine if the MC transfer is a read or a write operation. Block 140 will respond to write operations over the MC which send control data or data messages from the processor P300 or a bus master to the SA adapter or card. Block 130 will respond to read operations over the MC which receive control data or data messages to be sent to processor P300 or a bus master from the SA adapter or card. Register 702 is loaded by POS control sequences to the SA adapter or card executed during system initialzation; these sequences are used to assign the MC addresss range to which each SA adapter or card shall respond.

The block 140 function of receiving control commands from the MC and is accomplished by MicroChannel Message Send Control Logic block 860. When block 701 detects that an MC Address is destined for the SA adapter or card address range, it alerts block 860 by issuing the "PIO to SA" signal. Block 860 then checks the −S0 and −S1 to determine if this MC transfer is a read or write operation, requiring it to respond. Block 860 then checks the low order address bits of the MC Address bus to determine if the MC write transfer is one for transmitting control data to the SA adapter or card, or if it is a data message transfer to network 30. The definition of the 32-bit MC address bits is shown in block 970 below.

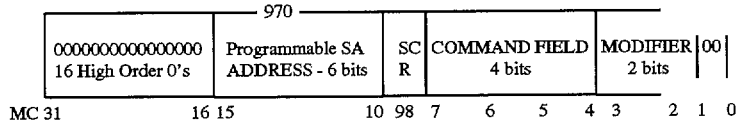

| 0000000000000000<br>16 High Order 0's | Programmable SA<br>ADDRESS - 6 bits | SC<br>R | COMMAND FIELD<br>4 bits | MODIFIER<br>2 bits | 00 |
|---|---|---|---|---|---|
| MC 31 | 16 15 | 10 9 8 | 7 6 5 4 | 3 2 | 1 0 |

Because block 130 contains m multiple receiving DMA channels, it is capable of supporting m different incoming messages simultaneously, and it can be programmed either to interleave messages from all channels or to complete the one channel entirel before working on a another channel. Note in FIG. 17, that each channel can be implemented to have its own buffer 150 to 15m to provide completely independent channel operation. However, an alternative implementation is shown in FIG. 17A, where it is possible to share a single 150 buffer amongst all m channels. This is possible because only 1 channel is active on the MC at any given time; however, this alternative method is more prone to having a message at the head of buffer 150 that has no available processor memory to be stored to, block the other messages in buffer 150 from being received over channels that are open. This problem is avoided by using the preferred embodiment of a separate buffer 150 to 15m for each of the m channels.

Blocks 140 and 130 also monitor data or control transfers initiated over the MC by processor P300 or a bus master located in one of the expansion card slots within its own MicroChannel Island. Blocks 140 and 130 must monitor all transfers initiated on the MC and determine if the transfers are addressed (destined) to them. Referring to FIGS. 16 and 17, the way blocks 140 and 130 determine if a MicroChannel transfer is destined to them is to continually monitor the MC Address bus portion of the MC Bus B500 using address Bits 15 to 10 of the MC Address are compared against register 702 by comparator 701. Bit 9 determines if the command applies to the sending channels (Bit 9=0) or the receiving channels (Bit 9=1). Bit 8 defines to which channel the command is directed. Bit 8 channel define up to two channels directly or be used to point indirectly to two different channel definition registers. Bits 7 to 4 determine the particular command (type of MC transfer) being performed; block 860 includes a command register which stores bits 7 to 4 and defines the particular command which is presently active. The commands that block 860 is capable of executing (based on MC bits 7 to 4 of the address word 970) are defined in detail in TABLE 1.

TABLE 1: PIO COMMAND FIELD (bits 7, 6, 5, 4) DEFINITION

0000—NO-OP

0001—NO-OP

0010—NO-OP

0011—NO-OP

0100—NO-OP

0101—READ/WRITE SA CONTROL REGISTERS

0110—NO-OP

0111—READ/WRITE SA CONFIGURATION REGISTERS (Node ID/Stages, Alternate Path Control)

1000—START A SEQUENTIAL LIST TRANSFER

1001—DMA CHANNEL CONTROLS
1010—NO-OP
1011—NO-OP
1100—NO-OP
1101—NO-OP
1110—READ/WRITE SA BUFFER POINTERS & COUNTERS
1111—READ/WRITE SLAVE DATA MESSAGE

Bits 3 and 2 of SA Address word 970 further modify the command type, for instance, by indicating a particular SA Configuration register which is to be written if the command is 0111. Bits 1 and 0 of SA Address word 970 are the byte alignment bits and must always be 00 to indicate that all transfers to/from the SA adapter and card are 32-bit word aligned.

Block 860 controls the moving of the data message from the MC DATA bus 705 to buffers 160 to 16m. When block 860 detects that MC Address bits 7 to 4 contain the 1000 command with bit 9=0 (see Table 1), block 860 becomes active and starts processing a list of sequential data messages from processor memory over the MC to buffers 160 to 16m. Likewise, block 760 controls the moving of the data message to the MC DATA bus 705 from buffers 150 to 15m. When block 760 detects that MC Address bits 7 to 4 contain the 1000 command with bit 9=1 (see Table 1), block 760 becomes active and starts transferring data messages to processor memory over the MC from buffers 150 to 15m.

The function of block 140 of FIG. 12 is to write a valid message to buffer 160; i.e., a message which is converted to the message format required by network 30, so that buffer 160 contains the proper two word Message Header, the Message Data words, and the CRC field. Block 140 does this by writing a 32-bit word to buffer 160 for every word received from the MC.

Referring to FIG. 12, once block 140 places and complete message in buffer 160, it is the function of block 180 to read the message from buffer 160 and to transmit it to the proper destination node over network 30. The timing for the Network Message Send function is shown in FIG. 18 including the establishment of the network path and the sending of the valid message over the network path. When the BUFFER EMPTY signal from block 238 (FIG. 14) is active, the Network Send Logic is IDLE and not active. When the BUFFER EMPTY signal goes to zero, the Network Send Logic 180 is activated and generates a series of timing signals called ST0 to ST9 (Sending Time 0 to 9) that control the send operation as shown in FIG. 18.

Figure 19B:
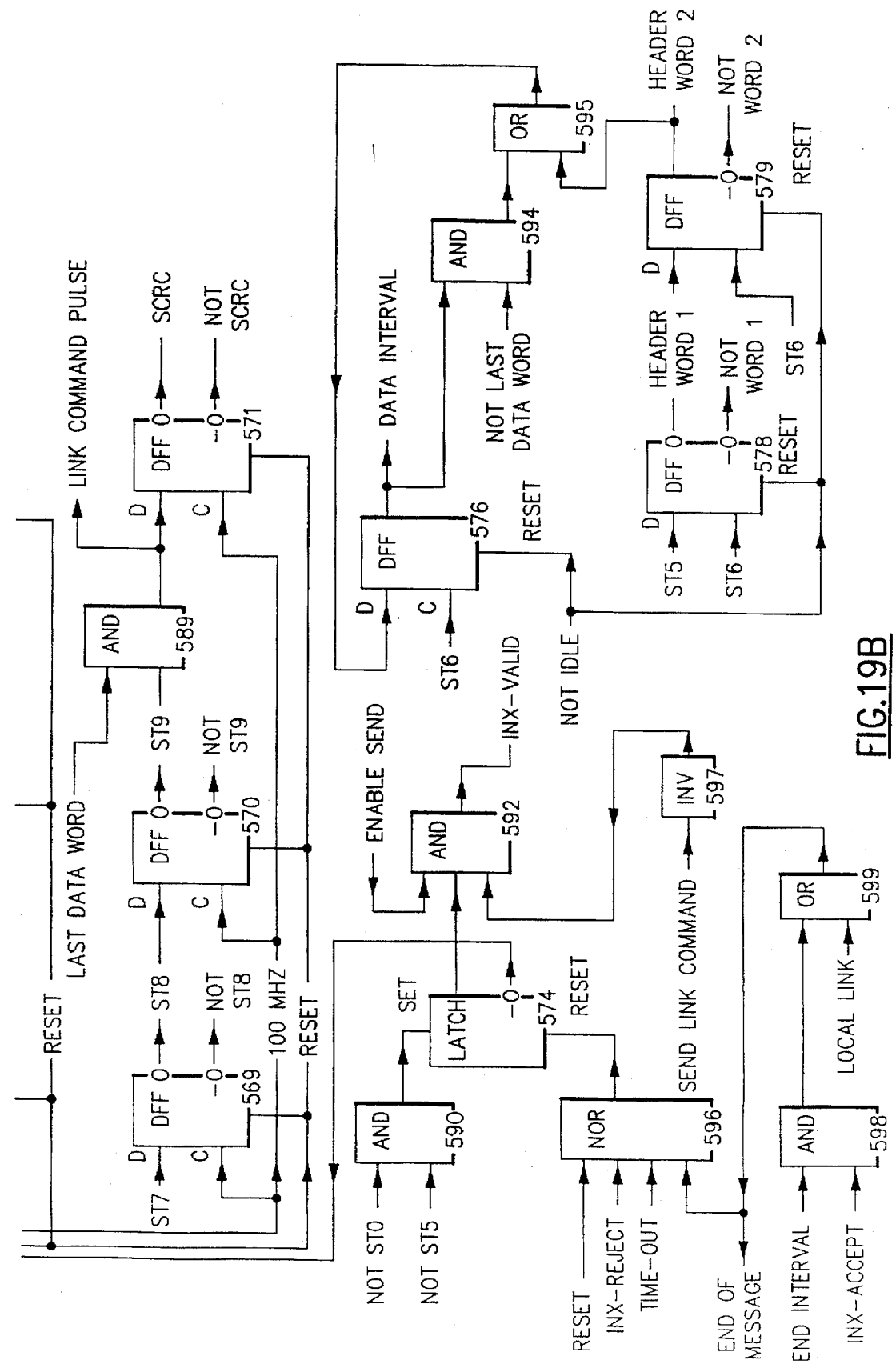
FIG. 19 shows a schematic block diagram of the timing logic associated with the switch interface sending message portion of the invention Switch Adapter function, for the purpose of sending message data being to the multi-stage switch network from the MicroChannel.

Referring to FIG. 19, the detailed timing logic of block 180 is shown. The BUFFER EMPTY arrives into block 180 from buffer 160, is inverted by gate 580, and used in conjunction with the latch 560 IDLE state to set ST0 latch 561 through gate 582. Latch 561 feeds gate 590 and causes latch 574 to set, which feeds the IDLE latch 560 and causes it to reset—taking block 180 out of the IDLE state. The ST0 to ST9 timing latches and the IDLE latch all are set and reset based on a 100 MHZ clock signal having a 10 ns period, which is the basic transmission frequency of the preferred embodiment of block 180 and causes a byte of data to be transmitted at a 100 Mbyte/sec rate. The 100 MHZ signal causes a new timing signal to be set every 10 ns and the old timing signal to be reset. For instance, the first rise of the 100 MHZ clock signal after the BUFFER EMPTY signal goes inactive, the ST0 signal is set and the IDLE signal is reset. The second rise of the 100 MHZ clock signal after the BUFFER EMPTY signal goes inactive, ST1 latch 562 which is fed from the ST0 signal is set, and the ST0 signal is reset at the same time. This continues in sequence, as shown in FIG. 19, right through time ST9. After ST9 latch 578 is set, it feds back through gates 585 and 586 and causes ST6 latch 567 to set a second time following ST9. Again ST7, 8, and 9 follow the setting of ST6 in sequence every 10 ns, and again ST6 follows ST9. This ST6 to ST9 timing loop continues until all the data words n in the message have been sent to the network 30 as shown in FIG. 18.

Figure 20B:
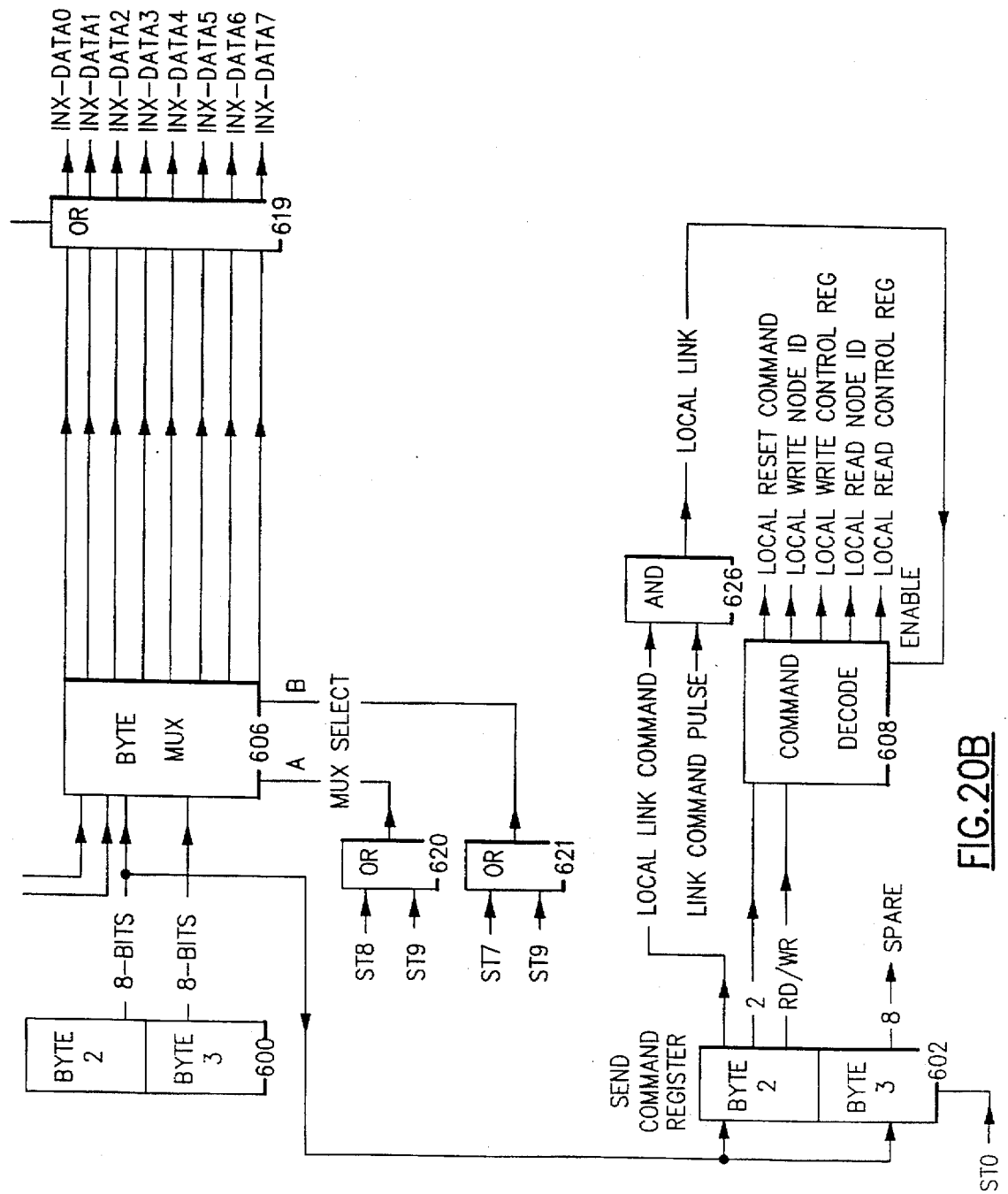
FIG. 20 shows a schematic block diagram of the data conversion logic associated with the switch interface sending message portion of the invention Switch Adapter function, for the purpose of sending message data being to the multi-stage switch network from the MicroChannel.

Referring to FIG. 20, the detailed logic of block 180 which takes 32-bit words from buffer 160 and converts them into the byte wide network message protocol is shown. A 32-bit word is read from buffer 160 into the four byte register 600 every 100 ns. The first word is read in at ST0 time, clocking register 600 through gate 610 at ST0 time. The first word is Header Word 1, which contains the destination node ID in bytes 0 and 1 and the command field in bytes 3 and 4, as shown in FIG. 17. The 3-bit selector function 604 is a multiplexer function which looks at the destination node field (bytes 0 and 1) of register 600 and selects 2 bits at a time to contruct the network header portion of the network message as shown by block 552. The preferred network 30 embodiment has two network stages as shown by FIG. 7, and requires two stage routing bytes to establish a path through network 30—a stage 1 routing byte which is constructed at time ST1 and a stage 2 routing byte that is constructed at ST3 time, as shown in FIG. 18. 2-bit selector 604 and 2-to-4 decoder 605 combine to construct the stage 1 and 2 routing bytes from the destination node bytes stored in register 600. During time ST1, selector 604 selects the low order 2 bits of byte 1 of register 600 to be gated through to decoder 605 which converts the 2-bits to an 4 bit code that becomes the stage 1 routing byte, which is transmitted to network 30 through gates 618 and 619 over the INX-DATA lines. During time ST3, selector 604 selects the next high order 2 bits of byte 1 of register 600 to be gated through to decoder 605 which converts the 2-bits to an 4 bit code that becomes the stage 2 routing byte, which is transmitted to network 30 through gates 618 and 619 over the INX-DATA lines. For larger networks, the process would continue to generate further stage routing bytes based on the higher order bits of the destination node field in bytes 0 and 1 of register 600; however, for the two stage preferred embodiment, just the two routing bytes are required and the higher order destination node bits are not used. Gate 617 is used to enable blocks 604 and 605 only at ST1 or ST3 times, so that for all other times decoder 605 passes all zeroes to gate 618; this causes the all zeroes dead fields to be generated during times ST2 and ST4 times, as shown in FIG. 18. At ST5 time, gate 618 ORs an all ones data byte to network 30 through gate 619 over the INX-DATA lines, which provides the receiver sync field portion of the network message. Previous to sending the network header to network 30, the INX-VALID signal to network 30 is activated by gate 592 (FIG. 19) to inform network 3 that a valid message is being transmitted.

For messages that are sent to network 30 by block 180, the message header and message data portion of the message shown in block 552 of FIG. 17 is constructed starting at time ST6, and one 32-bit word is transmitted to network 3 as 4 consecutive bytes sent every ST6 to ST9 time period. Byte MUX 604 constructs this portion of the message by selecting byte 0 from register 600 at time ST6, byte 1 at time ST7, byte 2 at time ST8, and byte 3 at time ST9 as controlled by gates 620 and 621. At every ST6 time through gate 610, register 600 is loaded with a new 32-bit word from buffer 160 to be sent to network 30. The DATA ACCEPTED signal is generated by latch 567 in FIG. 19 and is the same as the ST0 signal.

Figure 21:
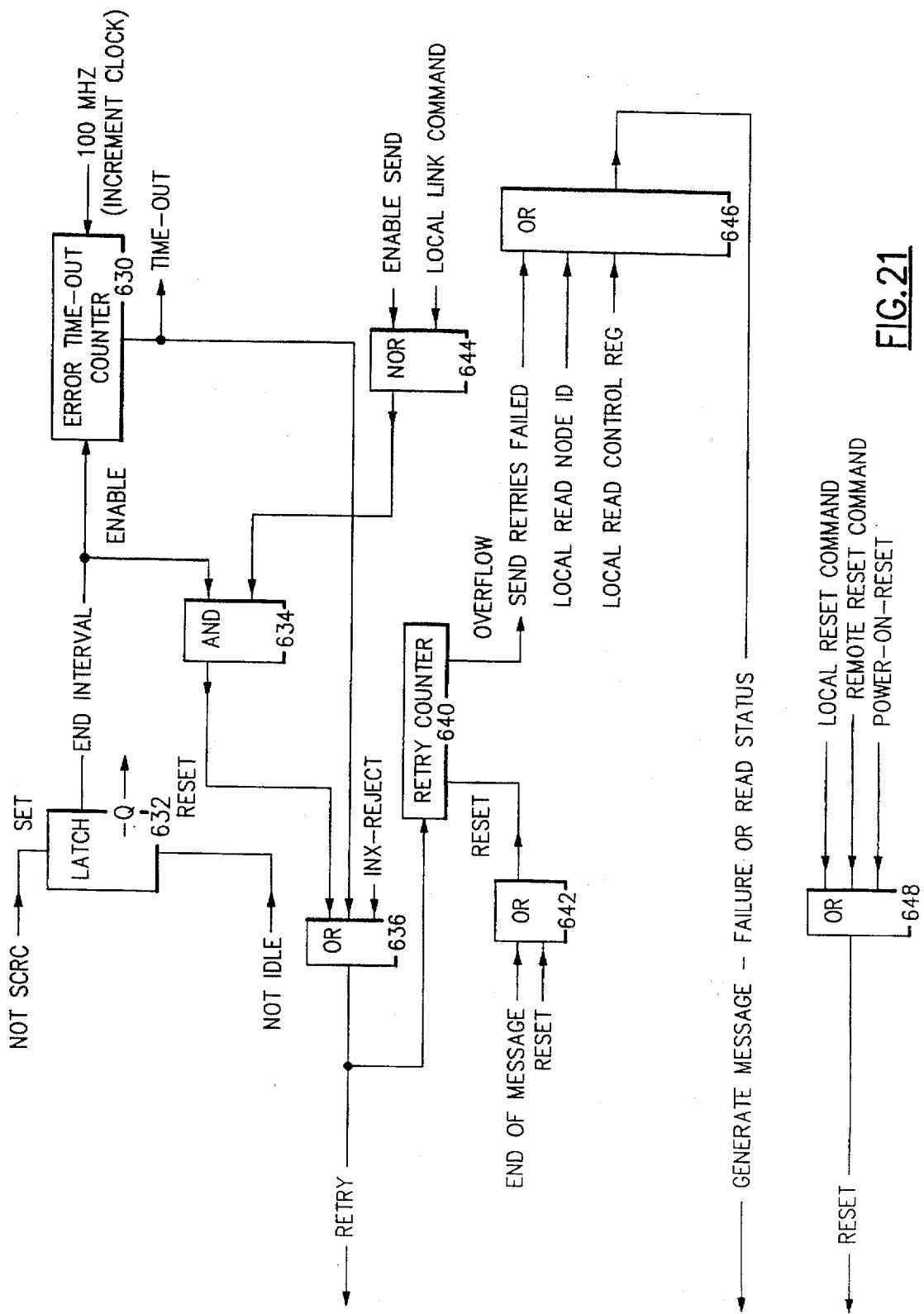
FIG. 21 shows a schematic block diagram of the control logic associated with the switch interface sending message portion of the invention Switch Adapter function, for the purpose of sending message data being to the multi-stage switch network from the MicroChannel.

The DATA ACCEPTD signal causes the read counter associated with buffer 160 to increment the read address to buffer 160 every ST6 time, which causes new data to be loaded into register 600 at the following ST6 time as shown in the timing diagram of FIG. 18. The control logic of FIG. 19 marks the sending of Header Word 1 by setting latch 578 during the first ST6 to 9 time period, and the sending of Header Word 2 by setting latch 579 during the second ST6 to 9 time period. After the two message header words are transmitted, the message data words are transmitted during the DATA INTERVAL specified by latch 576 which is set through gate 595 and held set through gates 594 and 595 until the LAST DATA WORD is detected. During Header Word I time 578, the Destination Node ID is transmitted in the first two bytes and the command field in the second two bytes as shown in FIG. 17. During Header Word 2 time 579, the Source Node ID is transmitted in the first two bytes and the word count field in the second two bytes as shown in FIG. 17. At the same ST6 time that Header Word 2 is loaded into register 600 (the second ST6 time), count register 601 of FIG. 20 is loaded through gate 615 and delay 616 with the word count value for the present message, and defines how many data words are provided with the present message. Delay block 616 causes count register 601 to be loaded after the first 610 decrement signals has been issued, so that count register 601 is not decremented for Header Words 1 or 2. However, as every data word is loaded into register 600 at ST6 time, count register 601 is decremented by 1 at subsequent ST6 times, as shown in FIG. 18. Count Equals Zero Detect block 607 detects when count register 601 has decremented to zero as an indication that the last data word of the message has been loaded into register 600. Count register 601 going to zero and being detected by block 607 causes the LAST DATA WORD signal and its inverse to be gerterated by gates 612 and 614. Referring to FIG. 19, the Last DATA WORD signal into gate 585 prevents ST6 from occuring again after the last byte of the last data word is transmitted at ST9 time, instead gate 589 causes the SEND CRC latch 571 to set (SCRC) after the last ST9 signal transmits the last data byte. The SCRC signal 571 goes to gate 610 (FIG. 20) and cause the CRC byte from buffer 160 to be loaded into register 600, from which it is sent through MUX 606 and gate 619 to network 3 over the INX-DATA lines, as shown by FIG. 18. This completes the sending of the valid message to network 30, and the setting of SCRC latch 571 causes END INTERVAL latch 632 (FIG. 21) to become active. The INX-VALID signal 592 is left active during END INTERVAL 632 giving the receiving node an opportunity to resond to the valid message with either an INX-ACCEPT or INX-REJECT signal. FIG. 18 shows the timing for the receiving node accepting the message and responding with the INX-ACCEPT signal.

Count register 601 therefore controls the size of the message being transmitted to the network depending on the data word count value provided in message header word 2 as shown in FIG. 15. The data word count stored to count register 601 ranges from 0 data words to 63,999 data words. Thus a message of any length can be transmitted in one transmission cycle, limited only be the number of bits allotted to the word count field in message header 2 shown on FIG. 15 and the number of bits implemented by count register 601.

Referring to FIG. 19, the INX-ACCEPT signal occurring during the END INTERVAL 632 time period causes gates 598 and 599 to go active and the END OF MESSAGE signal 599 to go active, which goes to buffer 160 and causes the valid message just sent and accepted to be erased from the buffer 160 and latch 574 to be reset through gate 596. The resetting of latch 574 causes the INX-VALID signal to go inactive which breaks the connection established through network 30, and returns the network port to the idle condition, which is caused by latch 574 setting the IDLE latch 560. If the BUFFER EMPTY signal is still active or becomes active again, indicating that buffer 160 has another valid message to be sent, the network send message operation will start over again from the beginning and process the next valid message.

Blocks 170 and 150 of FIG. 12 functions similarly to blocks 180 and 160, respectively, except the data flow is in the opposite direction with data messages arriving from network 30. The network 30 messages arriving into block 170 are in the format shown by the message header and message data portion of block 552 of FIG. 17. Block 170 checks the message data arriving from network 30 for correctness using the CRC check byte. Block 170 also converts the message data to 32-bit words, which its stores into block 150. Block 150 alerts block 130 of FIG. 12 that a message has arrived. Block 130 alerts processor P300 by interrupt that a message is waiting or waits for processor P300 to poll using a specially coded PIO instruction. In either case, processor 30 responds to a poll or interrupt by reading reading buffer 150 through MicroChannel Receive Logic 130 using a PIO instruction addressed to block 130.

> Note with respect to FIG. 6, that it is possible to increase the number of data lines at all input and output ports. For instance, adding data lines 5 to 8 would provide a byte wide interface at all ports and double the data transmission rate through network 30. Note with respect to the drawings, such as those of FIG. 13 the block areas are not intended to indicate the actual physical space occupied on the chip by the functions.

Clearly, the inventions which we have described by way of example and in illustration of our best mode of practicing the inventions in the various embodiments described provide a basis for much potential growth. Accordingly, it will be understood that those skilled in the art, both now and in the future, will envision further improvements even by way of invention, and these should be understood to be within the claimed scope which should be construed to protect and preserve the rights of the inventors.

What is claimed is:

1. An adapter comprising:

means for transmitting a first data message of any finite length measured by a first word count completely in one transmission cycle from a node operating under a bus protocol to a switch network operating under a switch protocol and for transmitting a second data message of any finite length measured by a second word count completely in one transmission cycle from the switch network to the node;

said switch network comprising:

a plurality of input ports including a first input port for receiving said first data message from a coupled adapter;

a plurality of output ports including a first output port for sending said second data message to the coupled adapter; and means for establishing a circuit-switched connection between said first input port and any of said output ports in response to a connection request included in said first data message, said circuit-switched connection maintained for a duration required for transmitting said first data message completely in one transmission cycle; said node comprising:

communication means for transmitting said first data message to the coupled adapter and for receiving said second data message from the coupled adapter; and said adapter further comprising:
a switch interface for coupling the adapter to the switch network via said first input port and said first output port; and
a bus interface for coupling the adapter to the node.

2. The adapter of claim 1, further comprising storage means for storing said first and second data message.

3. The adapter of claim 1, wherein said bus interface conforms to a standard multi-drop bus protocol and supports standard functions supported by slave I/O and slave memory devices.

4. The adapter of claim 1, wherein the adapter is implemented on an expansion card for coupling to a card slot in a personal computer or workstation.

5. The adapter of claim 1, wherein the switch network comprises a multi-stage switch network.

6. The adapter according to claim 1, further comprising bus sending control means for detecting a parity error in the first data message and for informing the node of the parity error by an interrupt signal.

7. The adapter according to claim 1, further comprising switch sending control means for converting said first data message from said bus protocol to said switch protocol, the switch sending control means including means for altering a bandwidth of said first data message.

8. An adapter according to claim 7, wherein the switch sending control means further includes:
means for removing parity bits from the first data message; and
means for adding a header to the first data message, the header including the connection request.

9. The adapter according to claim 1, further comprising switch receiving control means for converting said second data message from said switch protocol to said bus protocol, the switch receiving control means including means for altering a bandwidth of said second data message.

10. An adapter according to claim 9, wherein the switch receiving control means further includes:
means for adding parity bits to said second data message.

11. The adapter according to claim 1, further comprising:
sending buffer means for buffering the first data message; and
sending buffer control means for erasing an erroneous data message in the sending buffer means.

12. The adapter according to claim 11, further comprising:
means for transferring said first data message to the sending buffer means and checking for correct parity of said first data message, the means for transferring activated in response to a write operation signal sent by the node.

13. The adapter according to claim 1, further comprising:
receiving buffer means for buffering the second data message; and
receiving buffer control means for erasing an erroneous data message in the receiving buffer means.

14. The adapter according to claim 13, wherein the receiving buffer control means includes means for retaining a copy of the second data message in the receiving buffer means when the bus interface fails during transmission of the second data message, and for retrying a transmission of the second data message.

15. The adapter according to claim 13, wherein the receiving buffer control means includes means for erasing a copy of the second data message in the receiving buffer means which has been successfully transmitted to the node.

16. The adapter according to claim 13, further comprising bus receiving control means for signaling the node that the second data message is buffered in the receiving buffer means.

17. The adapter according to claim 16, wherein said bus receiving control means includes means for sending to the node the second data message buffered in the receiving buffer means in response to a read signal sent by the node and for checking said second data message of any length for correct parity.

18. An adapter according to claim 1, wherein:
said plurality of input ports operate asynchronously, in relation to a plurality of connection requests received separately or simultaneously at the input ports, for establishing a plurality of active circuit-switched connections simultaneously transmitting a plurality of data messages of any finite length each measured by a word count from a plurality of said input ports to a plurality of said output ports, said node further comprises a processor and associated memory, said communication means includes a bus coupled to the processor, said bus interface includes means for coupling the adapter to the node via the bus, and said adapter further comprises bus master means for controlling transmission of said first and second data message, the bus master means including direct processor associated memory access means for retrieving from the processor associated memory stored data messages intended for transmission by the processor and for storing in the processor associated memory said second data message received by the node, said stored data messages intended for transmission including said first data message.

19. The adapter according to claim 18, wherein said bus master means further includes task list means for storing and processing data message transmission commands from the processor.

20. The adapter according to claim 19, further comprising storage means for storing said first and second data message and wherein said bus master means further includes channel means for moving said data messages intended for transmission between the processor associated memory and said storage means.

21. The adapter according to claim 19, wherein said bus master means further includes buffer means for storing the data messages intended for transmission by the processor.

22. The adapter according to claim 18, wherein said direct processor associated memory access means further includes means for storing said second data message received by the node at processor commanded starting addresses.

23. The adapter according to claim 18, wherein said bus master means further includes means for interrupting the processor for storing in the processor associated memory said second data message received by the node.

24. A computer network comprising:
a switch network operating under a switch protocol, said switch network including:
a plurality of input ports for receiving data messages of any finite length each measured by a word count, the data messages including a first data message and a second data message;
a plurality of output ports for outputting the data messages; and means for establishing a circuit-switched connection between any one of the input ports and any one of the output ports in response to a connection request included in a data message received at said one of the input ports, said circuit-switched connection maintained for a duration long enough for transmitting from said one of the input ports to said one of the output ports the received data message completely during one transmission cycle;

a plurality of nodes each operating under a bus protocol, said nodes each including:
  a processor and associated memory; and
  means for transmitting the first data message and for receiving the second data message, said means for transmitting and receiving including a bus;

a plurality of adapters each for transmitting the first data message from a coupled one of the nodes to said switch network completely during one transmission cycle and for transmitting the second data message from said switch network to said coupled one of the nodes completely during one transmission cycle, said plurality of adapters each including:
  a switch interface for coupling to the switch network via one of the input ports and one of the output ports;
  a bus interface for coupling to one of the nodes via its associated bus; and
  bus master means for controlling transmission and reception of the first and second data message from and to said coupled one of the nodes, the bus master means including direct memory access means for retrieving from a processor associated memory stored data messages intended for transmission by a processor in said coupled one of the nodes and for storing in the processor associated memory data messages received by said coupled one of the nodes.

25. The adapter according to claim 24, wherein said plurality of input ports and output ports each comprise a plurality of interface lines including data lines and control lines, one of said control lines for enabling and terminating a data message transmission and a second of said control lines for signaling back to a sending node a rejection of the data message by a receiving node, causing a retry of the rejected message.

26. The computer network of claim 24, wherein the switch network is a bufferless and clockless switch network and wherein the means for establishing a circuit-switched connection includes asynchronous connection means for establishing asynchronously a plurality of concurrently transmitting circuit-switched connections between a plurality of the input ports and a plurality of the output ports in response to a plurality of data messages, received separately or simultaneously at the input ports, each including a separate connection request.

27. The computer network according to claim 26, wherein:
  the nodes each further include means for sending and receiving a reject signal in response to an erroneous data message transmission;
  the switch network further includes means for transmitting the reject signal from an output port coupled to an adapter of a receiving node back to an input port coupled to an adapter of a transmitting node; and
  the adapters each further include buffer means for retaining a copy of the first data message after transmitting it to the switch network, the buffer means including means for retrying a transmission of a retained copy of the first data message in response to receiving the reject signal from the receiving node.

28. The computer network according to claim 27, wherein the buffer means further includes means for erasing the retained copy of the first data message in response to the receiving node not sending the reject signal.

* * * * *